US012721712B2

(12) United States Patent
Shaffer

(10) Patent No.: US 12,721,712 B2
(45) Date of Patent: Sep. 1, 2026

(54) SUBGINGIVAL MEDICAMENT DELIVERY TRAY

(71) Applicant: Lisa Shaffer, Erwinna, PA (US)

(72) Inventor: Lisa Shaffer, Erwinna, PA (US)

(*) Notice: Subject to any disclaimer, the term of this patent is extended or adjusted under 35 U.S.C. 154(b) by 132 days.

(21) Appl. No.: 18/776,460

(22) Filed: Jul. 18, 2024

(65) Prior Publication Data

US 2024/0390126 A1 Nov. 28, 2024

Related U.S. Application Data

(63) Continuation of application No. 17/352,202, filed on Jun. 18, 2021, now Pat. No. 12,207,985.

(51) Int. Cl.

| | |
|---|---|
| ***A61C 19/06*** | (2006.01) |
| ***B33Y 10/00*** | (2015.01) |
| ***B33Y 50/00*** | (2015.01) |
| ***B33Y 70/10*** | (2020.01) |
| ***B33Y 80/00*** | (2015.01) |

(52) U.S. Cl.

CPC ............ *A61C 19/066* (2013.01); *B33Y 10/00* (2014.12); *B33Y 50/00* (2014.12); *B33Y 70/10* (2020.01); *B33Y 80/00* (2014.12)

(58) Field of Classification Search

CPC ... A61C 19/066; A61C 19/063; A61C 19/043; B33Y 10/00; B33Y 50/00; B33Y 70/10; B33Y 80/00; B33Y 50/02; A61N 1/0428

See application file for complete search history.

(56) References Cited

U.S. PATENT DOCUMENTS

| | | | | |
|---|---|---|---|---|
| 2011/0049738 | A1* | 3/2011 | Sun | B33Y 10/00 264/16 |
| 2017/0156830 | A1* | 6/2017 | Wallace | A61C 15/046 |
| 2019/0000599 | A1* | 1/2019 | Hanuschik | A46B 11/00 |
| 2019/0105842 | A1* | 4/2019 | Dau | B33Y 50/00 |
| 2019/0374309 | A1* | 12/2019 | Parkar | B33Y 50/02 |
| 2021/0361389 | A1* | 11/2021 | Mac Murray | A61C 7/08 |
| 2022/0401202 | A1* | 12/2022 | Shaffer | B33Y 80/00 |

FOREIGN PATENT DOCUMENTS

| | | | |
|---|---|---|---|
| JP | 2004508876 | 3/2004 | |
| JP | 2005058486 | 3/2005 | |
| JP | 2020526362 | 8/2020 | |
| JP | 2020526362 A * | 8/2020 | A61C 17/0217 |
| WO | WO2012/153765 | 7/2014 | |
| WO | WO-2019241251 A1 * | 12/2019 | A61C 7/16 |

OTHER PUBLICATIONS

Office Action for Japanese Patent Application No. 2023-577897, mailed Mar. 12, 2025.

* cited by examiner

*Primary Examiner* — Nahida Sultana

(74) *Attorney, Agent, or Firm* — Joseph B. Maenner; Maenner & Associates, LLC

(57) ABSTRACT

Oral appliance delivery trays for use in maintaining or improving oral health, particularly the sub-gingival region, are provided. Methods of manufacturing individualized oral appliance delivery trays are provided. Pre-fabricated oral appliance trays including a compound pre-disposed therein are provided. The compositions and methods may be used to maintain or improve oral, periodontal and systemic health or to prevent or slow, periodontal or systemic health issues related to the oral cavity.

11 Claims, 24 Drawing Sheets

RESULTS

HIGH RISK PATHOGENS

MODERATE RISK PATHOGENS

LOW RISK PATHOGENS $10^7$ $10^6$ $10^5$ $10^4$ $10^3$ LQ

Aa Pg Tf Td En Fn Pi Cr Pm Ec Cs

BEFORE

AFTER

SUBGINGIVAL MEDICAMENT DELIVERY TRAY

FIELD OF INVENTION

The present invention relates to the field of oral health conditions, therapeutic dental and systemic health applications and periodontal care.

BACKGROUND

Over half of all adults over age 30 and 70% of those over age 65 have periodontal disease. Untreated periodontal disease can lead to chronic periodontitis, an oral infection causing bone and tooth loss. Periodontal disease is linked to many other systemic conditions including diabetes, cardiovascular disease, Alzheimer's disease, respiratory disease, digestive disease, auto-immune degenerative diseases and rheumatic diseases. People with poorly controlled diabetes are more susceptible to gum disease and tooth loss. People with gum disease are more susceptible to diabetes and plaque accumulation orally and systemically. Periodontal disease makes it harder to control diabetes. Diabetic patients including Type 2 diabetes are more susceptible to gum disease and have a decreased ability to fight infection. Diabetic patients tend to have increased glucose in the saliva, which feeds oral bacteria, making gum disease and its damaging effects much more widespread and prevalent over time. Gum disease makes the prognosis for existing heart conditions worse, potentially including fatality, and increases the chance of stroke. Oral bacteria have been found in arterial plaques. Periodontal disease is also a probable risk factor for Alzheimer's disease which affects 5.7 million U.S. adults. People over age 60 with chronic gum disease (10 or more years) were 70% more likely to get dementia than those with healthy gums. Alzheimer's patients with gum disease decline more rapidly than those without gum disease. Harmful bacteria from periodontal disease can be inhaled into the lungs causing bronchitis, emphysema and pneumonia. This may lead to Chronic Obstructive Pulmonary disease (COPD) and can cause irreversible damage to the respiratory system. The chronic inflammation from gum disease may worsen these respiratory conditions and can potentially increase other risks of new respiratory conditions such as Covid and SARS. Periodontal disease (gum disease) during pregnancy increases the risk for delivering a preterm and/or low birth weight infant. Moderate to advanced gum disease is common in people with rheumatoid arthritis. Rheumatoid arthritis patients with advanced periodontal disease tend to have increased, chronic and painful flare-ups with an increase in permanent degenerative effects such as joint damage. A higher incidence of gum disease and more severe gum disease occur in patients with immune-related chronic inflammatory disease including lupus, Crohn's disease, colitis, inflammatory bowel disease and colorectal cancers. These diseases can cause ulcerations and perforations and can further degenerate a person's overall health and well-being and may even be fatal.

Biofilm accumulation in the supra-gingival and sub-gingival or under the gum areas into the sulcus occurs continually. Meals and dental visits may disrupt or briefly slow biofilm accumulation however this biofilm accumulation occurs and colonizes daily. Although a full debridement by a professional clinician in a dental setting will disrupt or remove much of the biofilm temporarily, the biofilm continues accumulating. The biofilm attaches to sites of tooth structures, reconstructive dental structures, exposed dentin or bone loss areas and accumulates on the cementum and dentinal surfaces. The accumulation of biofilm results in a decreased pH, which increases the disease process. Once destruction of soft tissue, periodontal ligament (POL) attachment and/or the alveolar bone has occurred, the damaging and destructive results of periodontal disease are irreversible. Bone resorption and bone degeneration may occur. Once bone is lost, it does not grow back, it is permanent.

The pellicle is an acellular proteinaceous film that forms on tooth structures. Bacteria adhere to the pellicle and colonize the tooth surface. The initial colonizing bacteria are oxygen-dependent bacteria. As the colonies of oxygen-dependent bacteria expand, plaque is formed. Oxygen diffusion is limited and anaerobic gram-negative bacteria colonize the plaque. The gram-negative bacteria form colonies that include bacteria using fermentation pathways that produce lactic acid as a side product. Over time, the lactic acid can lower the pH below 5.5 resulting in demineralization of the tooth. The mineralization rate in a subject's mouth must remain equal to the demineralization rate to avoid breakdown of enamel rods and dentinal surfaces and reduce the risk of tooth decay.

Accumulation of specific forms of gram-negative and gram-positive bacteria in a periodontal pocket results in a diseased periodontal pocket; the diseased state can become more generalized resulting in multiple diseased periodontal pockets. As pathogen levels increase, the pH decreases, crevicular fluid flow increases, and the oxygen concentration decreases. The pathogen presence contributes to attachment loss, further degenerative periodontal disease functions, and future systemic risk of tooth loss and overall oral and systemic disease. Gingivitis, gum disease or periodontitis may result. Additional health risks include but are not limited to Alzheimer's/dementia disease, respiratory disease, cardiovascular/heart and stroke diseases, type 2 diabetes, pre-term and low birth weight in newborns, colorectal diseases and potential cancers, rheumatoid arthritis and auto-immune diseases that contribute to painful joint damage and erectile disorders.

In the case of degenerative periodontal disease, the oral structures surrounding the bone structure sockets become inflamed around the gingival sulcus and tissue attachment areas, including near the periodontal ligament (POL). Without being limited by mechanism, the increased bleeding and edematous crevicular fluid flow lead to increased gram-negative bacterial growth and biofilm. Soft plaque accumulates and elevates to hard calculus splinter-like spicule substances. The cementum degenerates and the disease process infect the periodontal ligament. The affected POL damages the healthy supporting alveolar bone structures required for tooth strength, stability and support. Eventually the tooth or teeth may be lost. Subjects may choose complicated and expensive procedures such as removal of tooth structures, prosthetic and reconstructive dental procedures, soft tissue or connective tissue grafting, bone grafting, surgically placed implants, removable or permanent dentures or partial dental appliances.

Care of dental implants is further complicated as clinical debridement may damage titanium threads and probing or scaling with a dental probe or other instrument may increase the risk of implant infection and failure. Radiographs provide only 2-dimensional information regarding implant health and the absence of clinical soft tissue information may increase the time to the diagnosis of infection at or near the implant site. Since periapical radiographs can only provide a two-dimensional image of a three-dimensional object many infectious bony defects can be missed. The inability to determine the buccal-lingual bony dimensions is a major shortcoming with respect to implant treatment. Two-dimensional radiographs are insufficient in determining quantity and quality of bone, identifying vital structures, and depicting the spatial relationship between structures within proposed implant sites. Thus, periapical radiographs are regularly limited to an initial evaluation of a proposed implant site, intraoperative evaluation, and postoperative assessment. It is therefore, difficult to diagnosis and monitor implant failure in a timely manner.

Although brushing and flossing remove some biofilm and bacteria, brushing and flossing only reach a pocket depth of 3 to 4 mm. There are many treatment protocols for gingivitis, periodontal disease and attachment loss that lead to the destruction of degenerated alveolar bone support structures. The treatment methods include but are not limited to, general hygienic debridements, chemical topical solution rinses, antimicrobial injections, antibiotic injections such as minocycline, HCI, microspheres, scaling and root planing, gingivectomy, osseous resective surgical procedures and bone grafting. However, many of these treatments must be performed by a dental professional and are costly or ineffective.

Further, there is not currently a device to care for with maintenance for fixed, surgically placed dental implants. Dental implants are subject to the same deteriorating forces as natural teeth. While the implant material may be more resistant to deterioration than a natural tooth, the implant can serve as a site for bacterial colonization and periodontal disease processes. Further, the pocket surrounding the implant is vulnerable to infection and periodontal disease and no longer has a periodontal ligament for support. Routine dental care procedures such as periodontal probing, clinical debridement, and scaling are not appropriate for all implant types.

SUMMARY

The application provides an oral appliance tray for delivery of a compound to the gingival, supragingival, subgingival or gingival and subgingival regions of at least one tooth of a subject, methods of manufacturing an individualized oral appliance tray for delivery of a compound to the gingival, supragingival, subgingival or gingival and subgingival regions of a tooth and methods of managing biofilm by managing pH in a subject. The oral appliance tray comprises a gasket wherein the gasket comprises a supragingival portion, a gingival delivery region and one or more delivery ports comprising an outlet in the gingival delivery region, wherein the delivery port is selected from the group comprising a delivery reservoir and a delivery pore comprising an inlet is located in the supragingival portion. In an aspect, the gasket comprises a material suitable for oral use. In some aspects, the material suitable for oral use is selected from the group comprising non-biodegradable polymers, thermally formable plastics and thermally formable polymers. In some aspects, when the tray is positioned in the mouth of the subject, the compound flows through one or more delivery pores to the gingival, subgingival, or gingival and subgingival regions of at least one tooth. In some aspects, when the tray is positioned in the mouth of the subject, a delivery reservoir maintains the outlet and the compound in a stationary reservoir in the subgingival region of at least one tooth.

In various aspects, the oral appliance tray comprises one or more delivery ports for delivery of a compound into the gingival, subgingival, or gingival and subgingival region of at least two teeth on the subject. In various aspects, the gingival region comprises one or more regions selected from the group comprising the supragingival region, gingiva, subgingival region, the sulcus, the periodontal ligament, the periodontal ligament region, the roots, margins of natural and reconstructed dentition, a dental implant area and an implant base. In some aspects, the oral appliance tray is selected from the group comprising a mandibular arch oral appliance tray and a maxillary arch oral appliance tray.

In some aspects, the compound is selected from the group comprising oxygenating agents, antimicrobial agents, antibiotic agents, desensitizing compounds, re-mineralizing compounds, therapeutic compounds, anti-plaquing compounds, anti-caries compounds, whitening compounds, pH increasing compounds, pH maintaining compounds, biofilm managing compounds, cleansing compounds and maintenance compounds.

In various aspects, the diameter of one or more delivery pores is in the range of 0.5 mm to 12 mm. In certain aspects, the height of an outlet of one or more delivery ports is in the range of 0.5 mm to 12 mm and the width of an outlet of one or more delivery ports is in the range of 0.5 mm to 12 mm. In some aspects, the supragingival portion and gingival delivery region are contoured to fit the teeth and gingival tissue structures of the subject. In certain aspects, the tray is an individualized oral appliance tray, wherein at least one outlet location is determined by at least one periodontal measurement from a tooth of the subject. In some aspects, an outlet location is determined by at least six periodontal measurements from a tooth of the subject.

The application provides methods of reducing the amount of one or more bacteria in the gingival region of a subject at risk for periodontal disease comprising the steps of (a) providing an oral appliance tray of the application, and (b) delivering a compound to the subject, wherein the compound is selected from the group comprising oxygenating agents, antimicrobial agents, antibiotic agents, re-mineralizing compounds, desensitizing compounds, whitening compounds, anti-caries compounds, mediated vesiculobullous compounds, cleansing compounds, increasing stabilizing, moderating pH compounds, wherein the compound is provided in the oral appliance tray. In aspects of the methods, the bacteria are selected from the group comprising wherein said bacteria is selected from the group comprising Gram negative bacteria, *Aggregatibacter, actinomycetemcomitans, Porphyromonas gingiva/is, Treponema dentico/a, Tannerella forsythia, Eubacterium nuc/eaturm, Fusobacterium nuc/eatum Prevotella intermedia, Campy/obacter rectus, Capnocytophaga* species (*gingiva/is, ochrocea, sputigena*), *Peptostreptococcus micros*, and *Eikenella corrodens* species. The methods may further comprise providing said compound according to a delivery regimen comprising multiple delivery events.

Methods of manufacturing an individualized oral appliance tray of claim 1 are provided. The methods comprise obtaining at least one periodontal measurement from a tooth of a subject selected from the group comprising a subject at risk for periodontal disease, a subject at risk for demineralization, a subject at risk for bleeding upon probing, a subject at risk of inflammation or degeneration, a subject at risk for an increase in actinomyces and aerobic cocci biofilm accumulation, a subject in need of pre-operative bacterial treatment, a subject in need of post-operative bacterial treatment, a subject at risk for pre-operative sensitivity, a subject at risk for post-operative sensitivity, a subject at risk for dental discomfort, a subject at risk for phagocytosis, a subject at risk for hyper-responsive phagocytosis, a subject at risk for hyper-production of interleukins, prostaglandins and cytokines, a subject at risk for uncontrolled colonizing of anerobic gram-negative bacterium, a subject at risk for endotoxins, a subject at risk for increased crevicular fluid, a subject at risk for increased acidic salivary production, a subject with a risk for increase in C-Reactive protein (CRP) levels, a subject at risk for an oral or systemic auto-immune response, a subject at risk for peri-implantitis, a subject at risk for implant failure, a subject at risk for acute and chronic xerostomia, a subject at risk for halitosis, a subject at risk for a decrease in pH levels, a subject at risk for a systemic disease, and a subject at risk for an effect from medications from acute and chronic disease. The methods further comprise determining the form of the arch of the teeth of the subject, using at least one periodontal measurement to determine the position of the outlet of at least one port with at least one periodontal measurement and forming an individualized oral appliance tray comprising a gasket complementary to the form of the arch of the subject, the gasket comprising a supragingival portion, a gingival delivery region and one or more delivery ports comprising an outlet in the gingival delivery region, wherein said delivery port is selected from the group comprising a delivery reservoir and a delivery pore comprising an inlet located in the supragingival portion. In aspects of the method, forming the oral appliance tray comprises a process selected from the group comprising laser cutting, layer deposition, laser printing, laser deposition, molding and casting. In various aspects, the method further comprises correlating at least one dimension of an outlet of a delivery port with at least one periodontal measurement.

Methods of managing biofilm in a subject are provided. The methods comprise the steps of providing a compound in an oral appliance tray of the application, positioning the oral appliance tray with the compound in a subject's mouth, and maintaining the oral appliance try in position in the subject's mouth for a predetermined duration and frequency, wherein the biofilm accumulation rate, pH, or biofilm accumulation rate and pH in said subject's mouth is altered. In various aspects, the methods provide guided biofilm therapy. In some aspects, the methods further comprise using at least one periodontal measurement to determine the position of at least one port. In various aspects, the methods further comprise correlating a dimension of an outlet of at least one port with at least one periodontal measurement.

In an embodiment, the application provides an oral appliance tray for delivery of a compound to reduce the risk of oral pathogens from mask wearing, respiratory infection or any respiratory disease.

A pre-fabricated oral appliance tray for delivery of a compound to the gingival, supragingival, subgingival or gingival and subgingival regions of at least one tooth of a subject, wherein the oral appliance tray comprises a gasket wherein the gasket comprises a supragingival portion, a gingival delivery region and one or more delivery ports comprising an outlet in the gingival delivery region, wherein the delivery port is selected from the group comprising a delivery reservoir and a delivery pore comprising an inlet located in the supragingival region.

In an embodiment a veterinary oral appliance tray for delivery of a compound to the gingival, supragingival, subgingival or gingival and subgingival regions of at least one tooth of a non-human animal is provided. The veterinary oral appliance tray comprises a gasket wherein the gasket comprises (a) a supragingival portion; (b) a gingival delivery region and (c) one or more delivery pores comprising an inlet and an outlet, wherein the inlet is located in the supragingival portion and the outlet is in the gingival delivery region. In some aspects, the veterinary oral appliance tray further comprises a toy element.

In an embodiment, the application provides a non-transitory computer readable medium comprising instructions that, when executed by a processor of a three dimensional (3D) printing machine, direct the processor to: receive and process a digital 3D imaging model of a maxillary arch, a mandibular arch or both a maxillary arch and a mandibular arch of a patient to generate a dental device; receive and process coordinates and dimensions of delivery ports to be configured with a dental device, wherein the coordinates and the dimensions of the delivery ports are based on periodontal measurements made to the maxillary and mandibular arches of the patient; map the coordinates and the dimensions of the delivery ports to the digital 3D imaging model; and direct the 3D printing machine to form the dental device with the delivery ports according the digital 3D imaging model and according to the coordinates and the dimensions of the delivery ports mapped thereto.

In an embodiment a computer implemented method is provided. The computer implemented method is operable with a three dimensional (3D) printing machine, the method comprising: receiving and processing a digital 3D imaging model of at least one arch selected from the group consisting of the maxillary arch and the mandibular arch of a subject to generate a dental device; receiving and processing coordinates and dimensions of delivery ports to be configured with a dental device, wherein the coordinates and the dimensions of the delivery ports are based on periodontal measurements made to the arch of the subject; mapping the coordinates and the dimensions of the delivery ports to the digital 3D imaging model; and directing the 3D printing machine to form the dental device with the delivery ports according the digital 3D imaging model and according to the coordinates and the dimensions of the delivery ports mapped thereto.

In an embodiment, a computer implemented method operable with a CAD/CAM machine is provided. The method comprises receiving and processing coordinates and dimensions of delivery ports to be configured with a dental device, wherein the coordinates and the dimensions of the delivery ports are based on periodontal measurements made to at least one arch of the subject; mapping the coordinates and the dimensions of the delivery ports to a dental device; and directing the CAD/CAM machine to form the delivery ports on said dental device according to the coordinates and the dimensions of the delivery ports mapped thereto.

In an embodiment, a computer implemented method operable with a CAD/CAM machine is provided. The method comprises receiving and processing coordinates and dimensions of delivery ports to be configured with a dental device, wherein the coordinates and the dimensions of the delivery ports are based on periodontal measurements made to at least one arch of the subject; mapping the coordinates and the dimensions of the delivery ports to a digital 3D imaging model of an arch of a subject to generate a dental device, wherein said at least one arch is selected from the group consisting of the maxillary arch and the mandibular arch of a subject, and directing the CAD/CAM machine to form a dental device comprising delivery ports according to the coordinates and dimensions of the delivery ports and according to the digital 3D model.

INCORPORATION BY REFERENCE

All publications, patents, and patent applications mentioned in this specification are herein incorporated by reference in their entireties to the same extent as if each individual publication, patent, or patent application was specifically and individually indicated to be incorporated by reference.

BRIEF DESCRIPTION OF THE DRAWINGS

FIG. 2A shows a healthy tooth and a periodontal dental probe measuring the healthy shallow sulcus; the sulcus is less than 3 mm deep. FIG. 2A shows a healthy attachment. FIG. 2B shows a tooth with periodontal disease. The sulcus measures over 5 mm deep with a dental probe. Bone loss and furcation are visible. FIG. 2B shows an unhealthy example with attachment loss, bone loss and furcation involvement and a periodontally diseased state.

FIG. 19A is an image of a portion of the entire tray shown in FIG. 19B. The delivery tray comprises delivery reservoirs.

The white calcified line distinguished marking at the base of the margin where the tooth meets the tissue that is on the before picture a white defined line across the margin. In the after picture that line is gone.

Figure 23:
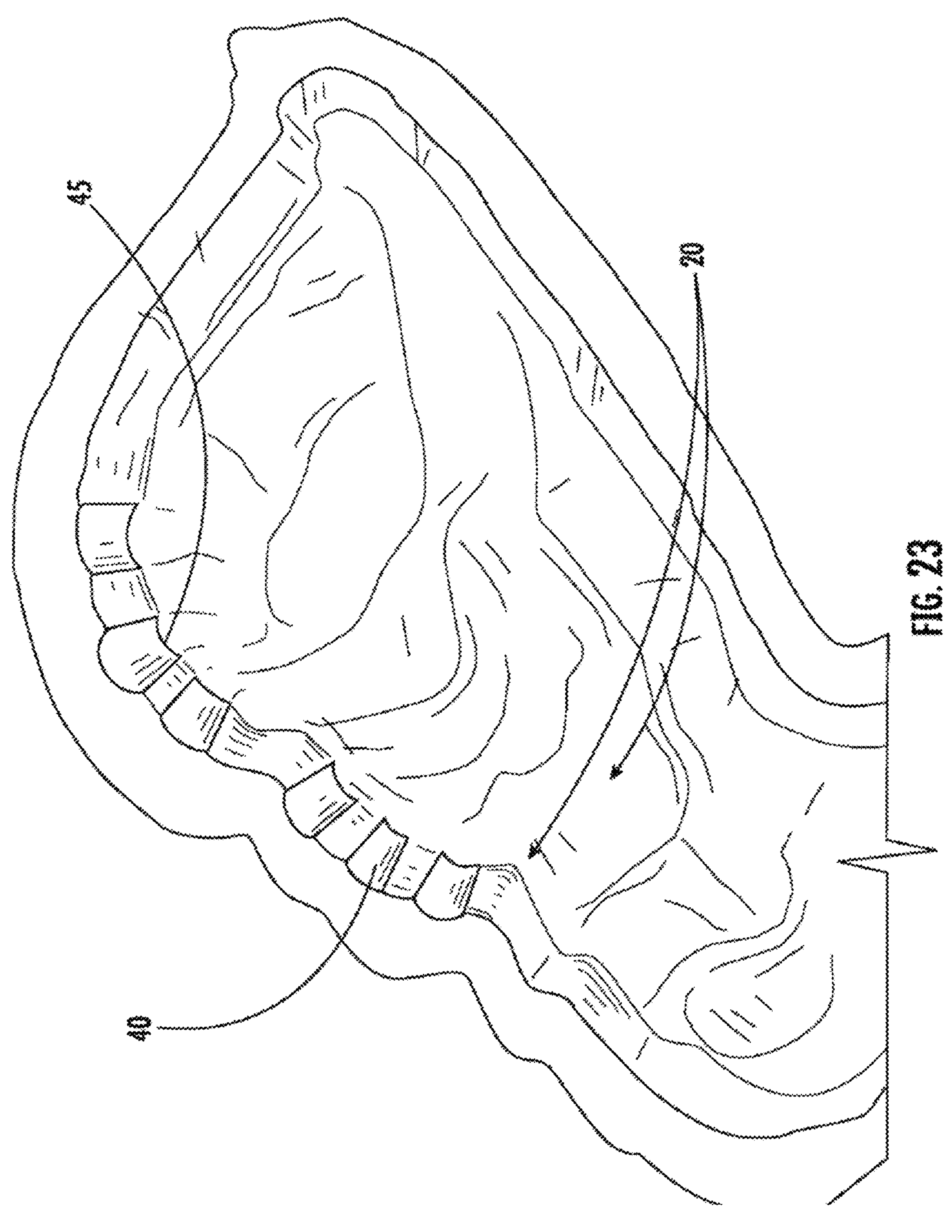

FIG. 23 provides an image of a periodontal tray with wider ports for subjects with advanced periodontal classification. The view shows 6 buccal ports on 2 teeth. Lingual ports may also be present (not shown).

Figure 24:
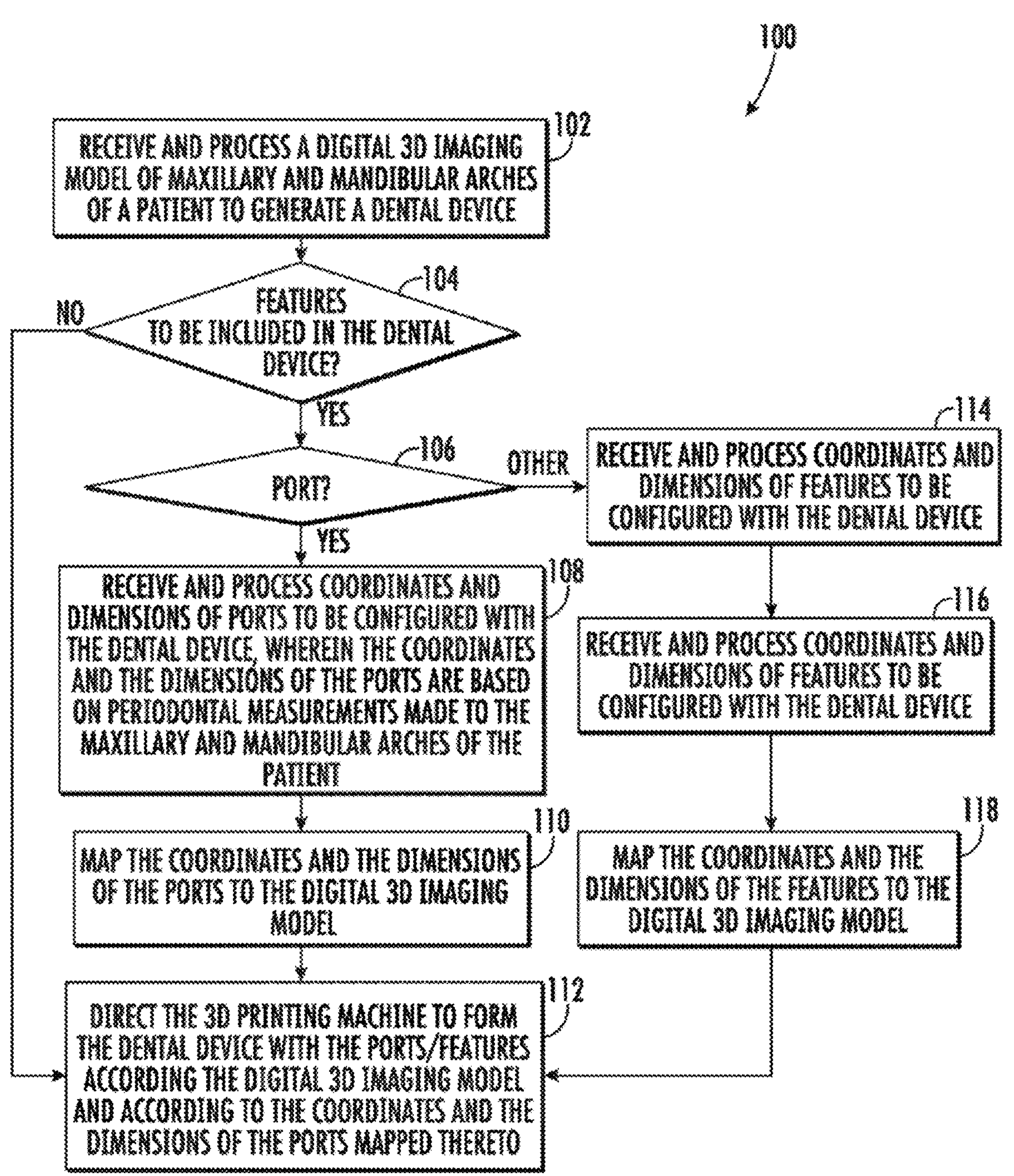

FIG. 24 illustrates an exemplary process for forming a dental device with one or more delivery ports according to the coordinates and dimensions of the delivery ports mapped thereto, wherein the coordinates and dimensions of the ports are based on periodontal measurements made to at least one arch of a subject.

Figure 25:
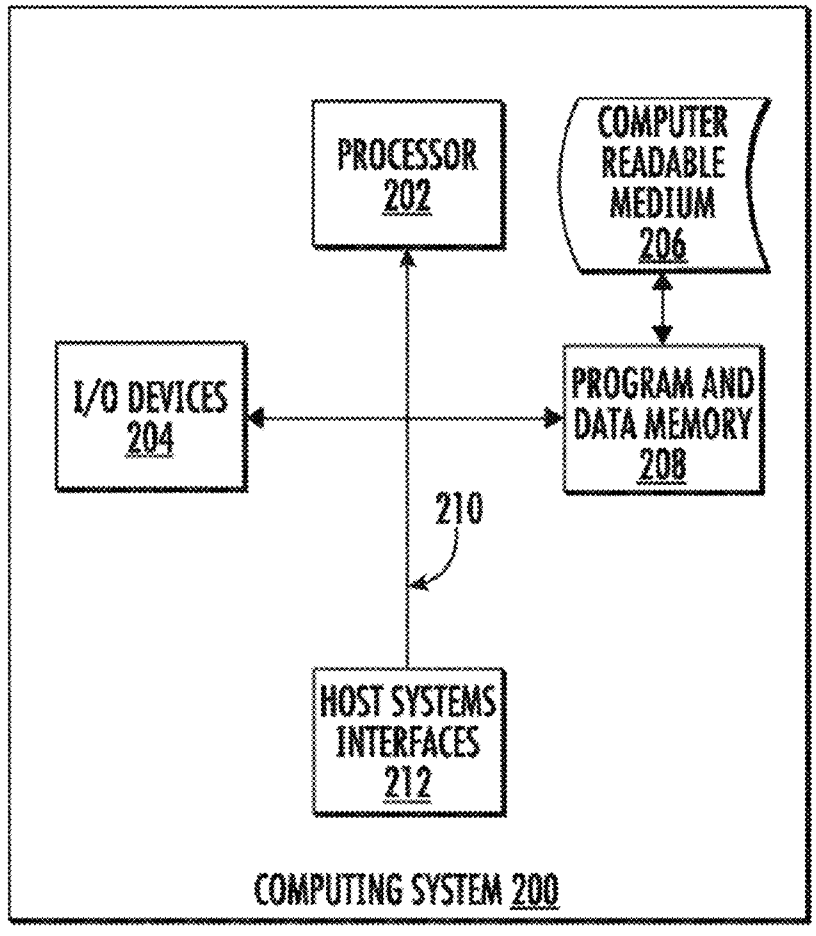

FIG. 25 illustrates a computing system 200 in which a computer readable medium 206 may provide instructions for performing any of the methods disclosed herein.

FIGS. 26A, 26B, 26C, 26D, 26E, 26F, 26G, 26H, 26I, 26J, 26K, 26L, 26M, 26N, 26O, 26P, 26Q and 26R provide radiographic images (Eaglesoft) after treatment of an advanced periodontal case with the oral appliance delivery tray as shown in FIG. 23. Bone regeneration occurred and the implants have been stabilized.

FIGS. 27A, 27B, 27C, 27D, 27E, 27F, 27G, 27H, 27I, 27J, 27K, 27L, 27M, 27N, 27O, 27P, 27Q, 27R, 27S, 27T, 27U, 27V, 27W, 27X, 27Y, 27Z, 27AA provide intra-oral images after treatment of an advanced periodontal case with the oral appliance delivery tray as shown in FIG. 23. The severity of multiple periodontal disease related symptoms has decreased. The improvement in the oral health is significant.

DETAILED DESCRIPTION

The following passages describe different aspects of the invention in greater detail, Each aspect, embodiment, or feature of the invention may be combined with any other aspect, embodiment, or feature the invention unless clearly indicated to the contrary.

Unless defined otherwise, all technical and scientific terms used herein have the meaning commonly understood by a person skilled in the art to which this invention belongs.

Where a range of values is provided, it is understood that each intervening value is encompassed within the invention. The upper and lower limits of smaller ranges may be independently included in smaller ranges and are also encompassed within the application. Certain ranges are presented herein with numerical values being preceded by the term “about”. The term “about” is used herein to provide literal support for the exact number that it precedes as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

“A”, “an”, and “the”, as used herein, can include plural referents unless expressly and unequivocally limited to one referent.

Periodontal disease is a substantial global and national problem. Periodontal disease is believed to increase the risk of or extent of numerous systemic diseases. Over 90 percent of US adults have had a cavity, and 1 in 4 have untreated cavities. There has been no effective treatment for sustainable decreased risk of periodontal disease in patients including, but not limited to genetically predisposed patients, prior to the current application.

The present application provides an oral appliance tray for delivery of a compound to the gingival and/or sub-gingival regions of a patient at risk for periodontal disease. The oral appliance tray provides non-surgical delivery of a compound of interest to the gingival, supra-gingival and/or sub-gingival regions of one or more teeth in the subject’s mouth. Both standard and individualized oral appliance trays are provided. The oral appliance tray may be used in a regimen involving multiple daily uses, daily use, multiple intermittent day use, weekly use, or monthly use. As discussed below herein, an oral appliance tray may be used on the maxillary or mandibular arch of a subject’s oral cavity. In some instances, the oral appliance tray is contoured to fit the subject’s teeth. In some instances, one or more delivery ports in the oral appliance tray are positioned based on measurements obtained from a subject. In some instances, one or more delivery ports are generically positioned to deliver the compound to every pocket depth. Use of the oral appliance tray resulted in a remarkable reduction in periodontal pathogen levels and unexpectedly improved oral health.

Additionally, the oral appliance delivery tray may be used to deliver a compound to treat, prevent or slow the progression of a periodontal disease. Use of the oral appliance tray and compound may result in an altered periodontal disease related symptom. It is recognized that an altered periodontal disease related symptom may be an improvement. It is further recognized that a second, third, fourth or fifth periodontal disease related symptom may not be altered, may be altered in a negative way, or may be improved to a different extent than a first periodontal disease related symptom. The oral appliance delivery tray may be used to maintain oral homeostasis in the soft tissues surrounding one or more implants.

The oral appliance tray provides for delivery of a compound to the gingival, supra-gingival or sub-gingival regions including, but not limited to the sulcus, the pocket, the pocket base, a dentinal tubule, dentinal tubules, structured walls, oral tissues, alveolar bone, the periodontal ligament, the periodontal ligament region, the roots, furcations, an implant and implant base, abutment, fixed restorative crown, bridge margins of restorations, laminates, veneers, composite and amalgam margin restorations, inlays, onlays, natural enamel, natural cementum surfaces, fibers, attached gingiva and unattached gingiva.

By supra-gingival region is intended the region of a tooth that is exposed in a healthy tooth, such as the crown of a tooth. By gingival region is intended the gum region, including one or more regions selected from the group comprising, but not limited to, the sub-gingival region, the sulcus, the periodontal ligament, the periodontal ligament region, the roots, a dental implant area and an implant base. The sub-gingival region is intended to encompass the region beneath the gum, especially between the gums and the basal parts of the crown of the tooth, including but not limited to the sulcus, the periodontal ligament, the periodontal ligament region, the roots, and an implant base.

"Tooth" is intended to encompass naturally occurring hard, bony appendages and non-naturally occurring, hard, manufactured objects in a mouth for mastication of food. Teeth include, but are not limited to, juvenile teeth, adult teeth, dental implants, dentures, bridges, caps, crowns, inlays and on lays, gold, composite and amalgam restorations, surgically implanted teeth, removable replacement abutments and teeth, fillings, and partial dentures. A healthy sulcus is 0 mm to 3 mm in depth without a periodontal probe.

By delivery is intended distribution, placement, exposure, deposition, incubation, conveyance, transport, or supply of a compound to the indicated region. The delivery may occur over a pre-determined duration of time, at pre-determined intervals, or for a pre-determined duration of time at pre-determined intervals. The tray delivers a compound in place without significant alteration to the concentration of the compound. An oral appliance tray may deliver a compound to the gingival, subgingival, or gingival and subgingival region of at least 1 tooth, 2 teeth, 3 teeth, 4 teeth, 5 teeth, 6 teeth, 7 teeth, 8 teeth, 9 teeth, 10 teeth, 11 teeth, 12 teeth, 13 teeth, 14 teeth, 15 teeth, 16 teeth, 17 teeth or more. It is recognized that a veterinary oral appliance delivery tray would conform to the oral structure of the subject animal. It is understood that a veterinary oral appliance delivery tray encompasses a standard oral appliance delivery tray for the non-human mammal species or strain and an individualized veterinary oral appliance delivery tray for a specific subject.

By "subject" is intended any organism with an oral cavity comprising one or more teeth. Subjects may include but are not limited to zoological specimens, veterinary animals, and mammals, including but not limited to, humans, domesticated animals, livestock, pets, equines, bovines, canines, felines, ovines, camelids, swine, caprines, and primates.

In some embodiments, the oral appliance tray is an individualized oral appliance tray personalized to the measurements of one or more of the subject's teeth including, but not limited to a tray in which at least one outlet location is determined by at least one periodontal measurement from a tooth of the subject. The terms "individualized" and "case-specific" are used interchangeably herein. In some embodiments the oral appliance delivery tray is a combination of an individualized tray with the tray fitted according to one or more measurements of one or more of the subject's teeth and universal or standard outlet port placement or position. In some embodiments the oral appliance tray is a standard or universal tray which may be fitted to a patient's mouth or for which a general size may be selected, in either case, the delivery ports are positioned in a general universal fashion.

"Oral appliance tray", "oral appliance delivery tray" and "dental device" are used interchangeably herein. An oral appliance tray 10 for delivery of a compound to the gingival and/or subgingival region of at least one tooth comprises a gasket comprising a supragingival portion 20, a gingival delivery region 30, and one or more delivery ports 40 each comprising an outlet 45 in the gingival delivery region. The device is proportioned to fit either the upper (maxillary) arch, the lower (mandibular) arch of a subject's teeth, or a portion of either arch. The gasket is generally U-shaped and the interior surface is contoured to fit teeth of either the maxillary arch or the mandibular arch. An oral appliance tray may be a mandibular arch oral appliance tray, a maxillary arch oral appliance tray, a partial mandibular arch oral appliance tray, or a partial maxillary arch oral appliance tray. The gasket comprises a supragingival portion that conforms to the teeth and the contoured interior surface provides a reservoir for the compound to be delivered to the gingival or sub-gingival region. The gasket comprises a gingival delivery region with port channels that conforms to the gingival tissue structures. In an individualized oral appliance tray, the supragingival portion conforms to the subject's teeth and the subject's gingival region. In a standard oral appliance tray, the supragingival portion conforms to a standard tooth formation for a particular arch and the gingival delivery region conforms to a standard gingival region.

By "standard" tooth formation and "standard" gingival region is intended the average tooth formation or gingival region obtained from a population of subjects. It is recognized that a standard formation for an adult subject may vary from the standard formation for a juvenile subject; it is also recognized that a standard formation may vary by species.

The gasket comprises one or more delivery ports 40 comprising an outlet 45 in the gingival delivery region. The terms "delivery port" and "port channel" are used interchangeably herein. The outlet or outlets are located in the gingival delivery region and may be positioned in the gasket near the facial, buccal, labial, lingual, palatel, interproximal, vestibular, occlusal sides of a tooth. In an aspect an outlet delivers a compound to a region of a tooth selected from the group comprising the buccal gingival region, buccal subgingival region, buccal supragingival region, facial gingival region, facial subgingival region, facial supragingival region, interproximal gingival region, interproximal subgingival region, interproximal supragingival region, occlusal gingival region, occlusal subgingival region, and occlusal supragingival region. A delivery port may be selected from the group comprising a delivery reservoir and a delivery pore 50 comprising an inlet 55 located in the supragingival region.

An outlet location may be a universal outlet location positioned in a general universal fashion for delivery of a compound to the gingival, subgingival or gingival and subgingival regions. An outlet may be positioned or placed in an individualized outlet location. An individualized outlet location may be determined by at least one periodontal measurement of a tooth from the subject. The position of an outlet may described with one or more coordinates. An individualized outlet location may be determined by multiple periodontal 19 measurements of a tooth from the subject. In some aspects an individualized outlet location may be determined by at least 1, 2, 3, 4, 5, 6, 7, 8, 9, 10, 11, 12, 13, 14, 15, 16, 17, 18, 19, and 20 and up to 198 periodontal measurements of a tooth from the subject. In an aspect, the outlet location is determined by periodontal measurements of six sectors from a tooth of the subjects. If a periodontal measurement of a tooth sector indicates the sector is at risk for periodontal disease, then a delivery port outlet is positioned in the delivery region of the tray in proximity to the sector that is at risk. If a periodontal measurement of a tooth sector indicates the sector is healthy, then the oral appliance tray may not have an outlet in proximity to that sector. If a periodontal measurement of a tooth sector indicates the sector is healthy but adjacent to a sector that is unhealthy, then the oral appliance tray may have an outlet in proximity to the healthy sector. It is recognized different periodontal measurements may be used to determine the location of additional outlets for the same tooth or a different tooth. It is recognized the number of periodontal measurements used to determine outlet location may vary for different outlets on the same individualized oral appliance try. Outlets are located, positioned or situated in the gingival delivery region of the tray to deliver a compound to the gingival, subgingival or gingival and subgingival regions. It is understood that delivery of a compound to one or more dental regions or regions surrounding an implant may comprise delivery of a compound to one or more additional dental regions or regions surrounding an implant.

The dimensions of an outlet of at least one delivery port may vary. In a standard delivery tray, the outlet dimensions may be predetermined to approximately correlate with the intended delivery region. Such an approximation may be based on the measurements from an average group or population of subjects. In an individualized delivery tray, a dimension of an outlet may correlate with at least one periodontal measurement. The outlet height may range from about 0.1 mm to about 60 mm, from 0.1 mm to about 50 mm, from about 0.25 mm to about 50 mm, from about 0.25 mm to about 40 mm, from about 0.3 mm to about 30 mm, from about 0.3 mm to about 25 mm, from about 0.4 mm to about 20 mm, from about 0.5 mm to about 19 mm, from about 0.5 mm to about 18 mm, from about 0.5 mm to about 17 mm, from about 0.5 mm to about 16 mm from about 0.5 mm to about 15 mm, from about 0.5 mm to about 14 mm, from about 0.5 mm to about 13 mm, from about 0.5 mm to about 12 mm, from about 0.5 mm to about 12 mm, from about 0.5 mm to about 11 mm, from about 1 mm to about 20 mm, from about 1 mm to about 19 mm, from about 1 mm to about 18 mm, from about 1 mm to about 17 mm, from about 1 mm to about 16 mm, from about 1 mm to about 15 mm, from about 1 mm to about 14 mm, from about 1 mm to about 13 mm, from about 1 mm to about 12 mm, from about 1 mm to about 11 mm, from about 2 mm to about 20 mm, from about 3 mm to about 20 mm, from about 4 mm to about 20 mm, from about 2 mm to about 15 mm, from about 3 mm to about 15 mm, from about 4 mm to about 15 mm, from about 2 mm to about 12 mm, from about 3 mm to about 12 mm, and from about 4 mm to about 12 mm. In some embodiments, the height may be in the range of 0.25 mm, 0.5 mm, 1 mm, 1.5 mm, 2 mm, 2.5 mm, 2.75 mm, 3 mm, 3.25 mm, 3.5 mm, 3.75 mm, 4 mm, 4.25 mm, 4.5 mm, 4.75 mm, 5 mm, 5.25 mm, 5.5 mm, 5.75 mm, 6 mm, 6.25 mm, 6.5 mm, 6.75 mm, 7 mm, 7.25 mm, 7.5 mm, 7.75 mm, 8 mm, 8.25 mm, 8.5 mm, 8.75 mm, 9 mm, 9.25 mm, 9.5 mm, 9.75 mm, or 10 mm.

The outlet width may range from about 0.1 mm to about 60 mm, from 0.1 mm to about 50 mm, from about 0.25 mm to about 50 mm, from about 0.25 mm to about 40 mm, from about 0.3 mm to about 30 mm, from about 0.3 mm to about 25 mm, from about 0.4 mm to about 20 mm, from about 0.5 mm to about 19 mm, from about 0.5 mm to about 18 mm, from about 0.5 mm to about 17 mm, from about 0.5 mm to about 16 mm from about 0.5 mm to about 15 mm, from about 0.5 mm to about 14 mm, from about 0.5 mm to about 13 mm, from about 0.5 mm to about 12 mm, from about 0.5 mm to about 12 mm, from about 0.5 mm to about 11 mm, from about 1 mm to about 20 mm, from about 1 mm to about 19 mm, from about 1 mm to about 18 mm, from about 1 mm to about 17 mm, from about 1 mm to about 16 mm, from about 1 mm to about 15 mm, from about 1 mm to about 14 mm, from about 1 mm to about 13 mm, from about 1 mm to about 12 mm, from about 1 to about 11 mm, from about 2 mm to about 20 mm, from about 3 mm to about 20 mm, from about 4 mm to about 20 mm, from about 2 mm to about 15 mm, from about 3 mm to about 15 mm, from about 4 mm to about 15 mm, from about 2 mm to about 12 mm, from about 3 mm to about 12 m, and from about 4 mm to about 12 mm. In some embodiments, the width may be in the range of 0.25 mm, 0.5 mm, 1 mm, 1.5 mm, 2 mm, 2.5 mm, 2.75 mm, 3 mm, 3.25 mm, 3.5 mm, 3.75 mm, 4 mm, 4.25 mm, 4.5 mm, 4.75 mm, 5 mm, 5.25 mm, 5.5 mm, 5.75 mm, 6 mm, 6.25 mm, 6.5 mm, 6.75 mm, 7 mm, 7.25 mm, 7.5 mm, 7.75 mm, 8 mm, 8.25 mm, 8.5 mm, 8.75 mm, 9 mm, 9.25 mm, 9.5 mm, 9.75 mm, or 10 mm.

Any outlet dimension may correlate with a periodontal measurement. The correlation may be in the range of 1:1, 1:1.25, 1:1.5, 1:1.75, 1:2, 1:2.5, 1:3, 1:3.5, 1:4, 1:4.5, 1:5, 1:5.5, 1:6, 1:6.5, 1:7, 1:7.5, 1:8, 1:8.5, 1:9, 1:9.5, 1:10, 10:1, 9.5:1, 9:1, 8.5:1, 8:1, 7.5:1, 7:1, 6.5:1, 6:1, 5.5:1, 5:1, 4.5:1, 4:1, 3.5:1, 3:1, 2.5:1, 2:1, 1.75:1, 1.5:1, and 1.25:1. In some aspects, a dimension of an outlet may match a dimension of an area of a tooth at risk for periodontal disease. For example, and without limitation, a periodontal measurement may indicate a depth of 5 mm for a region at risk of periodontal disease, correlating with an outlet height of 5 mm. In some aspects a dimension of an outlet may exceed a dimension of an area of a tooth at risk for periodontal disease. In some aspects, the height and width of an outlet each correlate with at least one periodontal measurement. The height and width of an outlet may correlate with the same periodontal measurement or different periodontal measurements.

In an aspect, the gasket comprises a delivery reservoir. By delivery reservoir is intended a part of an oral appliance delivery tray in which a compound is held. The delivery reservoirs may include but are not limited to an indentation, void, groove, pocket, hollow, trough, depression, slit, aperture or notch. A delivery reservoir may comprise an outlet, particularly an outlet that, when the tray is positioned in a subject's mouth, is adjacent to a gingival, subgingival or gingival and subgingival region of the subject's tooth. In an individualized tray, the dimensions of the outlet correlate with the area of a tooth at risk for periodontal disease as determined by one or more periodontal measurements. When the tray is positioned in a subject's mouth, the delivery reservoir maintains the compound in proximity to the gingival region of one or more teeth.

In an aspect, the gasket comprises one or more delivery pores comprising at least one inlet and at least one outlet.

The terms "delivery pore" and "delivery channel" are used interchangeably herein. The inlet or inlets are located in the supragingival portion of the contoured interior surface. The compound enters the pore via one or more inlets and flows through the delivery pore to one or more outlets in the gingival delivery region. It is recognized that the tray may deliver a compound to one or more regions of one or more teeth or dental implants. In various aspects, the contoured interior surface of the gasket allows flow of the compound throughout the tray and across one or more supragingival surfaces. Thus, it is recognized that the compound is delivered to supragingival surfaces.

A delivery pore or delivery channel is a continuous passage in the gasket of a diameter sufficient to allow a compound to flow through the delivery pore from at least one inlet to at least one outlet. The conformation of the delivery pore may be of any shape including, but not limited to round, rectangular, oval, triangular and polygonal. It is recognized the delivery pore conformation may vary along the length of the pore. In some embodiments, the pores are round; in such cases the pores may be described with terms such as "diameter". In some embodiments, the pores may be described with terms such as height and width. Pore height refers to a dimension of the continuous passage; pore width refers to a second dimension of the continuous passage that is offset from pore height by 90°. Both pore height and pore width are offset from pore length. It is recognized that a delivery pore with a single inlet may have multiple outlets. It is recognized that a delivery pore may have multiple inlets and multiple outlets. It is recognized that a delivery pore with multiple inlets may have a single outlet. It is understood that positioning of the oral appliance tray in a subject's mouth may increase the flow rate of the compound through one or more delivery pores.

The pore length is the distance from an inlet to an outlet. The pore length may range from 0.1 mm up to the full length of any tooth structure including the root, gum and foundational bone. The pore length may range from 0.1 mm to approximately 40 mm, from 0.3 mm to approximately 35 mm, from 0.5 mm to approximately 30 mm, from 0.6 mm to approximately 30 mm, from 0.7 mm to approximately 30 mm, from 0.8 mm to approximately 30 mm, from 0.9 mm to approximately 30 mm, from 1 mm to approximately 28 mm, from 1 mm to approximately 26 mm, from 1 mm to approximately 25 mm, from 0.7 mm to approximately 28 mm, from 0.7 mm to approximately 26 mm, from 0.7 mm to approximately 25 mm, from 0.7 mm to approximately 24 mm, from 0.7 mm to approximately 23 mm, from 0.7 mm to approximately 22 mm, from 0.7 mm to approximately 21 mm, from 0.7 mm to approximately 20 mm, from 0.7 mm to approximately 19 mm, from 0.7 mm to approximately 18 mm, from 0.7 mm to approximately 17 mm, from 0.7 mm to approximately 16 mm, from 0.7 mm to approximately 15 mm, from 0.7 mm to approximately 14 mm, from 0.7 to approximately 13 mm, from 0.7 mm to approximately 12 mm, from 0.7 mm to approximately 11 mm, from 0.7 mm to approximately 10 mm, from 0.7 mm to approximately 9 mm, from 0.7 mm to approximately 8 mm, from 0.7 mm to approximately 7 mm, 0.7 mm to approximately 6 mm, from 0.7 mm to approximately 5 mm, from 0.7 mm to approximately 4 mm, from 1 mm to approximately 3 mm, and from 1 mm to approximately 2 mm. A pore may bend, turn, curve, tilt, or split.

The pore diameter may range from about 0.1 mm to about 60 mm, from 0.1 mm to about 50 mm, from about 0.25 mm to about 50 mm, from about 0.25 mm to about 40 mm, from about 0.3 mm to about 30 mm, from about 0.3 mm to about 25 mm, from about 0.4 mm to about 20 mm, from about 0.5 mm to about 19 mm, from about 0.5 mm to about 18 mm, from about 0.5 mm to about 17 mm, from about 0.5 mm to about 16 mm from about 0.5 mm to about 15 mm, from about 0.5 mm to about 14 mm, from about 0.5 mm to about 13 mm, from about 0.5 mm to about 12 mm, from about 0.5 mm to about 12 mm, from about 0.5 mm to about 11 mm, from about 1 mm to about 20 mm, from about 1 mm to about 19 mm, from about 1 mm to about 18 mm, from about 1 mm to about 17 mm, from about 1 mm to about 16 mm, from about 1 mm to about 15 mm, from about 1 mm to about 14 mm, from about 1 mm to about 13 mm, from about 1 mm to about 12 mm, from about 1 mm to about 11 mm, from about 2 mm to about 20 mm, from about 3 mm to about 20 mm, from about 4 mm to about 20 mm, from about 2 mm to about 15 mm, from about 3 mm to about 15 mm, from about 4 mm to about 15 mm, from about 2 mm to about 12 mm, from about 3 mm to about 12 mm, and from about 4 mm to about 12 mm.

It is understood that the dimensions of each delivery port on an oral appliance tray may differ from each other or be the same. It is recognized that 2 or more delivery ports may have the same dimensions.

The gasket thickness will vary. The gasket may range from 0.03 inches to approximately 0.75 inches thick, preferably from 0.03 inches to approximately 0.5 inches thick. The gasket comprising the supragingival portion and the gingival delivery region is contoured to fit the teeth. A universal oral appliance tray may be contoured to a generalized or average arch.

The contoured interior surface of the gasket of an individualized oral appliance tray may be contoured to fit one or more oral structures selected from the group comprising teeth, interior contours, oral cavity, pocket depth, sulcus, connective tissues, fibers, ligaments, attached gingiva, and unattached gingiva of a subject. Methods of contouring a gasket to fit one or more oral structures are known in the art and may include impressions, molds, manual molds, digital molds, manual impressions, physical model impression, physical model manual impression, digital impressions, CT scan, radiographic scans, and clinical periodontal charting. Methods of fabricating an oral appliance tray are known in the art. Methods of fabricating an oral appliance tray may include, but are not limited to, laser cutting, layer deposition, laser printing, laser deposition, molding, casting and fabrication of manual impressions, casting and fabrication of digitized impressions, Itero digital scanning, CT scans and MRI technologies. The length, depth and width of the tooth pockets in the contoured interior surface complement the length, depth and width of the dental structures in the subject's mouth. Any method of determining the form of the arch of the tooth of a subject known in the art may be used the current methods. Methods of determining the form of the arch of a tooth of a subject may include, but are not limited to, impressions, molds, manual molds, digital molds, manual impressions, physical model impression, physical model manual impression, digital impressions, CT scan, radiographic scans, and clinical periodontal charting.

Figure 16:
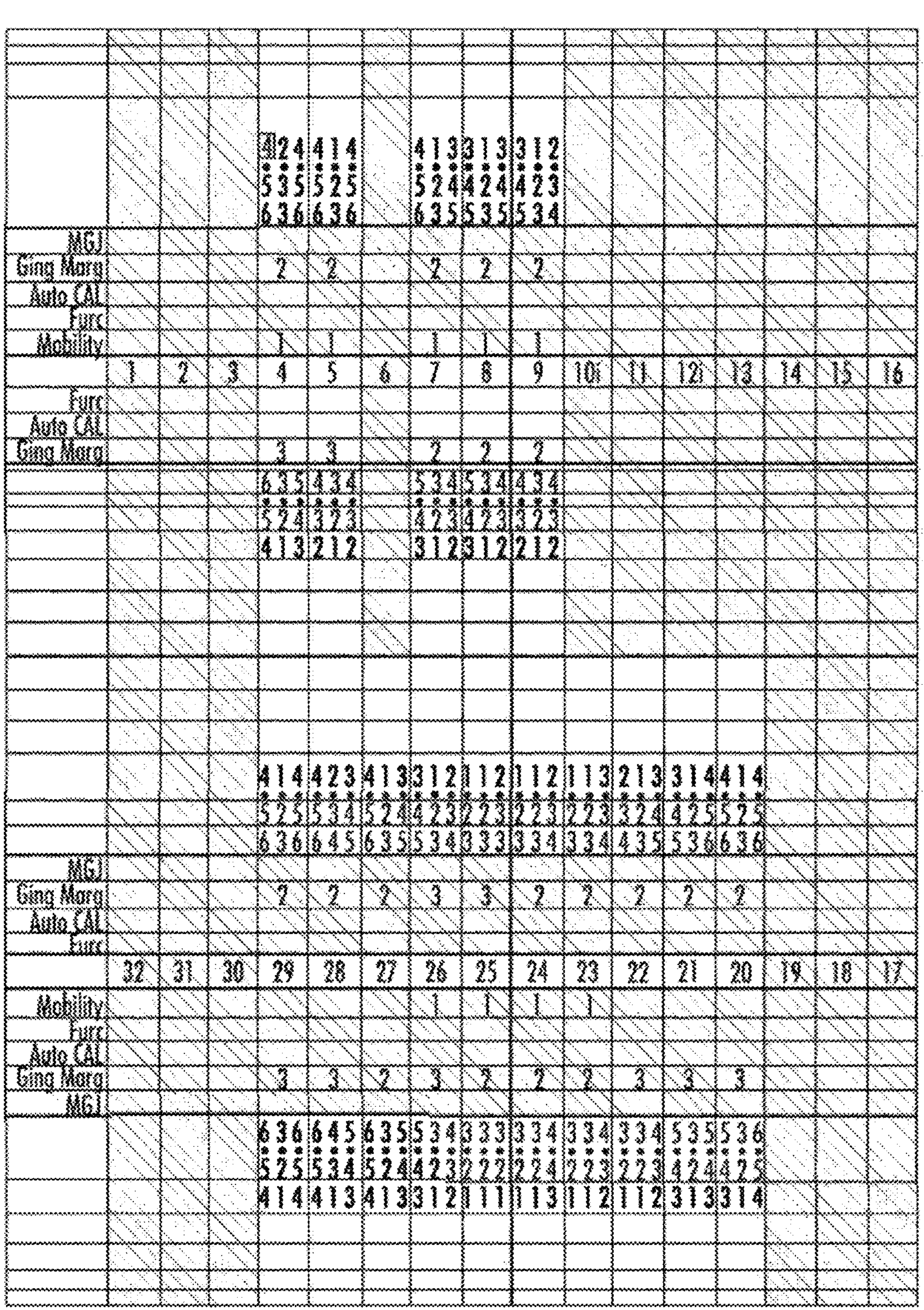
FIG. 16 shows the periodontal chart from subject Case 1 upon initial presentation, at the beginning of treatment and after completion of 30 days of treatment with the oral appliance tray. Note the reduced probing depths after treatment.

Outlet location may be determined by at least one periodontal measurement from at least one tooth. Periodontal measurements include but are not limited to perio-probe measurements, radiographic measurements, and CT scan measurements. Periodontal measurements include but are not limited to measurements of the gingival margin, pocketing depth, plaque measurements, bleeding on probing, furcations, mobility, peri-implant probing depths, peri-implant mucosa, mucosa margins, reconstructive defects, structural defects, clinical attachments, recession, peri-implant recession, alveolar bone loss, secondary bone loss, attachment loss, cementum-enamel junction, gingival hyperplasia, gingival overgrowth, pseudo pocketing depths, margins of the esthetic zones, residual pocketing depths and peri-implantitis. It is recognized that any number of periodontal measurements per tooth or implant may be obtained. In an aspect, six periodontal measurements per tooth or implant are used to determine outlet location. An example of six suitable periodontal measurements is shown in FIG. 16. The outlet location may correspond to a site at risk for periodontal disease based on one or more periodontal measurements. If a periodontal probe measurement is 1-3 mm and the site has no visual indicators of infection or disease, the periodontal site may be considered healthy. If a site has an indicator of infection or disease or the periodontal probe measurement is greater than 3 mm, then the periodontal site may be considered at risk for periodontal disease. In an individualized oral appliance tray, a port outlet may be positioned on a tray such that when the tray is positioned in the oral cavity, the outlet is in proximity to a site at risk for periodontal disease. Thus, an oral appliance tray may have a port outlet in proximity to each periodontal section of at tooth or may have a port outlet in proximity to fewer than each periodontal section of a tooth.

It is recognized that a tooth may be divided into multiple sections when observed from the occlusal aspect. A periodontal measurement may be obtained from each section. It is recognized that a tooth may be divided into many sections, including but not limited to, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 40, 45, 50, 55, 60, 65, 70, 75, 80, 85, 90, 95, 100, 105, 110, 115, 120, 130, 140, 150, 160, 170, 180, 190, 200, 210, 220, 230, 240, 250, 260, 270, 280, 290, 300, 310, 320, 330, 340, 350, 360, or more sections. In some aspects the preferred number of sections is in the range of 1 to 50, in the range of 1 to 25, in the range of 1 to 12, in the range of 2 to 10, in the range of 3 to 9, in the range of 4 to 9, in the range of 4 to 8, in the range of 5 to 8, or in the range of 5 to 7. In some instances, perio-probe measurements are obtained from one or more sections.

A preferred embodiment uses a periodontal measurement from six sites per tooth or implant. Perio Probe Charting: The selection of the six sites per tooth or implant for the measurement of both periodontal pockets and attachment levels is critical. Each tooth or implant is divided into six sections when observed from the occlusal aspect. The site with the deepest periodontal or peri-implant probing depth should be recorded for each section upon probing with the perio-probe. Various embodiments of manufacturing an oral appliance tray may include recording the periodontal measurement at the deepest depth of each of the six sites per tooth with other measured contributing factors including but not limited to angulation of the periodontal probe and fabricating an oral appliance tray with one or more delivery port outlets positioned such that when the tray is positioned in an oral cavity one or more delivery port outlets is in proximity to each segment at risk for periodontal disease. The periodontal probe is inserted along the root surface of the tooth in order to measure the periodontal probing depths. The instrument should be angulated in a mesio-distal direction respectively while keeping it parallel to the long axis of the tooth (avoiding angulations in a buccal-lingual direction). Perio-probing measurements will register documentation including measurements contributing to the gingival margin, pocketing depth, plaque measurements, bleeding on probing, furcations, mobility, peri-implant probing depths, peri-implant mucosa, mucosa margins, reconstructive defects, structural defects, clinical attachments, recession, peri-implant recession, alveolar bone loss, secondary bone loss, attachment loss, cementum-enamel junction, gingival hyperplasia, gingival overgrowth, pseudo pocketing depths, margins of the esthetic zones, residual pocketing depths, peri-implantitis.

For this device we use standard periodontal probe measurements and digital scanning to determine the exact depth and involvement of each periodontal classification required for each periodontally probed tooth and up to the entire full dentition. A complete periodontal examination and evaluation with all terms and descriptions encompasses details of each specified tooth with a minimum of six periodontal probing measurements in the entire maximum dentition including the oral mucosa and oral cavity. It is recognized that periodontal measurements from less than a complete periodontal examination may be used to manufacture an oral appliance delivery tray.

Periodontal probe charting is known in the art. Typically a minimum of six sites per tooth or implant are used. In some embodiments the six periodontal measurements per tooth are the mesial buccal measurement, the direct buccal measurement, the distal buccal measurement, the mesial lingual measurement, the direct lingual measurement and the distal lingual measurement. It is recognized that a periodontal measurement such as the mesial buccal measurement, the direct buccal measurement, the distal buccal measurement, the mesial lingual measurement, the direct lingual measurement and the distal lingual measurement may impact multiple aspects. For example, if a direct lingual measurement indicates the section is at risk for periodontal disease, then a delivery port outlet may be positioned in the direct lingual section. The probing depth of the direct lingual measurement may correlate with a dimension of the delivery port outlet. If a measurement indicates a section is not at risk for periodontal disease, then it may be determined that no outlet is desired in that section, Periodontal probe charting may include assessment of the furcation involvement, tooth mobility, gingival margins, probing depth and attachment level. See for example the Periodontal Chart—Department of Periodontology School of Dental Medicine University of Bern-Switzerland-copyright by www.perio-tools.com. FIGS. 1A, 1B, and 3-8 are based on figures obtained from www.perio-tools.com.

The selection of the six sites per tooth or implant for the measurement of both periodontal pockets and attachment levels is critical. Each tooth or implant is divided into six sections when observed from the occlusal aspect. The site with the deepest periodontal or peri-implant probing depth is recorded for each section. The periodontal probe is inserted along the root surface of the tooth in order to measure the periodontal probing depths. The instrument should be angulated in a mesio-distal direction A or B, respectively while keeping it parallel to the long axis of the tooth (avoid angulations in a buccal-lingual direction). Furcation's of all molars and first premolars of the upper jaw should be assessed with a furcation probe. Furcation involvement is the most difficult aspect for a patient to reach and access and therefore extremely difficult to clean and keep clean. Many periodontal pathogens colonize daily in these areas, and without being limited by mechanism, contribute to increase advanced bone and attachment loss. The horizontal component of probing is graded (0-3) according to the following criteria:

Grade 0=Furcation not detectable

Grade 1=Furcation detectable, with a horizontal component of probing ~3 mm

Grade 2=Furcation detectable, with a horizontal component of probing >3 mm

Grade 3=Furcation is opened through and through

Tooth mobility should be determined using two single-ended instruments and assessed according to the criteria.

Grade 0=Normal (physiologic) tooth mobility

Grade 1=detectable mobility (up to 1 mm horizontally)

Grade 2=detectable mobility (more than 1 mm horizontally)

Grade 3=detectable vertical tooth mobility

The goal of clinical periodontal charting is to record gingival recessions, probing depths, and attachments levels at six sites per tooth or implant in mm. It is typical to round up all the readings measured with the periodontal probe.

At every site, the value for "Gingival Margin" is determined first followed by the measurement of the periodontal "Probing Depth". The "Gingival Margin" is the distance from the clinical gingival margin to any given reference such as, in most cases, the cemento-enamel junction. Crown margins and the margins of restoration should be chosen as a reference provided they are at least 3 mm apical to the cemento-enamel junction (CEJ), otherwise, a virtual reference line should be chosen at the location of the original cemento-enamel junction. The "Probing Depth" is the distance between the gingival margin and the bottom of the gingival sulcus or the periodontal pocket, respectively. The "Attachment Level" for each site is calculated based on the following formula:

Probing Depth (mm)−Gingival Margin (mm)=Attachment Level (mm)

In a healthy periodontium, the cementa-enamel junction is located below the gingival margin and immediately above the attachment level. There is no attachment loss at sites with a healthy periodontium. In this case, both values for gingival margin and probing depth are identical, and the attachment level is 0 mm. At healthy peri-implant sites, the margin of the supra-structure is located somewhat below the margin of the peri-implant mucosa. There is no alveolar bone loss at healthy peri-implant sites. In such cases the attachment level or alveolar bone level can be calculated based on the following formula: attachment level=probing depth−mucosal margin.

In cases of gingival overgrowth or gingival hyperplasia, the cementa-enamel junction may be located far below the gingival margin but still immediately above the attachment level. In such instances the values for the gingival margin and the probing depth may be identical; the attachment level would be 0 mm. Pseudo pockets are pockets of 4 mm and more without attachment loss.

At healthy peri-implant sites, in the esthetic zone, the margin of the suprastructure is located further below the margin of the peri-implant mucosa. There is little or no alveolar bone loss at healthy peri-implant sites in the esthetic zone. In such cases the attachment level or alveolar bone level can be calculated based on the following formula: attachment level=probing depth−mucosal margin. At some diseased sites, the cementa-enamel junction may be located somewhat below or above the gingival margin. The distance between the gingival margin and the bottom of the periodontal pocket is then recorded as the periodontal probing depth. In such cases, the attachment level can be calculated based on the following formula: attachment level=probing depth−gingival margin. Periodontal pockets of >4 mm following active periodontal therapy are also known as residual pockets.

At sites with periimplantitis, the margin of the suprastructure may be located somewhat below or above the margin of the periimplant mucosa. The distance between the mucosal margin and the bottom of the periimplant pocket is then recorded as the periimplant probing depth. The attachment level can be calculated based on the following formula:

attachment level=probing depth−mucosal margins.

Gingival recession is the condition seen when the gingival margin is located apically to the cemento-enamel junction. The value noted as the gingival margin should be recorded as a negative value. The attachment level can be calculated based on the following formula: attachment level=probing depth−gingival margin.

Periimplant recession is the condition seen when the mucosal margin is located apically to the margin of the suprastructure. The value noted as the mucosal margin is recorded as a negative value. In such cases, the alveolar bone (attachment) level can be calculated based on the following formula: Alveolar Bone (Attachment) Level=Probing Depth−Mucosal Margin.

Methods of manufacturing an individualized oral appliance tray are provided. The methods comprise the steps of obtaining at least one periodontal measurement from a tooth of a subject, determining the form of an arch of the teeth of the subject, correlating the position of the outlet of at least one port with at least one periodontal measurement; and forming an individualized oral appliance tray comprising a gasket complementary to the form of the arch of the subject comprising a) a supragingival portion; (b) a gingival delivery region and (c) one or more delivery ports comprising an outlet in the gingival delivery region, wherein said delivery port is selected from the group comprising a delivery reservoir and a delivery port comprising an inlet positioned in the supragingival portion. By "complementary to" is intended a structural inverse, an opposite or verse form; for example, a mold is complementary to its cast.

"Biofilm" and "evening biofilm" are used interchangeably herein. Biofilm formulation occurs continuously throughout the day and night. Biofilm may comprise one or more bacteria from the group comprising Gram-negative bacteria, *Aggregatibacter actinomycetemcomitans, Porphyromonas gingiva/is, Treponema denticola, Tannerella forsythia, Eubacterium nuc/eaturm, Fusobacterium nucleatum, Prevotella intermedia, Campy/obacter rectus, Peptostreptococcus micros, Capnocytophaga* species, *Capnocytophaga gingiva/is, Capnocytophaga ochracea, Capnocytophaga sputigena, Eikenella* species, *Lactobacillis* species, *Streptococcus mutans, Streptococcus sobrinus*, and *Streptococcus* species. Biofilm may contribute to solid compounds of biofilm, soft plaque, hard calcified plaque, tartar, calculus, intrinsic stains, extrinsic stains, increased crevicular fluid, altering pH levels contributing to disease, acidic salivary compounds, lipopolysaccharides or (LPD), fermented carbohydrates, or increased collagenase.

Subjects at risk for periodontal disease may include but are not limited to subjects with a high degree of caries, early stages of periodontal disease, subjects with dental implants, subjects older than 30 years, subjects with a history of poor home dental hygiene, subjects with a history of periodontal disease, subjects with a family history of periodontal disease, subjects with a predisposing IL-l polymorphism, subjects with a predisposing IL-2 polymorphism, subjects with a predisposing IL-6 polymorphism, the presence of the thymine base at the position 4845 of ILIA and position 3954 at ILlB, high dietary intake of fermentable carbohydrates, diabetes mellitus, smoking, chewing tobacco and snuff-like product use, subjects with a biological marker of disease, subjects with a history of impoverished conditions, a subject at risk for demineralization, a subject at risk for caries, a subject at risk for bleeding upon probing, a subject at risk of inflammation or degeneration, a subject at risk for an increase in actinomyces and aerobic cocci biofilm accumulation, a subject in need of pre-operative bacterial treatment, a subject in need of post-operative bacterial treatment, a subject at risk for pre-operative sensitivity, a subject at risk for post-operative sensitivity, a subject at risk for dental discomfort, a subject at risk for phagocytosis, a subject at risk for hyper-responsive phagocytosis, a subject at risk for hyper-production of interleukins, prostaglandins and cytokines, a subject at risk for uncontrolled colonizing of anerobic gram-negative bacterium, a subject at risk for endotoxins, a subject at risk for increased crevicular fluid, a subject at risk for increased acidic salivary production, a subject with a risk for increase in C-Reactive protein (CRP) levels, negative auto-immune response, increased degenerative biofilm markers, increase in lipopolysaccharides, hypo-responsive phagocytes, hyper-production of interleukins, an increased prostaglandin level, increased cytokine, increased systemic levels of acute phase proteins, increased plasma antibody levels, increased coagulation factor, increased total white blood cell count, increased neutrophils, increased INF-γ, increased TNF-α, increased IL-1β increased IL-2, increased IL-6, osteoclastic activity, bone loss, foundational bone loss, structural bone loss, disrupted oral tissues, root and dentinal exposure, thinning or worn away enamel or dentin, bruxism, increased thick mucus, increased biofilm formation, decreased salivary production and hypersensitivity. a subject at risk for an oral or systemic auto-immune response, a subject at risk for peri-implantitis, a subject at risk for implant or multiple implant failure, a subject at risk for chronic xerostomia, a subject at risk for halitosis, a subject at risk for a decrease in PH levels, a subject at risk for a systemic disease, and a subject at risk for an effect from medications from chronic disease.

A subject exhibiting a biological marker of disease is a subject exhibiting at least one biological marker of disease. Biological markers of disease include, but are not limited to, increased lipopolysaccharides, hypo-responsive phagocytes, hyper-production of interleukins, an increased prostaglandin level, increased cytokine, increased systemic levels of acute phase proteins, increased plasma antibody levels, increased coagulation factor, increased total white blood cell count, increased neutrophils, increased INF-γ, increased TNF-α, increased IL-1β, increased IL-2, increased IL-6, increased C-reactive protein, and decreased pH levels.

Dental implants are unprotected from food debris, soft plaque, hard calcified plaque, debris accumulation, calculus formation, and biofilm formation. Dental implants may experience electrochemical degradation, corrosion, release of biotoxin or bio-toxic ions into the oral cavity and altered PH levels. Thus, dental implants become a risk for periodontal disease.

Figure 11:
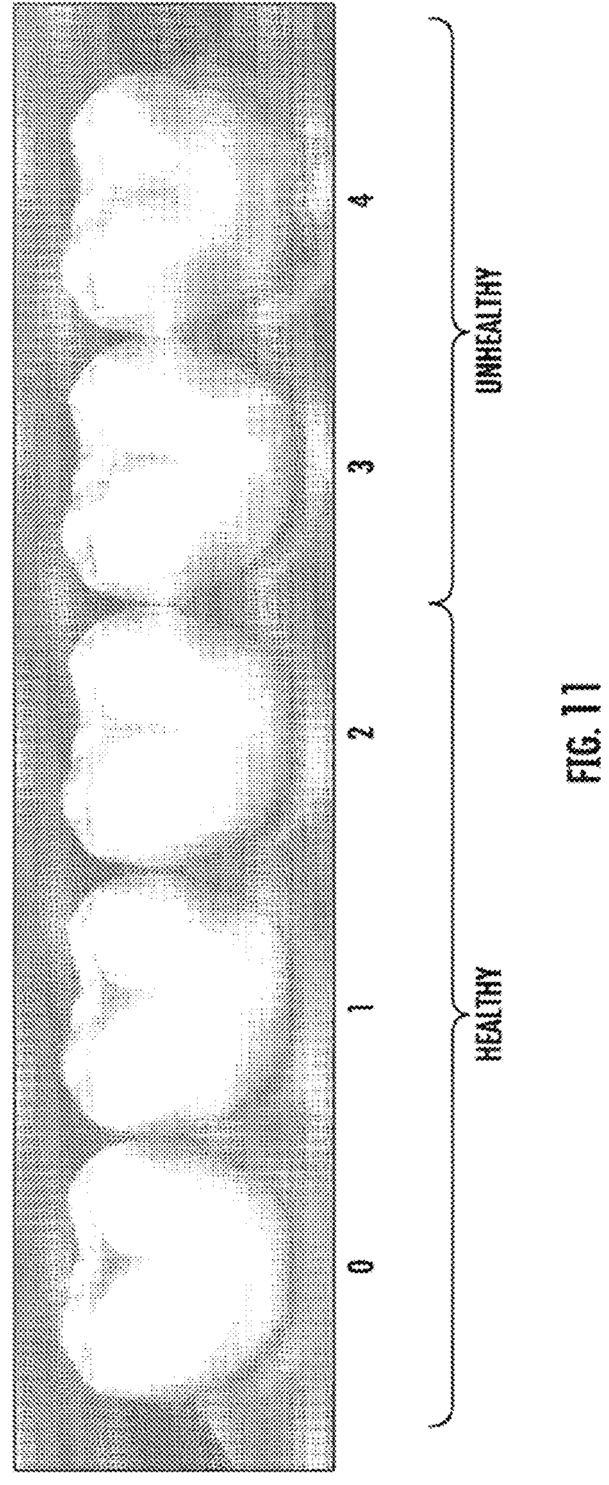
FIG. 11 provides a depiction of the progression from healthy tissue to unhealthy periodontal disease tissue.

Periodontal disease may be classified in different stages based on varying physical characteristics and clinical criteria. Some clinical criteria and stages of periodontal disease are described in Table 1. Clinical criteria include, but are not limited to, bleeding on probing (BOP), and probe depth greater than 3 mm. Probe depth greater than about 3 mm suggests periodontal disease of some type. A progression from health to unhealthy stages is shown in FIG. 11. As the periodontal disease progresses, PH levels in the gingival, sub-gingival and/or supra-gingival regions may decrease. Without being limited by mechanism, the lower pH levels, higher crevicular fluid flow and lower redux present in advancing periodontal disease may result in oxidative reduction and lower oxygen concentration suitable for gram-negative bacterial growth. Again, without being limited by mechanism, restoring the pH level to health levels may decrease the risk of periodontal disease related symptoms.

TABLE 1

Clinical Criteria Assigned to Periodontal Case Types of Health, Gingivitis, Chronic Periodontitis and Aggressive Periodontitis

| Case Type | PD (mm) | BOP (Yes/No) | Bone Loss (%) | Mobility (Grade) | Furcations (Grade) | CAL (mm) | Visual Inflammation |
|---|---|---|---|---|---|---|---|
| 0 (Health) | 0-3 | No | 0 | None | None | 0 | No |
| I (Gingivitis) | 0-4 | Yes | 0 | None | None | 0 | Yes (localized or generalized)' |
| II (Slight Chronic Periodontitis)" | 4-5 | Yes | 10 | I | 1 | 1-2 | Yes (localized generalized)' |
| III (Moderate Periodontitis) t | 5-6 | Yes | 33 | I and II | 1 and 2 | 3-4 | Yes (localized generalized)' |
| IV (Severe Periodontitis) t | ;:::6 | Yes | >33 | I, II, or III | 1, 2, 3, or 4 | ;::: 5 | Yes (localized generalized)' |
| V (Aggressive) | ;:::6 | Yes | >33 | I, II, or | 1, 2, 3, or 4 | ;::: | Yes (localized generalized) |

Periodontal disease includes, but is not limited to, peri-implantitis, implant failure, root decay, periodontal abscesses, gum infections, pyorrhea, halitosis, xerostomia, gingivitis, inflammation, disrupted oral tissues, caries, and tooth decay.

Periodontal disease may lead to complications such as furcation involvement, furcation invasion, bleeding upon probing, bleeding, degeneration of bone formation, foundational bone loss, and structural bone loss.

By "furcation involvement" and "furcation invasion" is intended an area of bone loss at the branching point of a tooth root. Furcation involvement may lead to tooth loss.

Peri-implantitis is an infection in the region surrounding a dental implant. Peri-implantitis may lead to implant failure and even removal of implants.

Periodontal disease related symptoms are known in the art. Periodontal disease related symptoms include but are not limited to furcation involvement, decalcification, furcation invasion, redness, bleeding upon probe, soreness, pain and increased inflammation, increased probe depth, sensitivity, temperature sensitivity, calculus deposition, plaque formation, soft plaque formation, increased biofilm formation, soft tissue loss, alveolar bone loss, periodontal abscesses, pellicle formation, inflammation, localized inflammation, systemic inflammation, colonization by anerobic gram-negative bacteria, an increased endotoxin level, decreased salivary production, acidic salivary formulation, increased crevicular fluid, increase in C-reactive protein level (CRP), negative auto-immune response, increased degenerative biofilm markers, phagocytosis, increase in lipopolysaccharides, hypo-responsive phagocytes, hyper-production of interleukins, an increased prostaglandin level, increased cytokine, increased systemic levels of acute phase proteins, increased plasma antibody levels, increased coagulation factor, increased total white blood cell count, increased neutrophils, increased INF-γ, increased TNF-α, increased IL-1β, increased IL-2, increased IL-6, osteoclastic activity, bone loss, foundational bone loss, structural bone loss, disrupted oral tissues, root exposure, thinning enamel, worn-away enamel from bruxism, worn-away dentin, increased thick mucus, increased biofilm formation, decreased salivary production and hypersensitivity. A segment of a tooth is at risk for periodontal disease if one or more periodontal disease related symptoms are present in that segment of a tooth or if one or more periodontal disease related symptoms are present in an adjoining or adjacent segment. The terms "segment", "section", "portion", and "division" may be used interchangeably herein.

An improved periodontal disease related symptom may include but is not limited to re-mineralization, increased barrier into the dentinal tubules, decreased sensitivity, decreased temperature sensitivity, decreased probing depths, reduced bleeding upon probing, decreased crevicular fluid, increase in PH levels and decreased formulations of biofilm and the presence of degenerative pathogens and biological markers contributing to disease and the disease process.

Improved periodontal health may reduce the risk of one or more conditions related to periodontitis or poor periodontal health. Conditions related to periodontitis or poor periodontal health include, but are not limited to, cardiovascular diseases, stroke, arterial sclerosis, respiratory infections, lung disease, ear nose and throat infections, dementia, brain diseases, Alzheimer's disease, pre-mature birth, pre-term birth rate, pregnancy complications, oral cancer, cancers, diabetes, auto-immune disorders, bone and joint disease, arthritis, rheumatoid arthritis, gastrointestinal tract disease, erectile dysfunction, obesity, gut biome disruptions, impaired gut barrier function, altered gut immune profile, non-alcoholic fatty liver disease (NAFLD), fibrosis, endotoxemia, low grade inflammation, medium grade inflammation, high grade inflammation, bacteremia inflammatory mediators, dysbiosis, severe osteopenia, osteoporosis, candida, viral disease, Sjogren's disease and men and women's health issues.

A compound may be any compound suitable for use in dental care. A compound suitable for use in dental care includes but is not limited to a compound for caries risk control, plaque control, biofilm control, oral pH level maintenance, oral pH level correction, oral pH level stabilization, periodontal disease prevention, periodontal disease progression inhibition, dental implant maintenance, reconstructive dentistry maintenance, fixed prosthesis maintenance, osseous resective surgical maintenance, scaling and root planing maintenance, pocket depth reduction surgical maintenance, bone grafting maintenance, connective tissue grating maintenance, free tissue graft maintenance, connective tissue and pedical tissue graft maintenance, bleaching, whitening, or intrinsic and extrinsic staining maintenance.

Compounds suitable for use in dental care include, but are not limited to, a fluoridated medicament, ACP, amorphous calcium phosphate, an oxygenating medicament, a fluoridated gel, re-mineralizing compound, analgesic, hydrogen peroxide base oxidizing gel, doxycycline/vibromycin liquid solution, antimicrobial agents, chlorhexidine gel, amorphous calcium phosphate/soluble phosphate, pH regulated calcium salts, calcium hydroxide paste, doxycycline gel, osteoblast promoting agents, minocycline, HCI, antibiotics, desensitizing compounds, oxygenating agents, anti-plaque agents, essential oils, hydrogen peroxide, baking soda, xylitol, oral therapeutics and anti-anxiety agents.

Oxygenating agents include, but are not limited to, hydrogen peroxide liquid, oxidizing gel solution, oxidizing gel paste, hydrogen peroxide liquid paste, and pastes to oxidize supra-gingival and subgingival accumulations of bacteria and pathogens, forms of paste to oxidize supra-gingival and subgingival accumulations of all destructive and degenerative gram-negative and even some gram positive bacteria and pathogens contributing to gingivitis, periodontal disease, bleeding, inflammation and disrupted oral tissues compromised by the presence of gram-negative and gram positive pathogens and bacteria disrupting in a destructive manner the oral flora, oral pathology and surrounding tissue and tooth structures encompassing all tooth structures and also with all surrounding structures of a single dental implant or multiple implants and reconstructive fixed and removable dental crown and bridge prosthesis, surgical stainless steel, titanium, ceramic, zirconia, and gold structures with and without implant abutments and natural tooth structure abutments. Contributing also to the increased osteoblastic activity causing disruptions to osteoclastic activity resulting in the degeneration of bone formation and causing irreversible foundational and structural bone loss.

Antimicrobial agents include, but are not limited to, chlorhexidine solutions, locally delivered antimicrobial agents (LOA), LOA including minocycline monospheres, doxycycline hyclate in an absorbable polymer, chlorhexidine in a gelatin matrix, soluble phosphate, calcium salts, metal salts, Sn-II, Zn-II, oxidizing salt, iodine, povidone iodine, baking soda, vitamin C, charcoal, gly-oxide, essential oils, tea tree oil, arnica, hydrated silica, xylitol, calcium carbonate, zinc citrate, sodium cocoyl, erthirto, peppermint oil, coconut oil, tee tree oil, and antimicrobial agents to decrease the presence of degenerative biofilm, gram-negative or gram-positive pathogens.

Anti-plaque agents may include, but are not limited to, bleaching agents, fluoride, dichloride, sodium monofluorophosphate, sanquinria, antiseptic cleanser, antiseptic rinses, hydrochloride, hydrogen peroxide, sodium chlorite, oxygene and xylitol.

Antibiotic agents include, but are not limited to, doxycycline, minocycline microspheres, doxycycline hyclate in an absorbable polymer, vibromycin, tetracycline, tetracycline hydrochloride, minocycline, clindamycin, amoxicillin, ciprofloxacin, digoxin, floxacillin, levofloxacin, clarithromycin, pre-biotics, pro-biotics, and antibiotic solutions to decrease the present of gram-negative and/or gram positive pathogens.

Desensitizing agents and re-mineralizing agents include, but are not limited to, ACP, amorphous calcium phosphate, sodium fluoride, sodium fluoride gel, fluoride ion, stannous fluoride, hydroxide ion, calcium carbonate, glycerin, potassium phosphate, potassium and sodium nitrate, sodium saccharine, tincture myrrh, hydrated silica, calcium ions, phosphate ions, insoluble calcium compounds, amino acids, arginine bicarbonate, fluoridated agents, and mineralizing agents. Amorphous calcium phosphate (ACP) may be used for remineralization, insulation and therapeutic use for sensitivity, decalcification, root exposure, dentinal tubules, thinning enamel, worn away enamel and dentin from bruxism, erosion, gingival recession, gingivectomy, osseous resective surgery, surgical removal of infected tissues, surgical removal of infected bone, effects from bleaching/whitening tooth structures, scaling and root planning, surgical procedure effects, hypersensitivity and normal wear and tear and surface breakdown of compromising tooth structures of one or more teeth. It is recognized that minerals including, but not limited to, fluoride may be incorporated into the hydroxyapatite crystals of teeth forming mineral hydroxyapatite. Without being limited by mechanism, hydroxyapatite crystals and mineral hydroxyapatite may increase the resistance of teeth to acid attack, occlude dentinal tubules decreasing sensitivity and strengthening dentinal structures. Mineralizing agents to manipulate the pH to healthy levels and designed to control pH conditions in the base of the sulcus and/or to surrounding oral tissues for healthy sustainable levels and increased, manageable or improved homeostasis.

Oral therapeutics for opening nasal passages or clearing congestion may include but are not limited to camphor, menthol, oil of eucalyptus, cedarwood oil, cedar leaf oil, nutmeg, thymol and peppermint oil. Oral therapeutics for opening nasal passages or clearing congestion may be in a formulation selected from the group comprising liquid forms, gel and paste form. The congestion may be from mask wearing or other respiratory ailment. Oral therapeutics for anxiety or stress are encompassed.

The anxiety or stress may be present for any reason including, but not limited to oral sensitivity, acute pain, chronic pain and muscle spasm from temporomandibular joint (TMJ) disorders, discomfort from any form of above mentioned dental procedures and dental issues, lack of restorative dentistry, restorative work needed, lack of availability for hygiene treatments and restorative dentistry, dental phobias, dental fear and prior bad experiences from dental visits causing need for a therapeutic delivery of anti-anxiety and medicating therapeutics from holistic and organic sources in nature. Anti-anxiety agents may include, but are not limited to, hemp oil, hempseed oil, tetrahydrocannabinol (THCL cannabidiol, cannabinol, tetrahydrocannabivarin, and the flower and/or fruit of Cannabis sativa, Cannabis indica, and Cannabis ruderalis. Hemp oil may include a 3:1 ratio of omega-6 to omega-3 essential fatty acid. Hempseed oil may comprise about 76% polyunsaturated fat, about 5% to about 11% monounsaturated fat, and about 5% to 7% saturated fat. Hempseed oil may comprise omega-6 fatty acids such as linolic acid and gamma-linolenic acid and omega-3 fatty acids such as alpha-linolenic acid (ALA) and stearidonic acid. Both LA and ALA are essential fatty acids. In addition, hempseed oil contains 5%-11% monounsaturated fat and 5%-7% saturated fat. In common with other oils and fats, hempseed oil provides 9 kcal/g and can be used in liquid form to ease and comfort oral sensitivity, pain and discomfort. Hempseed oil may reduce dental anxieties, phobias and fears via application to the oral mucosa.

The compound may alleviate, improve, diminish, decrease, prevent, or lessen at least one periodontal disease related symptom, discomfort from oral sensitivity, acute pain, chronic pain, muscle spasm from temporomandibular joint (TMJ) disorders, discomfort or sensitivity associated with dental work, open nasal passages or reduce congestion.

By "maintenance compound" is intended a compound that decreases the risk of implant failure or periodontal disease. Maintenance compounds may include, but are not limited to, anti-plaque agents, oxygenating agents, anti-septic agents, anti-microbial agents, antibiotic agents, and desensitizing agents. Dental implant failure may occur at any point during the implant lifetime. Clinical indicators of dental implant failure include, but are not limited to, (1+) mobility, inflammation, redness, bleeding, peri-implantitis (infection or abscess purulence around the implant), bone loss greater than 1.0 mm in the first year, or bone loss greater than 0.2 mm a year after implant.

A compound may occur in a variety of formulations including, but not limited to, an aqueous solution, a gel, a foam, an ointment, an oil, paste, polymer, a powder suspended in solution, gel, foam, oil, polymer or paste, powder and other formulations known in the dental arts. It is recognized the viscosity of the formulation may affect the appropriate diameter of a delivery pore of an oral appliance delivery tray. It is recognized the viscosity of the formulation may affect the flow rate of the compound through the pores in the oral appliance tray. It is also recognized that it may be preferable to use a medium viscosity or high viscosity formulation for an oral appliance tray for delivery of a compound to the gingival or subgingival region of a tooth on the lower arch.

The flow rate of the compound may impact the preferred duration of delivery. Suitable durations of delivery may include but are not limited to about 15 seconds, 30 seconds, 1 minute, 2 minutes, 3 minutes, 4 minutes, 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes, 2 hours, 2.5 hours, 3 hours, 4 hours, 5 hours, 6 hours, 7 hours, 8 hours, 9 hours, 10 hours, 11 hours, 12 hours, 15 hours, 18 hours, 21 hours, 24 hours, 2 days, 3 days, 4 days, 5 days, 6 days, 7 days, 2 weeks, 3 weeks, 4 weeks, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months or more. It is further recognized that duration of treatment may change during the course of treatment. For example, early treatment may involve a longer duration than a later treatment. Alternatively, later treatment may involve a longer duration than an earlier treatment. Suitable frequency of delivery may include but is not limited to hourly, 6 times daily, 5 times daily, 4 times daily, 3 times daily, 2 times daily, daily, alternate days, three times a week, weekly, monthly, and yearly. It is further recognized that frequency may change during the course of treatment. For example, early treatment may involve a higher frequency while later treatments may be less frequent.

It is recognized that a compound may be placed, positioned, deposited, loaded, disposed, provided, applied, or pre-loaded into an oral appliance tray. An individual, dental health professional or manufacturer may place the compound in an oral appliance delivery tray. A prefabricated tray comprises an oral appliance delivery tray and a compound of interest pre-loaded into the oral appliance tray by the manufacturer. A prefabricated tray may comprise a pre-determined dose of a compound of interest. Pre-fabricated trays may deliver a compound for use in altering oral pH levels, restoring oral homeostasis, altering caries risk, de-sensitizing, re-mineralizing, altering gum sensitivity, halitosis, xerostomia, guided biofilm therapy, anti-microbial, antiseptic, anti-plaque, pain, discomfort, oral therapy, alleviating TMJ, or periodontal disease. A prefabricated tray comprising an oral appliance delivery tray and a compound of interest may be a single use tray. It is understood that providing a compound in an oral appliance tray encompasses placing, positioning, depositing, loading, applying or pre-loading a compound in a tray.

Dental care procedures include, but are not limited to, gingival recission, gingivectomy, osseous resective surgery, surgical removal of infected tissues, surgical removal of infected bone, bleaching/whitening procedures, scaling, root planning, reconstructive and restorative dental procedures. Reconstructive and restorative dental procedures include, but are not limited to, surgically placed titanium abutment core implants, 3-unit semi-precious metal fused to porcelain titanium implant bridges, semi-precious metals fused to porcelain crowns, bonding composite restorations, semi-precious metal fused to porcelain cantilever fused crowns, endodontic root canal procedures with semi-precious metals fused to porcelain crowns, and fixed and removable dental crown and bridge prosthesis, implants with and without abutments and natural tooth structure abutments. Dental materials may include, but are not limited to stainless steel, surgical stainless steel, titanium, ceramic, zirconia, silver or amalgam, artglass, composite, porcelain and gold. Dental implants provide an increased risk of periodontal disease. Dental implants lack periodontal ligaments. Without being limited by mechanism, the absence of periodontal ligaments (PDL) may be a factor in the increased risk of periodontal disease that occurs in patients with dental implants.

The gasket comprises a material suitable for oral use. Materials suitable for oral use are known in the art. Materials suitable for oral use include, but are not limited to, a biocompatible non-toxic polymer, polyacrylates, polyamide-imide, phenolic, nylon, nitrile resins, petroleum resins, fluoropolymers, copolyvidones (copovidones), epoxy, melamine-formaldehyde, diallyl phthalate, acetal, coumarone-indene, acrylics, acrylonitrile-butadiene-styrene, alkyds, cellulosics, polybutylene, polycarbonate, polcaprolactones, polyethylene, polyimides, polyphenylene oxide, polypropylene, polystyrene, polyurethanes, polyvinyl acetates, polyvinyl chloride, poly(vinyl alcohol-co ethylene), styrene acrylonitrile, sulfone polymers, saturated or unsaturated polyesters, urea-formaldehyde, ethylene vinyl acetate, poly(meth)acrylic acid, polyamides, copolymers, and combinations or mixtures thereof. Preferred polymers may have a low melting point. The thermally formable plastics or polymers may be optionally modified with a plasticizer or any durometer adjusting substance. A plasticizer may be added to adjust the softness, pliability or compressibility of the gasket. In various aspects, the gasket material is a compressible, non-porous material. In some aspects, the gasket comprises a non-biodegradable material. In some embodiments, the oral appliance further comprises an outer layer. In various embodiments the outer layer may be more resistant to compression, rigid, stiff or a combination thereof.

Methods of reducing the amount of one or more bacteria in the gingival region of a subject at risk for periodontal disease are provided. The methods comprise delivering a compound selected from the group comprising oxygenating agents, antimicrobial agents, antibiotic agents, anti-caries agents, maintenance agents, and remineralizing compounds to a subject using an oral appliance tray of the application. Bacteria include, but are not limited to, Gram negative bacteria, Aggregatibacter actinoymycetemcomitans, *Porphyromonas gingiva/is, Treponema dentico/a, Tannerella forsythia, Eubacterium nucleatum, Fusobacterium* species, *Fusobacterium nucleatum, Prevotella* spp, *Prevotella intermedia, Campy/obacter* spp., *Campy/obacter rectus, Peptostreptococcus micros, Streptococcus* species, *Streptococcus mutans, Streptococcus sobrinus, Lactobacillus* species, and *Eikenella* species. Methods of reducing the amount of one or more bacteria in the gingival region of a subject may comprise providing a compound according to a delivery regimen comprising one delivery event or multiple delivery events. A delivery event may have a pre-determined duration. Multiple delivery events may have a pre-determined frequency or a pre-determined frequency and duration. It is recognized that the pre-determined frequency and pre-determined duration may vary over multiple delivery events. An oral appliance tray of the current application may provide a compound at a pre-determined frequency and duration to provide guided biofilm therapy.

Methods of analyzing the amount of one or more bacteria in the gingival region of a subject are known in the art. Any method of analyzing the amount of one or more bacteria in the gingival region of a subject may be used in the methods. Methods of analyzing the amount of one or more bacteria in the gingival region of a subject may include, but are not limited to, saliva collection and culture, saliva staining, PCR, NGS, antibody staining, immunological methods, antibody screens, antibody tests, culture growth, and labelled primer binding.

A dental implant maintenance device comprising an oral appliance tray for delivery of a maintenance compound to a dental implant base region, wherein said oral appliance tray comprises a gasket comprising a supragingival portion, a gingival delivery region and one or more delivery ports comprising an outlet in the gingival delivery region, wherein said delivery port is selected from the group comprising delivery reservoirs and delivery pores comprising an inlet located in the supragingival portion is provided.

Methods of managing biofilm in a subject are provided. The methods comprise providing a compound in an oral appliance tray, positioning the oral appliance tray comprising the compound in a subject's mouth and maintaining the oral appliance try in position in the subject's mouth for a predetermined duration and frequency. By "managing biofilm" is intended altering the biofilm accumulation rate. Altering the biofilm accumulation rate comprises reducing, eliminating, preventing, diminishing or decreasing of amount of biofilm or slowing, reducing, diminishing, or decreasing the rate of biofilm formation. Methods of determining the biofilm accumulation rate are known in the art and include, but are not limited to, plaque index measurements, biomolecular staining, staining, image analysis, polymerase chain reaction (PCR) testing, biofilm diagnostics, quantitative PCR (Q-PCR), and gram stain analysis.

Methods of identifying bacteria present in the oral cavity are known in the art and described below herein. Any method of identifying present in the oral cavity known in the art may be used in the methods. It is recognized that some assays are preferred for particular uses; one skilled in the art would select an appropriate assay. Biofilm Diagnostics Q-PCR (Quantitative Polymerase Chain Reaction) technology identifies bacteria present in the oral cavity. Q-PCR is a specific, sensitive, and quantitative method of accurately measuring the number of targeted species within an individual oral biofilm, as this method is able to detect even a single bacterial cell.

Q-PCR technology is used to analyze biofilm samples taken with a swab or specified diagnostic tool, the BiofilmDNA test, which provides highly accurate DNA analysis of salivary, sub-gingival and tongue/throat samples taken via paper points and a wiping pad.

The BiofilmGS test, a site specific Gram stain analysis gives 6 an individual site specific Gram stain analysis that provides information about biofilm on the tongue base, tongue dorsum, and the 4 oral quadrants and helps to see the pathogens being displaced in the secondary saliva and oral mucosa. Unlike swish and rinse tests the OraVital's BiofilmDNA Test provides a whole mouth picture of a patients' oral health. It is very important to test the throat and tongue because these reservoirs contribute to re-infections after gum care/implant placement. This comprehensive test identifies the following bacteria: *Treponema dentico/a, Porphyromonas gingiva/is, Tannerel/a forsythia, Aggregatibacter actinomycetemcomitans, Pepto streptococcus micros, Fusobacteria nuc/eatum, Streptococcus mutans*; and fungi: *Candida a/bicans*.

*Treponema denticola, Porphyromonas gingiva/is* and *Tannerel/a forsythia* are some of the most harmful opportunistic pathogens. *Aggregatibacter actinomycetemcomitans* aggressive bacteria have been implicated in destructive periodontitis and causally for many systemic diseases such as CVD. *Peptostreptococcus micros* and *Fusobacteria nuc/eatum* are key components of pathogenic biofilm. *Streptococcus mutans* is a species of bacteria that may be responsible for the initiation of carious lesions.

*Candida a/bicans* is frequently detected along with (heavy) periodontal infection with *S. mutans* in plaque biofilms and is also responsible for causing severe early childhood decay as well. It forms a reservoir in the oral cavity that leads to candidiasis and other lesions in the soft tissue which allows periodontal pathogens to easily enter the tissues through these wounds. This species is also detected at peri-implantitis sites co-colonized with other pathogens.

MyPerioPath™ is a widely used test for the detection of oral pathogens that cause gum disease and threaten oral & systemic health. MyPerioPath™ provides early warning of oral pathogens to enable the personalization of periodontal treatment. The pathogens tested for in MyPerioPath™ can help determine if a patient is at increased risk of Cardiovascular Disease, Diabetes, Stroke and birth complications. MyPerioPath™ test identifies the following type(s) of oral bacteria including high risk pathogens including *Aggregatibacter actinomycetemcomitans, Porphyromonas gingiva/is, Tannerella forsythia, Treponema dentico/a*; medium risk pathogens including *Eubacterium notatum, Fusobacterium nuc/eatum/periodontium, Prevotella intermedia, Campylobacter rectus, Peptostreptococcus* (Micromonas) *micros*, and low risk pathogens including *Eikenella corrodens* and *Capnocytophaga* species (*gingivalis, ochracea, sputigena*).

The MyPerioID™ IL-6 (Interleukin-6) test identifies individual genetic susceptibility to periodontal disease. With this information, clinicians are able to establish which patients are at increased risk for more severe periodontal infections due to an exaggerated immune response allowing personalized therapy and treatment. The MyPerio™ salivary diagnostic tests can be done with a simple oral rinse with the specified rinses designed to show an increase genetic predisposition to oral disease risk and systemic disease risks.

OraRisk™ Caries is a simple saliva screening test that identifies 3 types of harmful bacteria known to cause cavities: *Streptococcus mutans, Streptococcus sobrinus & Lactobacillus casei*. Celsus One™ helps understand how genetics impact health. Celsus One™ evaluates eightgene markers related to inflammatory response Interleukin 1 composite genotype, Interleukin 6, Interleukin 17 A, Beta-defensin 1, CD14, Tumor necrosis factor alpha, Toll-like receptor 4 composite genotype, and Matrix metalloproteinase 3. OraRisk™ *Candida* identifies all common species of the yeast, *Candido*; which is known to cause oral thrush in patients with a normal or compromised immune system. *Candida* species identification is key to treatment choice as some types of *Candida* are resistant to standard antifungal treatments. *Candida* species identified by this assay include: *C. albicans, C. glabrota, Ckrusei, C. paropsilosis, C. tropicolis, Cruqoso, C. guilliermondii/C. zeylanoides, Ckejvr, C. lusitaniae* (up to 3 types may be reported).

The MyPerioID™ IL-1 (Interleukin-1) test identifies individual genetic susceptibility to periodontal disease. With this information, clinicians are able to establish which patients are at increased risk for more severe periodontal infections due to an exaggerated immune response allowing personalized therapy and treatment provided by the claimed device and methods.

OraRisk™ HSV test is an accurate, sensitive and easy way to diagnose herpes simplex virus outbreaks involving the oropharynx. HSV infections are very common, yet can often be mistaken for other causes of oral vesicles, ulcers and other forms of painful oral and pharyngeal lesions. OraRisk™ HSV will identify HSV1 or HSV2 by detecting "shed virus" specific to active infections or outbreaks.

OraRisk™ CTING is the most sensitive way to test for one of the emerging STDs, *Chlamydia trachomatis* (CT) and or *Neisseria gonorrhea* (NG) of the oropharynx. These conditions may be asymptomatic or involve only mild pharyngitis, yet the consequences of an unchecked infection may be severe and are transmissible to partners and others who share intimate contact.

OraRisk™ CT/NG provides highly sensitive detection of either or both *Chlamydia trachomatis* or *Neisseria gonorrhea* and the report will include interpretative comments with specific recommendations for treatment. SARS-COV-2 is a virus that infects the respiratory epithelium: the cells lining the nose, oral cavity, the trachea and bronchial tubes. Specifically, the virus binds to receptors on the cell surface called ACE2. Infection involves the virus to be taken up into the host cells where the viral genome consisting of RNA is replicated and packaged to produce new virions.

To diagnose COVID-19 a sample of nasal or oral secretions are collected to look for viral RNA, evidence of the presence of SARS-COV-2 in that person. The RNA is extracted, then polymerase chain reaction (or PCR) is used to amplify the sequence specific to SARS-COV-2. The results of these tests are "Detected"—positive for the virus, "Not Detected"—no virus or so little that it cannot be detected, or "Inconclusive"—the sample is degraded or insufficient in material to perform the test. The COVID-19 RT-PCR test can be applied.

An oral appliance tray for delivery of a compound to reduce the risk of oral pathogens from mask wearing and from SARS-COV-2 or any virus that infects the respiratory epithelium: the cells lining the nose, oral cavity, the trachea and bronchial tubes. Specifically, the virus binds to receptors on the cell surface called ACE2. Infection involves the virus to be taken up into the host cells where the viral genome consisting of RNA is replicated and packaged to produce new virions, wherein said oral appliance tray comprises a gasket comprising a supragingival portion, a gingival delivery region and one or more delivery ports comprising an outlet in the gingival delivery region wherein said delivery port is selected from the group comprising a delivery reservoir and a delivery pore comprising an inlet located in the supragingival portion is provided.

Placement of an inlet or an outlet for a veterinary oral appliance delivery tray may be standard for the subject species or the subject strain or may be determined one or more periodontal measurements from a non-human animal subject. It is understood that appropriate periodontal measurements from vary from one species to another. It is further recognized that a veterinary oral appliance delivery tray may further comprise a toy element. By "toy element" is intended a structural component with which the animal may play while the veterinary oral appliance delivery tray is maintained in position. In some aspects the toy element distracts the non-human subject animal from the unfamiliarity of a veterinary oral appliance delivery tray positioned in the oral cavity.

FIG. 24 illustrates an exemplary process 100 for forming a dental device. Process 100 forms an oral appliance tray with one or more delivery ports according to a digital 3D imaging model and according to the coordinates and dimensions of a delivery port mapped thereto. At block 102 a digital 3D imaging model of an arch of a subject may be received by one or more processors of a computing device. The digital 3D imaging model may be generated by a digital scan of an arch of the subject, by a digital scan of an impression of an arch of a subject or by a digital scan of a cast of an arch of a subject. The digital 3D imaging model may be of the maxillary arch of a subject, the mandibular arch of a subject or both the maxillary arch and the mandibular arch of a subject. At block 104 the presence of features to be included in the dental device is determined. The feature may be a delivery port (block 106) or another feature. If another feature is to be configured with the dental device, the coordinates and dimensions of at least one feature may be received and processed (block 114). Similarly, if an additional feature is to be configured with the dental device, the coordinates and dimensions of the additional feature may be received and processed at block 116. At block 118, the coordinates and dimensions of one or more features may be mapped to the digital D3 imaging model. At block 108, the coordinates and dimensions of a delivery port to be configured with dental device, wherein the coordinates and dimensions of the delivery ports are based on periodontal measurements made to an arch of the subject. At block 110, the coordinates and dimension of the delivery ports are mapped to the digital 3D imaging model. At block 112, the 3D printing machine may be directed to form a dental device with delivery ports or other features according to the 3D digital imaging model and according to the coordinates and dimensions of the delivery ports mapped thereto. Other features may include but are not limited to a toy element, a positioning element, a loading element and any other desired structure or component.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 25 illustrates a computing system 200 in which a computer readable medium 206 may provide instructions for performing any of the methods disclosed herein.

Furthermore, the embodiments can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output or I/O devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

Three-dimensional (3-D) printing systems with computer aided drafting (CAD) are known in the art. 3-D printing systems include, but are not limited to, FDM based systems, PolyJet based systems, Stratasys F123 series, F770, F900, Fortus, uPrint SE and SE Plus, Dimension Elite, Dimension BST/SST 1200 es, J8-series, J7-series, J5-series, J4100, Connex3, Objet30, Objet 30 V3, Objet 30 V5, dental Objet1000 Plus, and the like. 3-D printing systems capable of use with a material suitable for oral use are preferred.

Computer-aided design (CAD) and Computer-aided manufacturing (CAM) are known in the art. CAD/CAM systems are known in the art. CAD/CAM systems include but are not limited to Solid Edge CAM Pro, Gibbs CAM, Fusion 360, Solidworks CAM, and SolidCAM. CAD/CAM systems may involve milling, drilling, tapping, boring, turning, machining or vacuum-forming a dental device. CAD/CAM machines may include, but are not limited to, CAD/CAM milling machines, CAD/CAM mill, CEREC PrimeMill, Dentsply Sirona CEREC, Planmeca Planmill and Ivoclar PrograMill One, wet-milling machines, dry-milling machines, vacuum-forming machines, CNC machining, and thermal-forming machines. Vacuum forming machines include, but are not limited to, TrayVac, Formech S08FS, and Precision Dental Vacuum Former II. Preferred systems are those which can be used with a material suitable for oral use.

It will be understood that the reference to the below examples is for illustration purposes only and do not limit the scope of the claims.

EXAMPLES

Example 1. Analysis of Pathogens Prior to and After Treatment

Saliva was obtained from a subject exhibiting periodontal disease. The saliva was subjected to analysis by MyPerio- Path™. The levels of *A. actinomycetemcomitans, P. gingiva/is, T. forsythia, Porphyromonas gingiva/is, Treponema dentico/a, Tannerella forsythia, Eubacterium nucleaturm, Fusobacterium nucleatum, Prevotella intermedia, Campy/obacter rectus, Peptostreptococcus micros* and *Eikenella* were determined.

Periodontal measurements of the mouth were made. An oral appliance tray comprising a gasket, a supragingival portion, a gingival delivery region and delivery pores was made. A prescribed compound was placed in the supragingival region of the device. The oral appliance tray and the compound were positioned in the subject's mouth, allowing the compound to enter the inlets in the supragingival region, flow through the pores and exit the outlets in the gingival region of the subject. The appliance tray and compound remained positioned in the subject's mouth for 1S minutes. The 1S-minute treatments were performed twice a day (morning and evening) for 30 days.

Figures 1A, 1B:
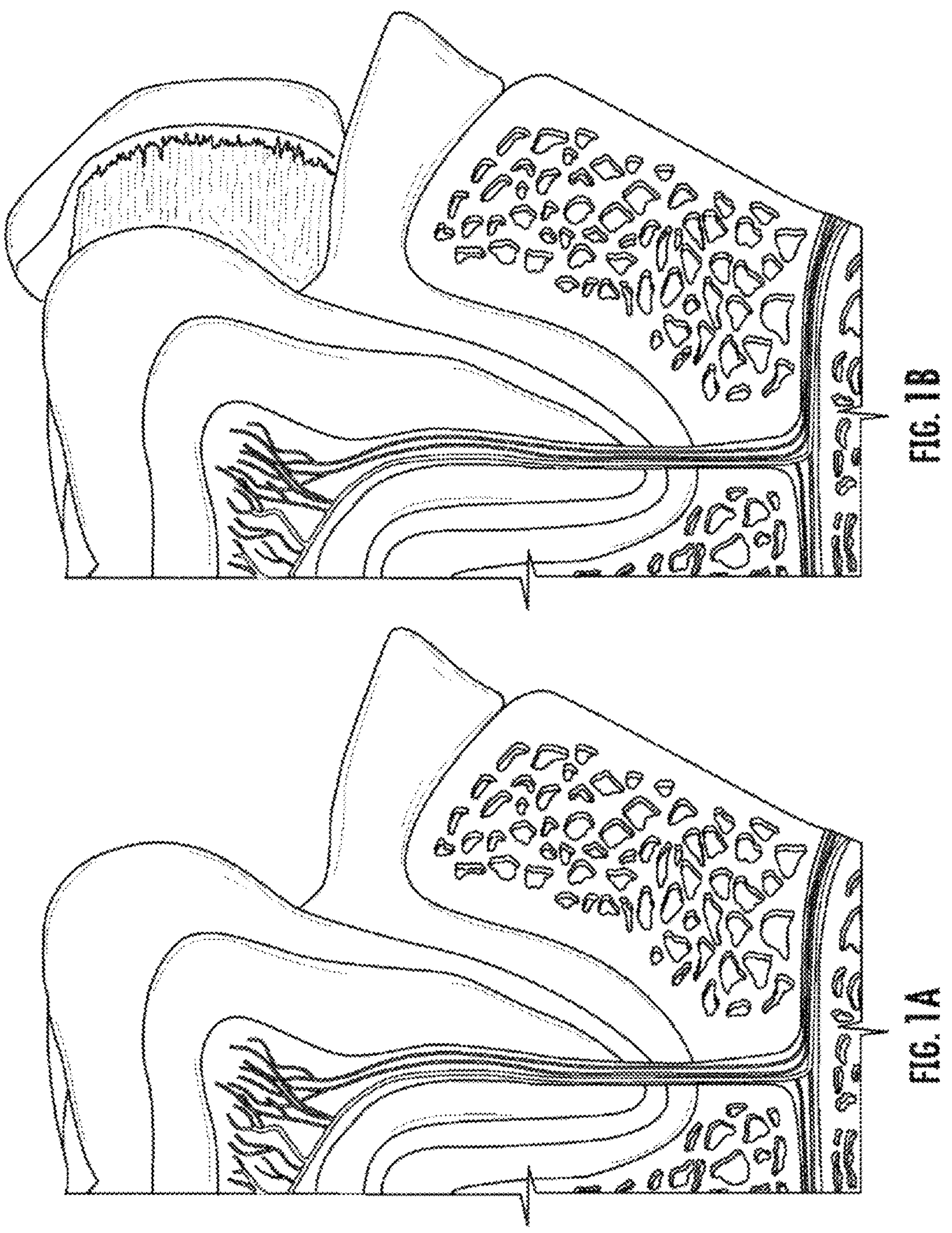
FIG. 1A depicts a healthy tooth and sulcus.
FIG. 1B depicts a healthy tooth and sulcus and a brush positioned next to the tooth.
Figure 2B:
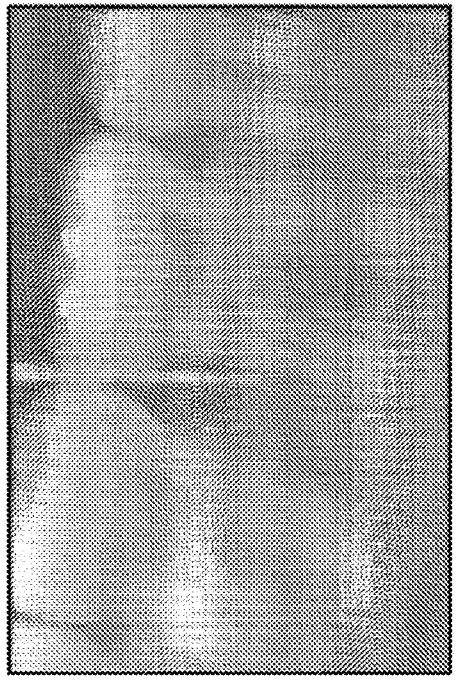
FIGS. 2A and 2B provide radiographs of teeth with a periodontal dental probe measuring the sulcus.
Figure 2A:
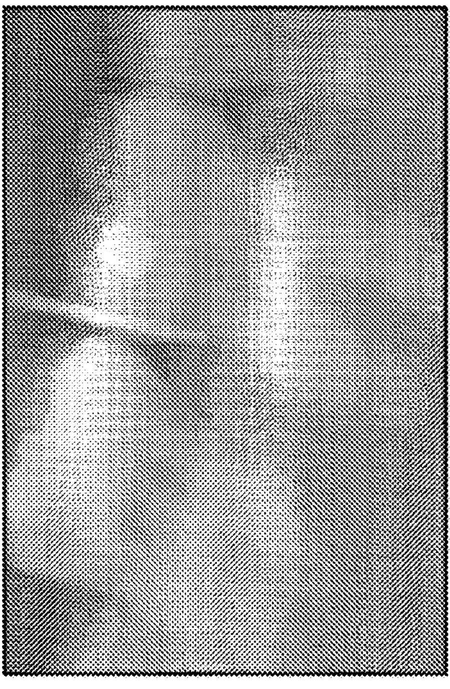
Figure 3:
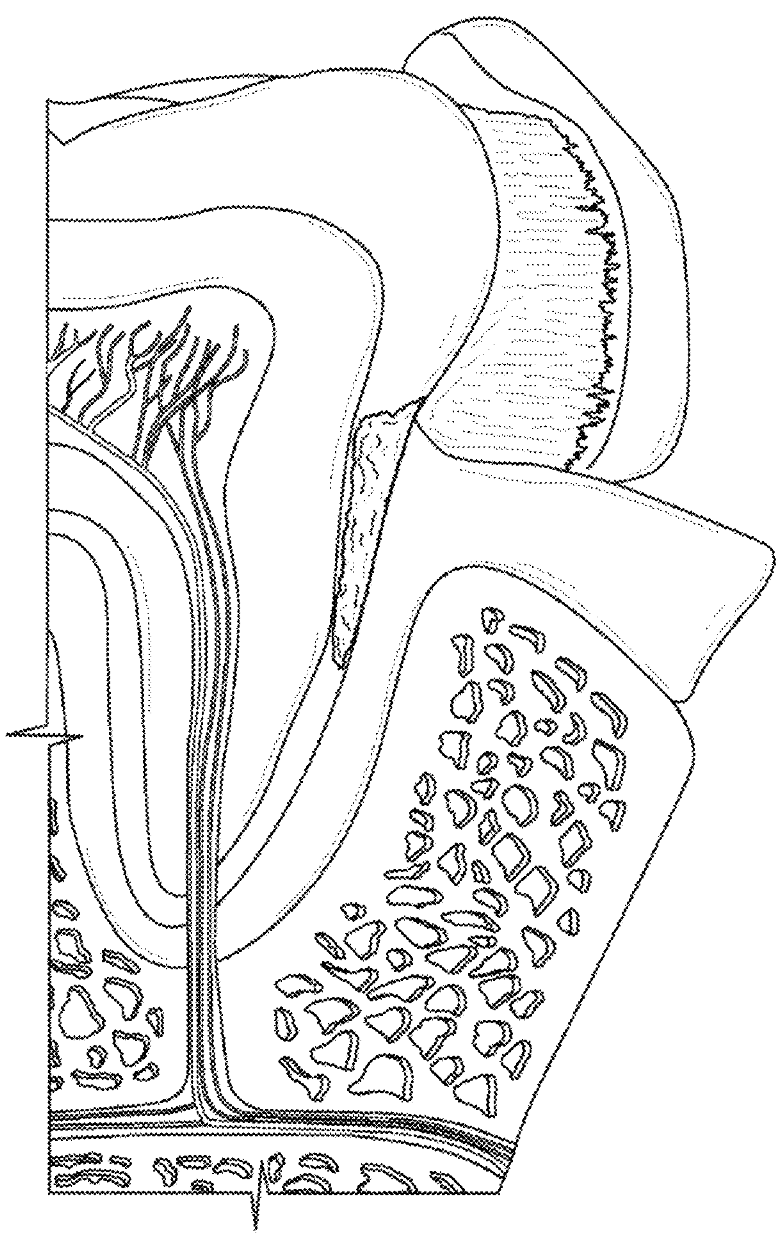
FIG. 3 depicts teeth with a diseased sulcus beyond the reach of brush bristles.
Figure 4:
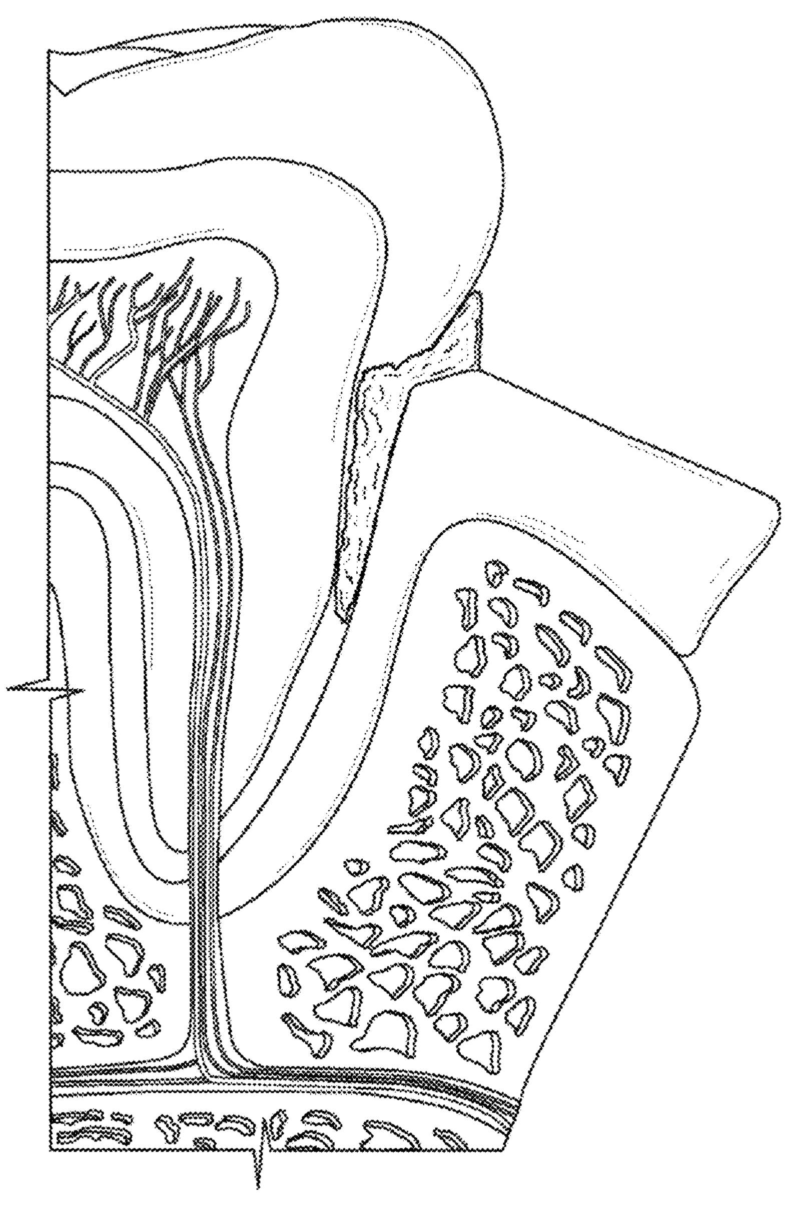
FIG. 4 depicts a tooth with a diseased sulcus and visible inflammation of the gum.
Figure 5:
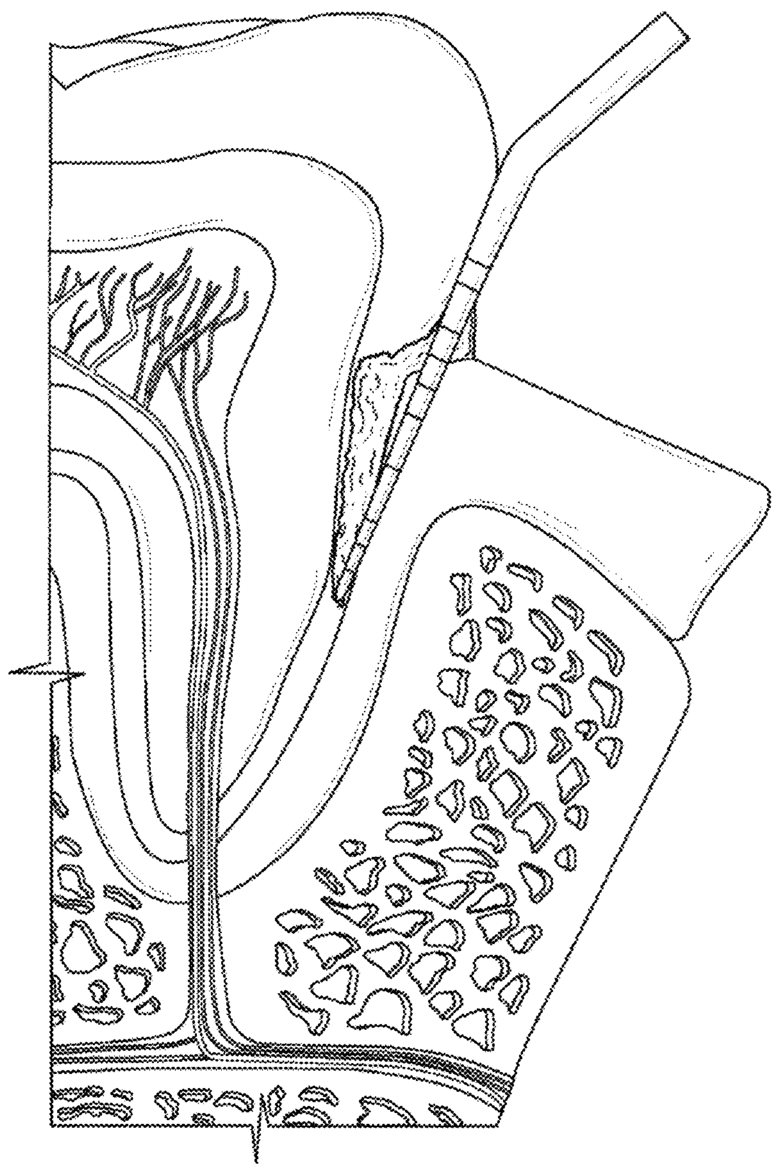
FIG. 5 depicts a tooth as in FIG. 4 shown with a periodontal probe. The sulcus measures deeper than 5 mm.
Figure 6:
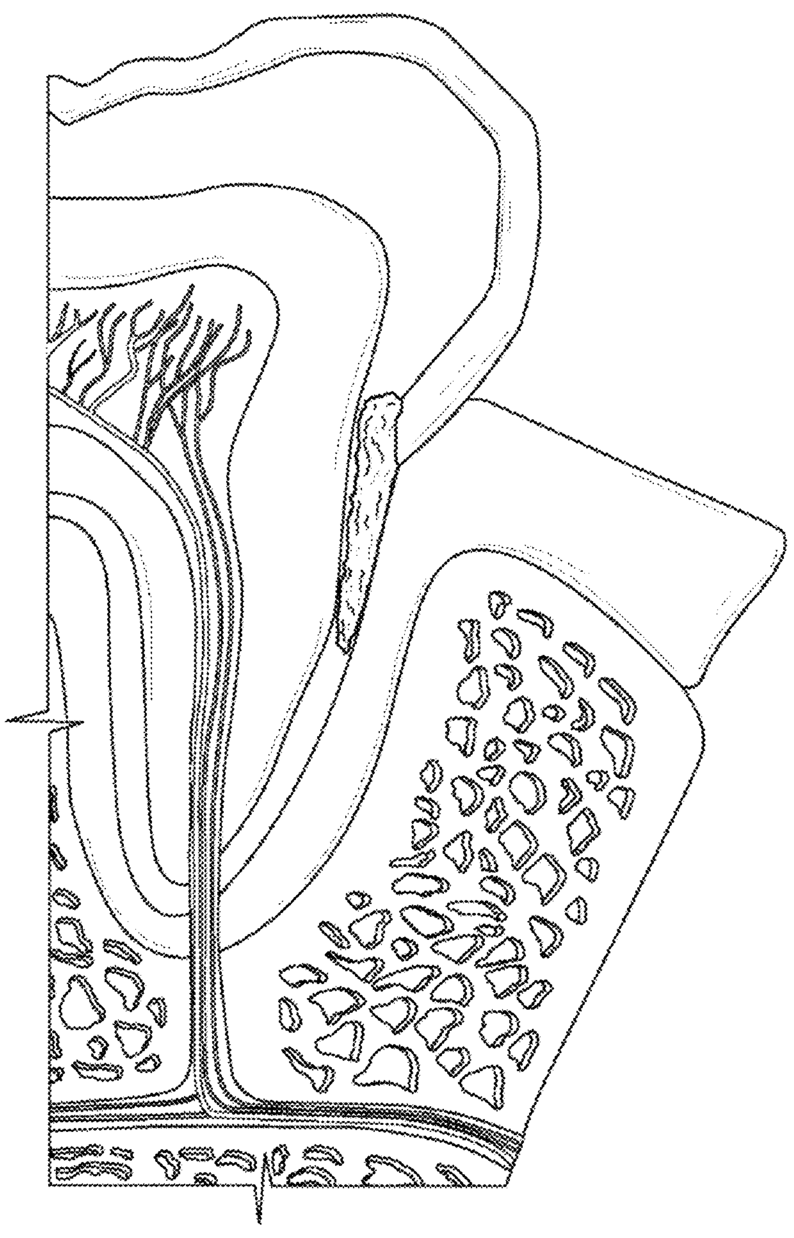
FIG. 6 depicts a tooth as shown in FIG. 4 with an oral appliance tray positioned on the tooth.
Figure 7:
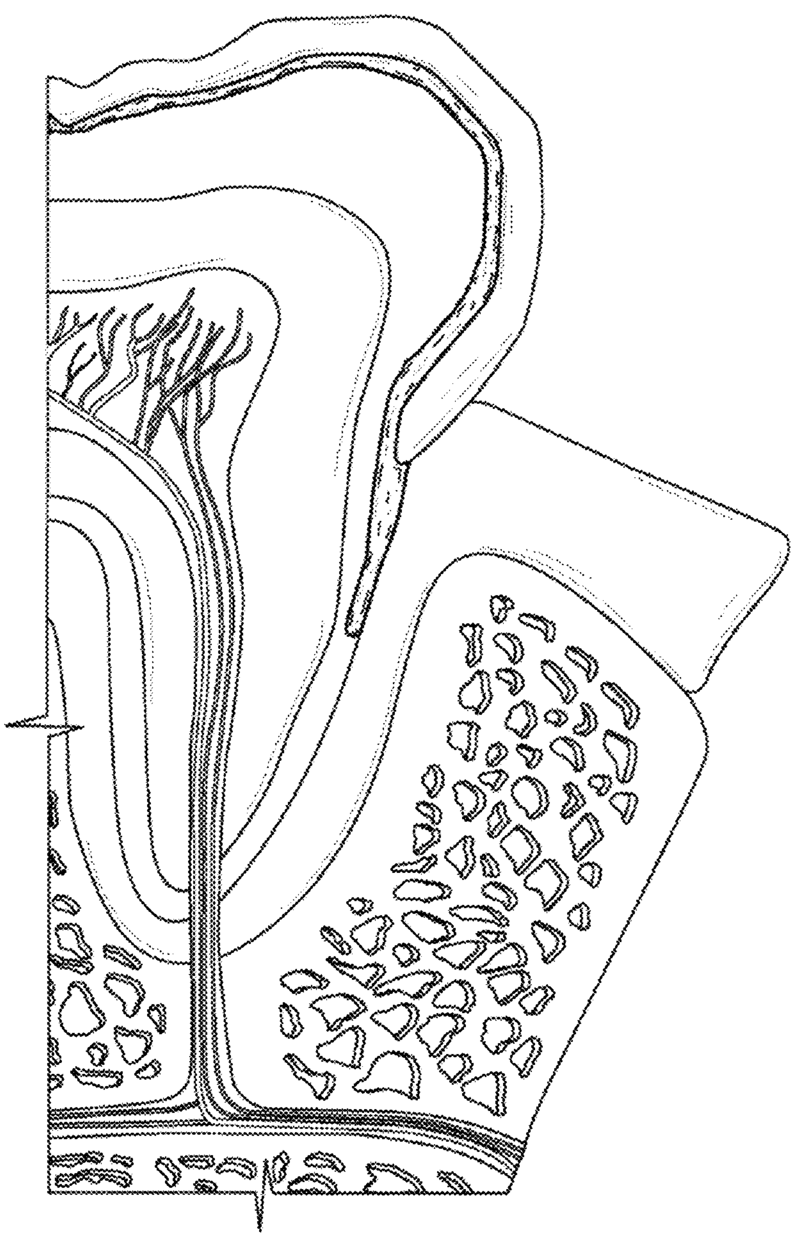
FIG. 7 depicts a tooth with an oral appliance tray positioned on the tooth and delivering a compound of interest supra-gingivally and sub-gingivally below the gumline.
Figure 8:
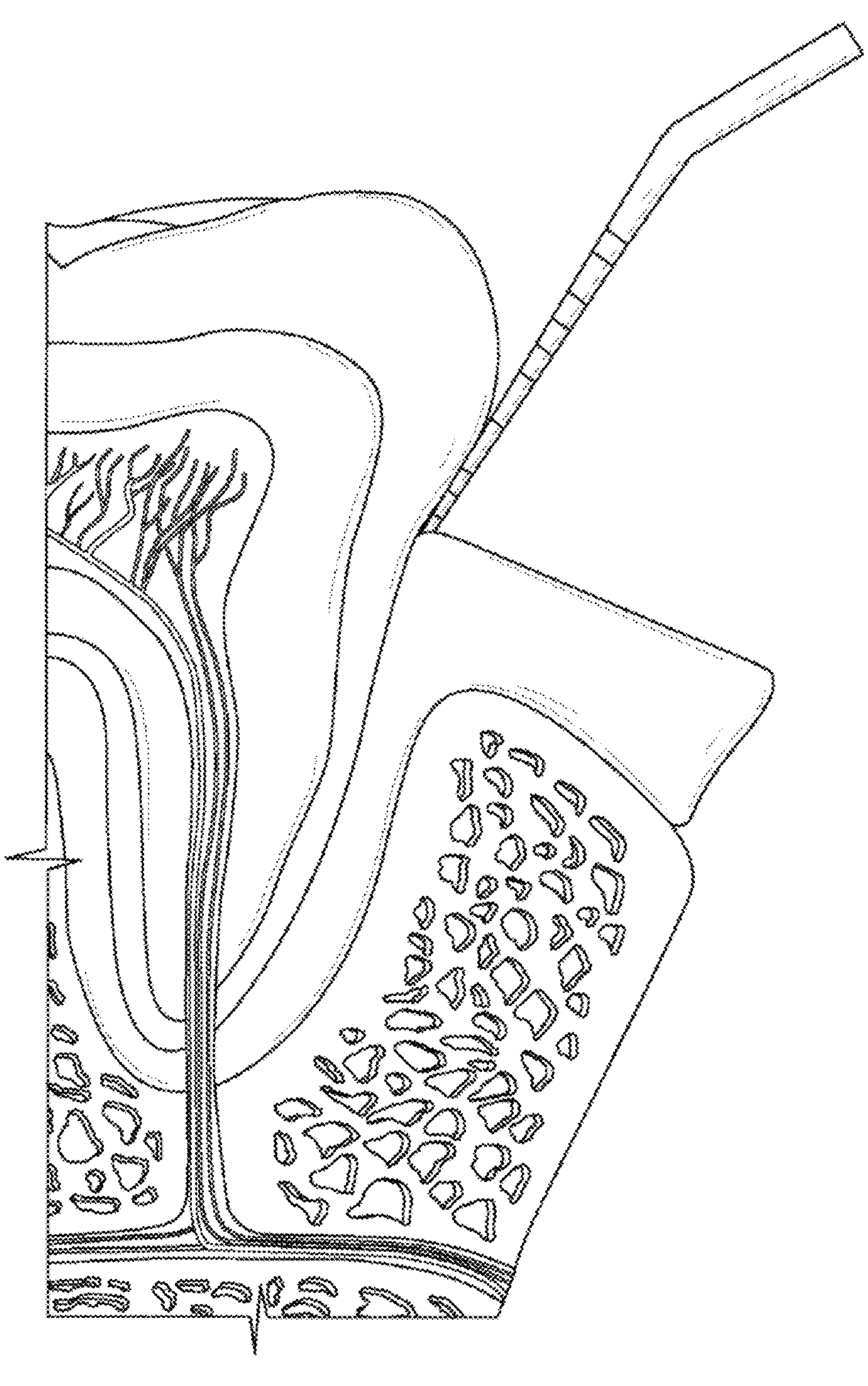
FIG. 8 depicts a tooth after completion of a treatment regimen including a reduced sulcus probe depth, decreased inflammation and hard calculus removed.
Figures 9, 10:
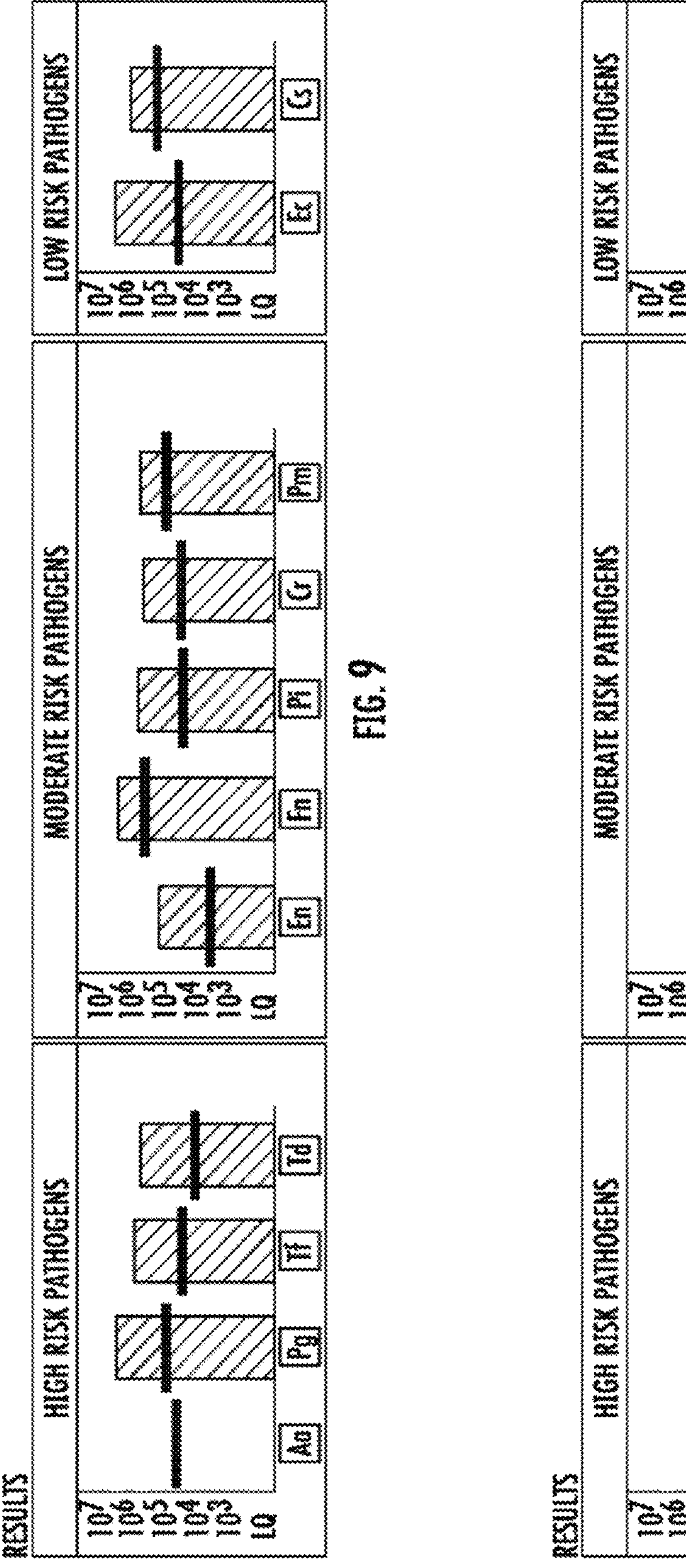
FIG. 9 summarizes results of oral DNA analysis in a salivary sample obtained from a patient prior to treatment with the oral appliance tray. The number of bacteria indicated in copies/ml (bacterial genome) are shown on the y axis; the bacterial type is indicated on the x-axis. High-risk pathogens including *A. actinomycetemcomitans* (Aa), *P. gingiva/is* (Pg), *T. forsythia* (Tf), and *Treponema dentico/a* (Td) are present at levels above a therapeutic threshold. Moderate-risk pathogens including *Eubacterium nucleatum* (En), *Fusobacterium nucleatum* (Fn), *Prevotella intermedia* (Pi), *Campy/obacter rectus* (Cr), and *Peptostreptococcus micros* (Pm) are present at levels above a therapeutic threshold. Low-risk pathogens including *Eikenella* are present at levels above a therapeutic threshold. LQ refers to the limit of quantification that can be repeatedly measured. The line across each bar indicates the therapeutic threshold. The oral DNA labs were performed by OralDNA Labs, Access Genetics, Eden Prairie MN.
FIG. 10 summarizes results of oral DNA analysis in a salivary sample obtained from same patient (as in shown in FIG. 9) after 30 days of twice daily 15-minute treatments with a compound of interest in an oral appliance tray. The number of bacteria indicated in copies/ml (bacterial genome) are shown on the y axis; the bacterial type is indicated on the x-axis. High-risk pathogens including *A. actinomycetemcomitans* (Aa), *P. gingiva/is* (Pg), *T. forsythia* (Tf), and *Treponema dentico/a* (Td) were below the therapeutic threshold. *A. actinomycetemcomitans* (Aa), *P. gingiva/is* (Pg), and *Treponema dentico/a* (Td) were below the limit of quantification. Moderate-risk pathogens including *Eubacterium nucleatum* (En), *Fusobacterium nucleatum* (Fn), *Prevotella intermedia* (Pi), *Campy/abacter rectus* [Cr}, and *Peptostreptococcus micros* (Pm) were present at levels below a therapeutic threshold. *Eubacterium nucleatum* (En), *Prevotella intermedia* (Pi) and *Campy/obacter rectus* (Cr) were below the limit of quantification. Low-risk pathogens including *Eikenella* were present at levels below the therapeutic threshold. The change in pathogen prevalence after treatment using an oral appliance tray of the present application is remarkable and significant. The line across each bar indicates the therapeutic threshold. The oral DNA labs were performed by OralDNA Labs, Access Genetics, Eden Prairie MN.

After 30 days, saliva was collected from the subject. The saliva was subjected to analysis by MyPerioPath™. The levels of *A. actinomycetemcomitans, P. gingiva/is, T. forsythia, Porphyromonas gingiva/is, Treponema dentico!a, Tannerella forsythia, Eubacterium nucleaturm, Fusobacterium nucleatum, Prevotella intermedia, Campy/obacter rectus, Peptostreptococcus micros Pepto streptococcus micros* and *Fusobacteria nucieatum*, key components of pathogenic biofilm and *Eikenella* were determined. Results from one such experiment are shown in FIGS. 9 and 10. A thin layer equivalent to 1 mm×1 mm thickness paste gel and or foam concentration was placed in the tray. The concentration of the compound for example 1 was a combination of 1.7 hydrogen peroxide oral debriding agent in foam formulation described as oral wound cleanser compromised of 3% ethyl alcohol, potassium sorbate, peppermint oil, xylitol, 1% povidone iodine and 1% chlorhexidine solution acting as an oxygenating cleansing source of antimicrobial and antiseptic properties with direct access into the port channel to attain and maintain in a time measured interval that remains stationary on a daily basis to breakdown the colonizing pathogen formations. A tray was digitally fabricated to mirror the exact measurements of the entire circumference of the oral mucosa, alveolar bone, PDL, sulcus, size and shape of teeth surfaces of the teeth for the maxillary and mandibular arches from the complete and thorough periodontal probing and full periodontal charting upon clinical periodontal examination.

Figure 18A:
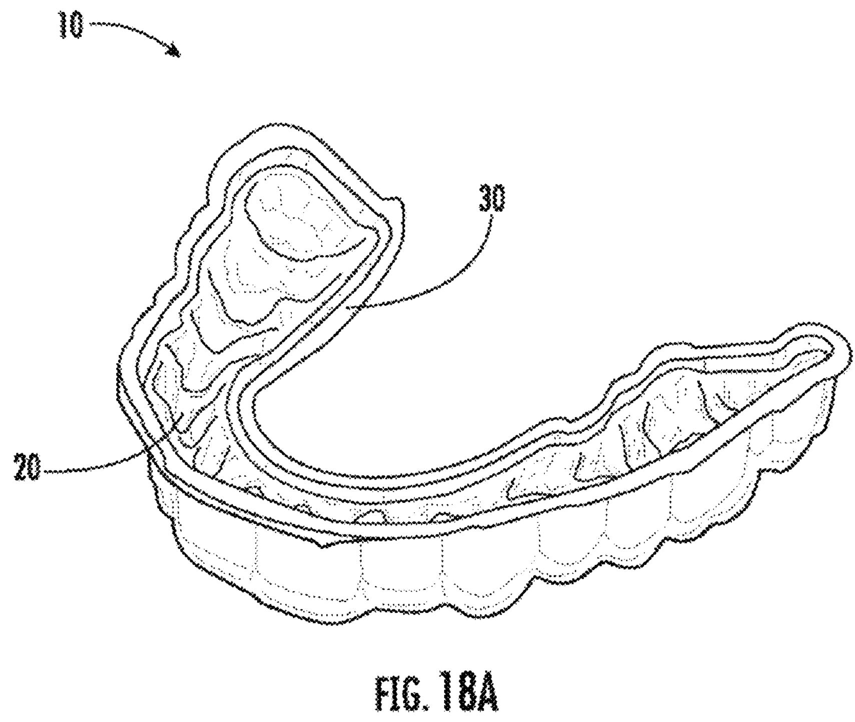
FIG. 18A is an image of an oral appliance delivery tray for a maxillary arch. The pore inlets or channel inlets are located in the supragingival region. The outlets are positioned based on the subject's periodontal charting and periodontal measurements. The outlets allow delivery of a compound of interest to the subject's extended pocket depths.
Figure 18B:
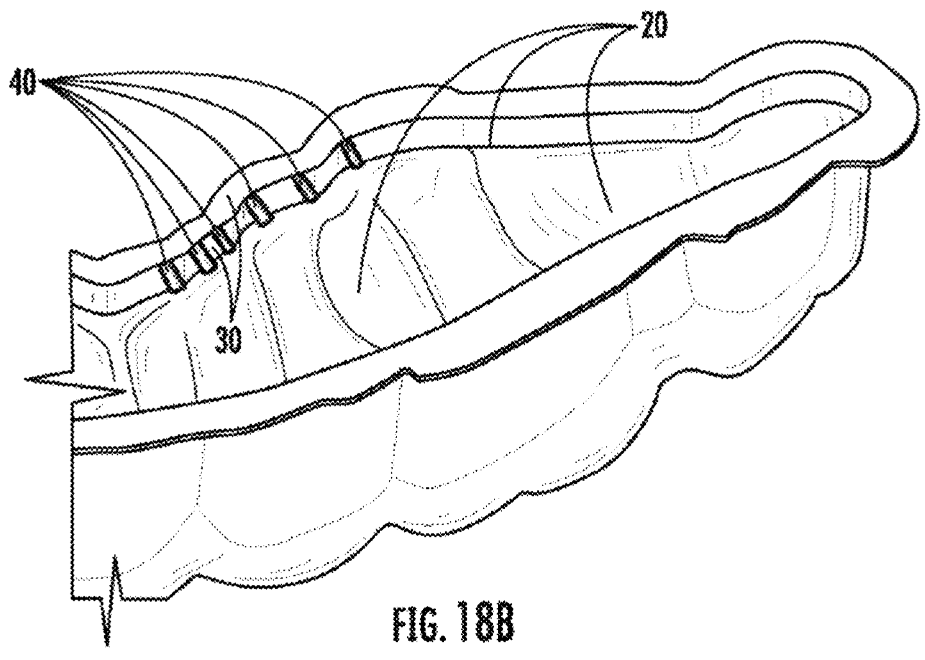
FIG. 18B provides an image of the oral appliance delivery tray with the ports visible. The darkened areas on the distal buccal and distal lingual walls of the tray show the pores or port channels that have been designed to allow the compound to flow into the open area located at the full circumference of the periodontal peri-implant measurement. The tray shows the large unprotected gap available in the tray formation present due to the patient no longer having a periodontal ligament and bone loss from a previous subgingival infected area.
Figure 19A:
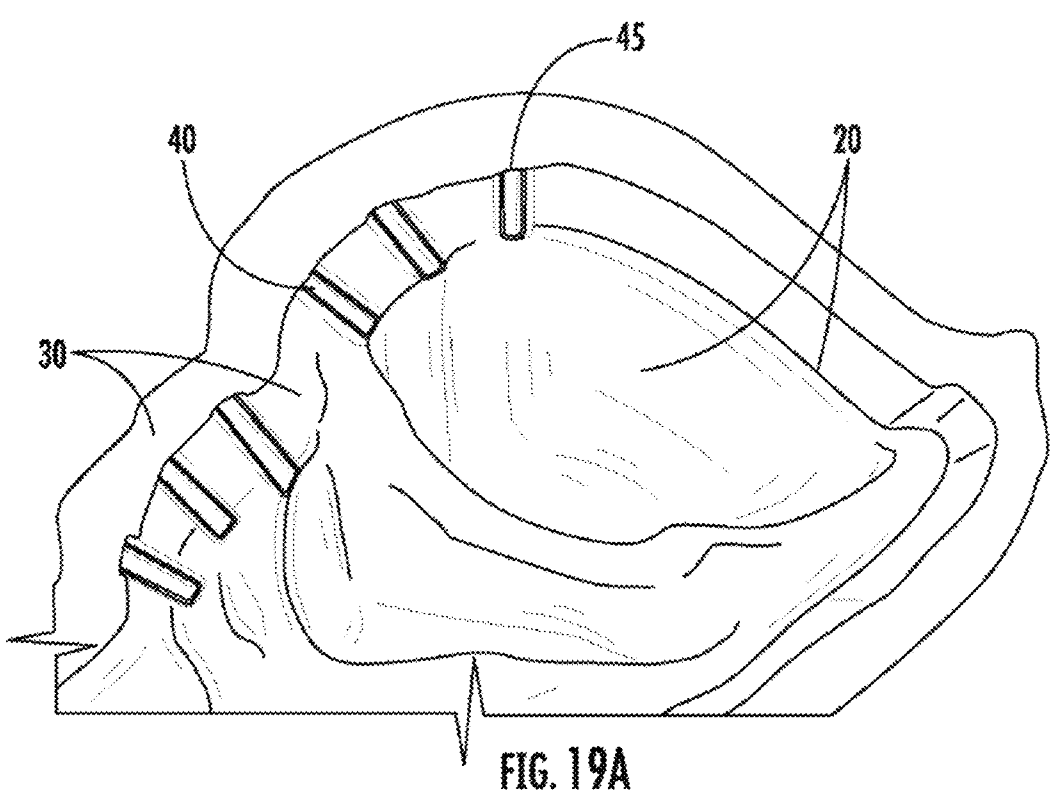
FIGS. 19A and 19B provide images of an oral appliance delivery tray for a maxillary arch for delivery of a compound to singular diseased pocket depths or for delivery of a compound to a surgical implant pocket.
Figure 19B:
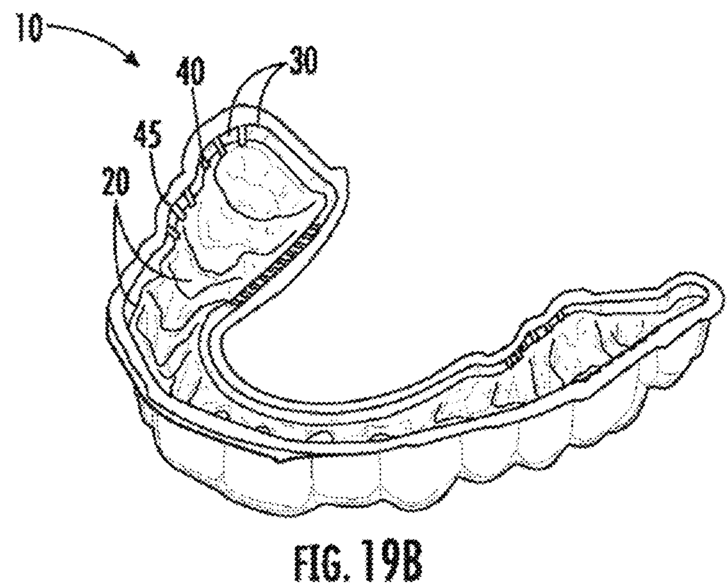
Figure 20:
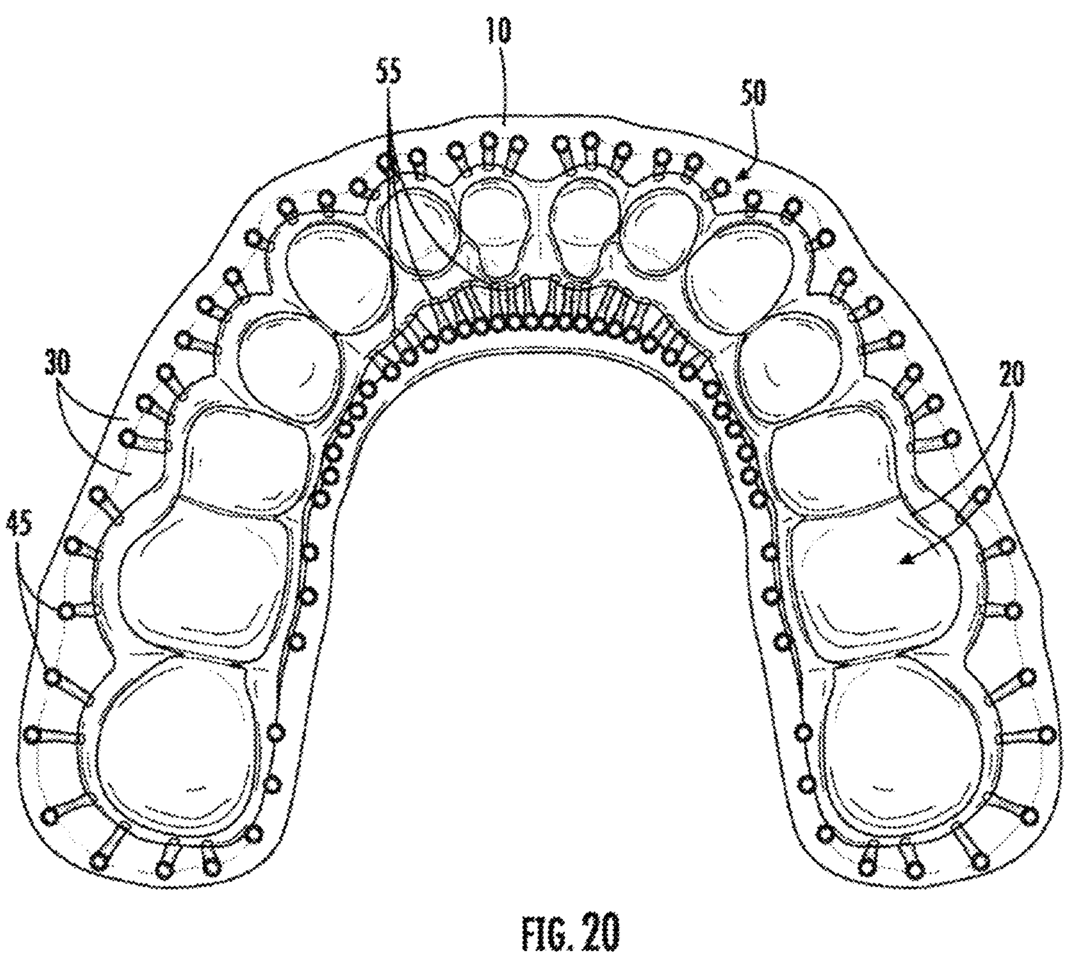
FIG. 20 provides an image of a standard oral appliance delivery tray for a mandibular arch for delivery of a compound to multiple pocket depths in each tooth pocket. The delivery tray comprises delivery pores.
Figures 21A, 21B, 21C, 21D, 21E, 21F:
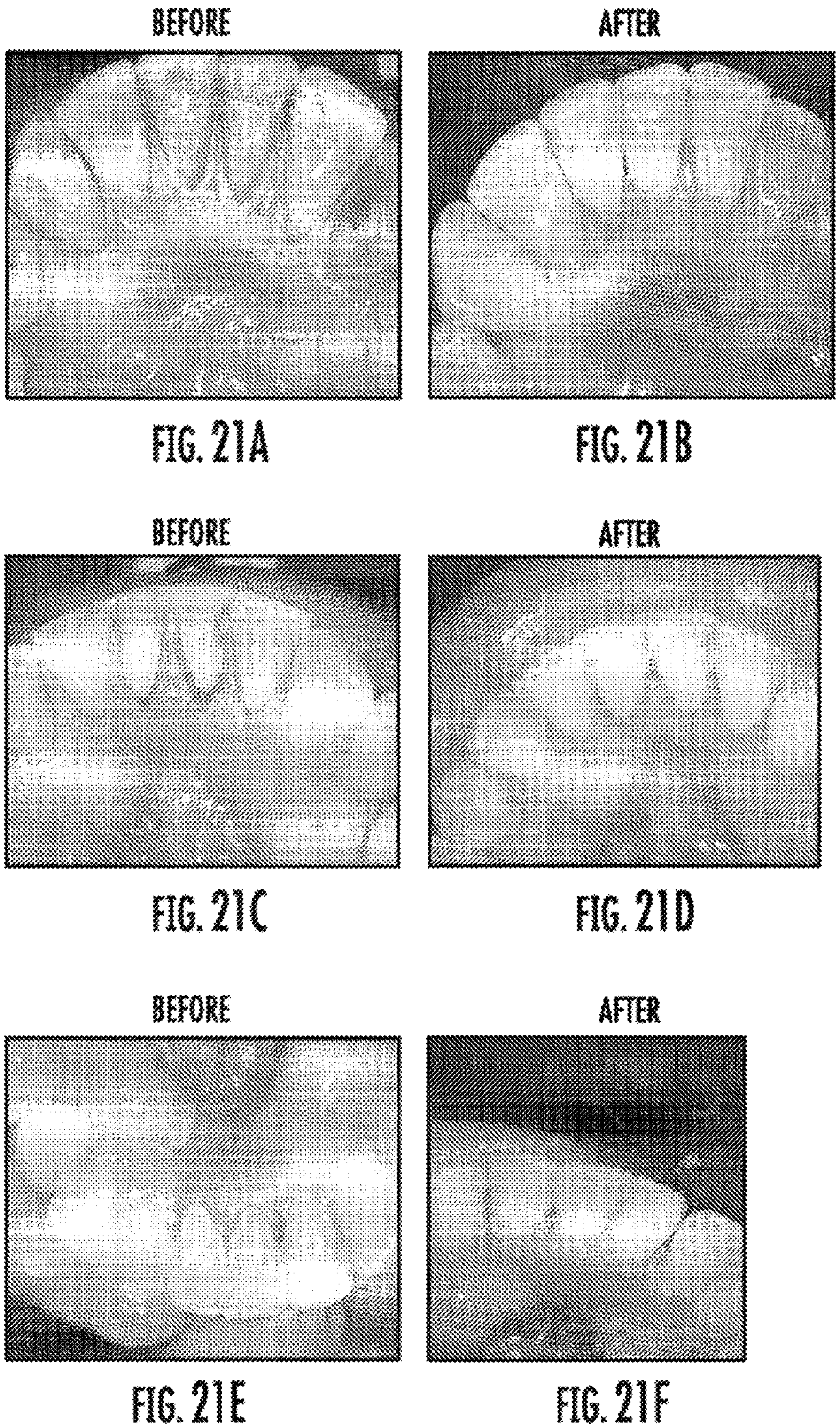
FIGS. 21A, 21B, 21C, 21D, 21E and 21F provide images of teeth from 3 subjects before treatment and after 30 days of twice daily, 15-minute interval delivery of a compound with an oral appliance delivery tray. After treatment, the teeth and gingiva are improved. Plaque, tartar and hard calculus buildup are reduced after treatment. The white calcified line at the base of the margin where the tooth meets the tissue that is on the before picture a white defined line across the margin. The second after picture that line of hard calcified plaque and tarter is gone. On the second example the black thick stain in addition to hard-calcified plaque is also gone.

The tray was formed by a licensed laboratory technician using case alginate impressions of the subject and pouring up the models to make a cast stone study imaging model of the maxillary and mandibular arches and cast the casing of the fabricated oral device trays from a melting machine which melts the silicone plastic and other materials to mirror the exact measurements from the periodontal examination. The tray comprises one or more delivery pores, wherein each pore comprises at least one inlet in the supragingival region and at least one outlet in the gingival delivery region. FIG. 18A is an image of an oral appliance delivery tray for a maxillary arch. The pore inlets channels are located in the supragingival region. The outlets are positioned based on the subject's periodontal charting and periodontal measurements such that when the tray is positioned in the oral cavity the outlets are in proximity to a section of a tooth or implant at risk for periodontal disease or for healing and repair. The outlets allow delivery of a compound of interest to the subject's extended pocket depths. FIG. 18B provides an image of the oral appliance delivery tray with the pores visible.

The oral appliance was made from non-biodegradable polymers including ethylene vinyl acetate, poly(meth) acrylic acid, polyamides, copolymers and mixtures thereof. The characteristics or properties of these thermally formable plastics or polymers was optionally modified by usage of plasticizers and any durometer adjusting substance. The plasticizer is added to adjust the final properties and characteristics favorably, such as to make the plastic or polymer softer or more pliable. The oral appliance comprises non-porous material and is disposable.

Figures 12A, 12B, 12C, 12D, 12E, 12F, 12G, 12H, 12I, 12J, 12K, 12L, 12M, 12N, 12O, 12P, 12Q, 12R:
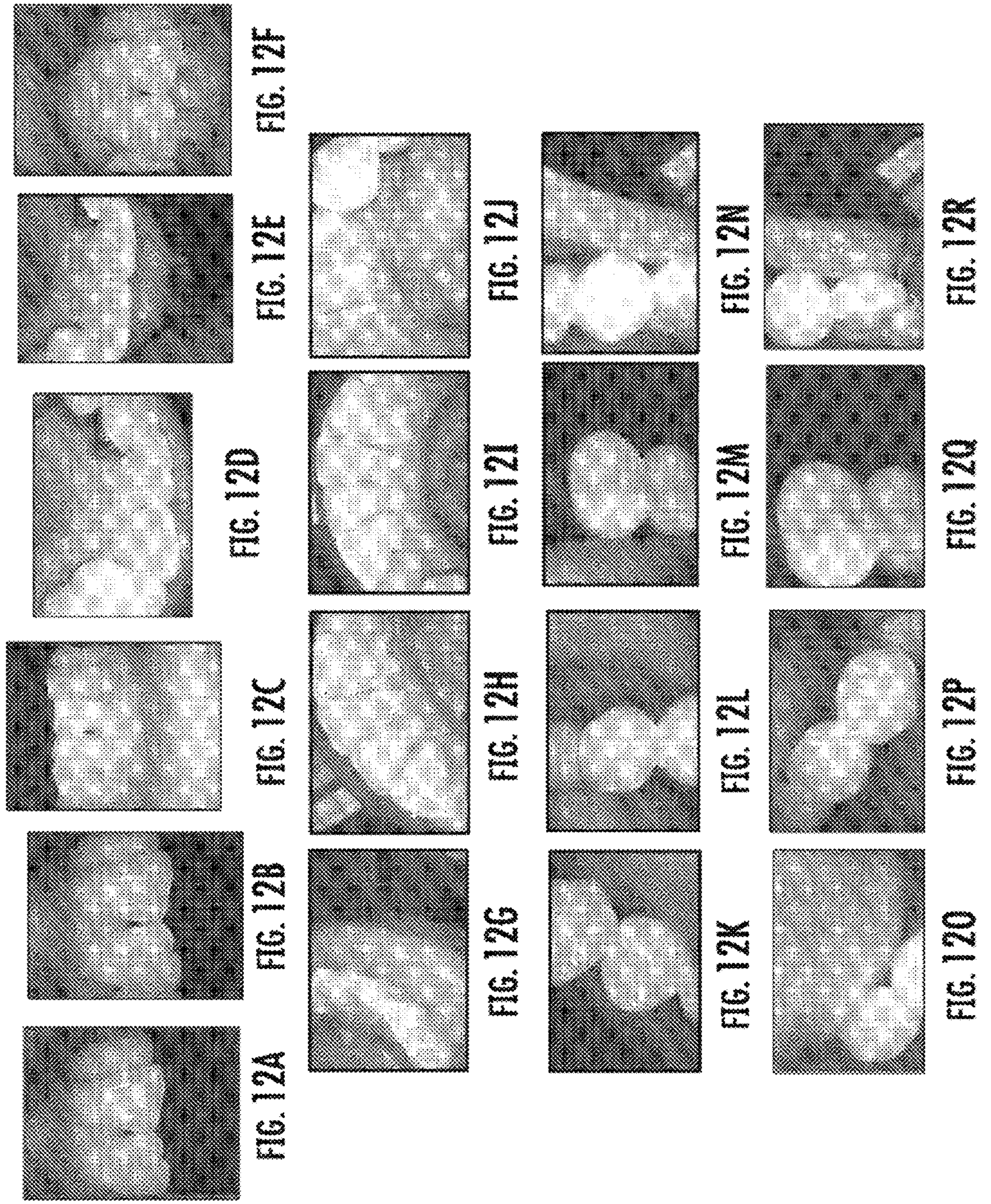
FIGS. 12A, 12B, 12C, 12D, 12E, 12F, 12G, 12H, 12I, 12J, 12K, 12L, 12M, 12N, 12O, 12P, 12Q and 12R provide intra-oral photos from a subject with advanced periodontal disease, (Case 1). Classification IV sub-gingival and supra-gingival soft plaque and hard calculus are present. Note the exposed dentin and lower gum levels from past surgical periodontal pocket reduction procedures.
Figures 13A, 13B, 13C, 13D, 13E, 13F, 13G, 13H, 13I, 13J, 13K, 13L, 13M, 13N, 13O, 13P, 13Q, 14A, 14B, 14C, 14D, 14E, 14F, 14G, 14H, 14I, 14J, 14K, 14L, 14M, 14N, 14O, 14P, 14Q:
FIGS. 13A, 13B, 13C, 13D, 13E, 13F, 13G, 13H, 13I, 13J, 13K, 13*l*, 13M, 13N, 13O, 13P and 13Q provide intra-oral photos from a subject with advanced periodontal disease, (Case 1) after 10 days use of the oral appliance delivery tray applied with a case specific compound of interest. There is substantial decrease in supra-gingival and sub-gingival calculus and a substantial decrease in inflammation and edematous soft tissue as compared to FIGS. 12A-12R.
FIGS. 14A, 14B, 14C, 14D, 14E, 14F, 14G, 14H, 14I, 14J, 14K, 14*l*, 14M, 14N, 14O, 14P and 14Q provide intra-oral photos from a subject with advanced periodontal disease, (Case 1) after 20 days use of the oral appliance delivery tray applied with a case specific compound of interest. There is substantial decrease in supra-gingival and sub-gingival calculus and a substantial decrease in inflammation and edematous soft tissue between the 20-day point and both the 10-day point (FIGS. 13A-13Q) and prior to treatment (FIGS. 12A-12R).
Figures 15A, 15B, 15C, 15D, 15E, 15F, 15G, 15H, 15I:
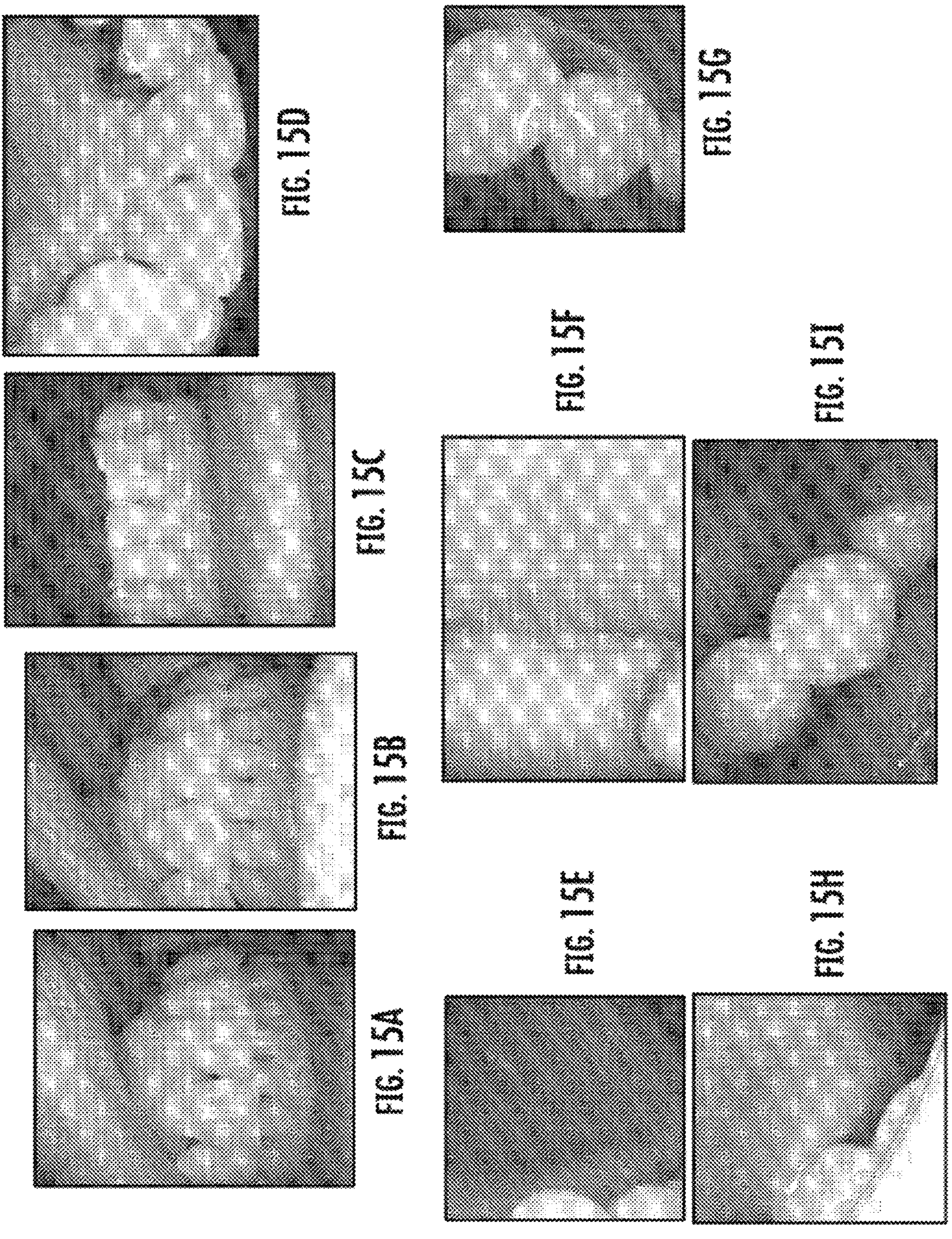
FIGS. 15A, 15B, 15C, 15D, 15E, 15F, 15G, 15H and 15I provide intra-oral photos from a subject (Case 1) after 30 days use of the oral appliance delivery tray with a case specific compound of interest. Sub-gingival and supra-gingival calculus are not visible, visual indicators such as edematous areas 2 and redness are resolved, no bleeding occurs upon probing, and the maximum probing depth was a healthy 3 mm or less.

The patient in (Example 1) has an implant replacement on #15. In the intra-oral photo of Example 1 (FIGS. 12A-12R) the improvement of tissue tone and the hard-gingival calcified plaque and hard calculus to be removed the intrinsic and extrinsic stain to be diminished are visible. FIGS. 13A-13Q, 14A-14Q, and 15A-15I show the patient returning to an increased level of homeostasis orally. Without being limited by mechanism, the subject's overall systemic improvement may relate to not having to battle an infection with an immune response and the patient no longer swallowing and ingesting those pathogens.

Example 2: Case Study 1

(Case 1) a subject on several medications for heart disease and with advanced periodontal disease was evaluated. The subject's home dental care regimen included daily brushing with a battery-operated toothbrush, flossing, floss-threaders for the implant and bridge restorative dentistry, use of a medicated mouth rinse, and use of a fluoridated mouth rinse. Additionally, the subject was receiving clinical dental debridement's up to two times a month prior to treatment with appliance. The subject exhibited classification IV subgingival and supra gingival soft plaque and hard calculus. There was exposed dentin from previous periodontal pocket reduction procedures. Intra-oral photos of Case I's teeth were obtained (see FIGS. 12-12R). The subject was at risk of losing several teeth and the financially high cost and investment of his implants.

The subject's daily homecare routine consisted of brushing with a battery-operated toothbrush, flossing, floss threaders for the implant and bridge restorative dentistry, medicated mouth wash, and fluoridated mouth rinse. Further the subject was receiving clinical debridement's up to 2 times a month prior to treatment. The teeth have several issues as follows: Attachment loss, bone loss, edematous diseased tissue, inflammation, bleeding, open margins on reconstructive crown and bridgework, exposed dentin, fracturing demineralized incisal margins with exposed dentin, worn away enamel from bruxism and acid erosion on buccal, facial, occlusal and incisal surfaces, elongated supra-erupted crowns and natural dentition due to bone loss and comprised bone sockets and attachment loss, maligned, shifting, fracturing dentition and unstable alignment and occlusion due to loss of bone and attachment stability, loss of oxygenated and blood circulation in soft tissues due to splintered hard calculus attachments causing necrotic tissue and advanced irreversible periodontal gum disease with an increase potential risk for further systemic disease.

Periodontal measurements were made, and an oral appliance tray comprising a gasket comprising a supragingival portion, a gingival and sub-gingival delivery region and delivery pores was made. A compound was placed in the supragingival portion of the oral appliance tray. The oral appliance tray and the compound were positioned in the subject's mouth, allowing the compound to enter the inlets in the supragingival region, flow through the pores and exit the outlets in the gingival and sub-gingival region of the subject. The appliance tray and compound were positioned in the subject's mouth. The treatments were performed daily for 30 days. Intra-oral photos of Case I's teeth after 10, 20, and 30 days of daily treatment. The intra-oral photos are shown in FIGS. 13A-13Q, 14A-14Q, and 15A-15I, respectively. Periodontal measurements were made before, during and after the treatment process; the periodontal measurements are shown in FIG. 16. A thin layer equivalent to 1 mm×1 mm thickness paste gel and or foam concentration was used in the tray. This compound included a combination of 1.7% hydrogen peroxide oral debriding agent in gel formulation described as oral wound cleanser compromised of 3% potassium nitrate for sensitivity, no ethyl alcohol due to demineralization of natural tooth structures, potassium sorbate, peppermint oil, xylitol, 1% povidone iodine and 1% chlorhexidine solution included in gel solution and 1% sodium fluoride acting as an oxygenating cleansing source of antimicrobial and antiseptic properties. Direct access of the compound into the port channel to attain and maintain in a time measured interval that remained in position in the subject's mouth on a daily basis to breakdown the colonizing pathogen formations. This combination provided a great source of comfort decreasing sensitivity to eating and drinking and re-mineralized the dentinal tubules to decrease not only sensitivity but also decreased potential risk of future caries by strengthening exposed and unprotected tooth structures. Without being limited by mechanism, disrupting the further formation of the biofilm, pellicle and calcification of plaque to remove the degenerative pathogens and instituting a debriding of the current parthenogenic formations may be beneficial. This specific combination raised the PH levels to homeostasis and decreased the formations of degenerative effects such as decaying surrounding natural tooth structures, further periodontal infection, abscess, perio-abscess, further attachment and bone loss, halitosis and decreased the spread of this difficult and devastating prognosis of advanced degenerative periodontal and systemic disease that claims so many patients oral and overall health and well-being. The tray was used twice a day for 15-min/am and 15-min/pm. This was done at home by the patient wearing the tray for 15-minutes in the morning and 15-minutes in the evening and in 10 days upon examination the pathogens have been substantially reduced and the patient oral and systemic health has been significantly improved due to this invention.

The tray was digitally fabricated mirroring the exact measurements of the entire circumference of the oral mucosa, alveolar bone, POL, sulcus, size and shape of all surfaces of the teeth and the maxillary and mandibular arches made from the complete and thorough periodontal probing and full periodontal charting upon the clinical perio/examination. The tray was formed by a licensed laboratory technician using case alginate impressions of said subject and pouring up the models to make a cast stone study imaging model of the maxillary and mandibular arches and cast the casing of the fabricated oral device trays from a melting machine in which melts the silicone plastic and listed materials to mirror the exact measurements from the periodontal examination. The oral appliance was made from non-biodegradable polymers including ethylene vinyl acetate, poly(meth)acrylic acid, polyamides, copolymers and mixtures thereof. The characteristics or properties of these thermally formable plastics or polymers was optionally modified by usage of plasticizers and any durometer adjusting substance. The plasticizer is added to adjust the final properties and characteristics favorably, such as to make the plastic or polymer softer or more pliable. The oral appliance comprises non-porous material and is disposable.

Example 3. Periodontal Measurements

Each tooth or implant was divided into six sections when observed from the occlusal aspect. A periodontal probe was inserted along the root surface of the tooth to measure periodontal probing depths. The instrument was angulated in a mesio-distal direction respectively while it was kept parallel to the long axis of the tooth. Angulations in the buccal-lingual direction were avoided. The site with the deepest periodontal or peri-implant probing depth was recorded for each section upon probing with a perio-probe. See above herein for periodontal probing charting specifications and description. Dental impressions, digital diagnostics and oral scanning and screening determine the exact periodontal probing coloration which are made to mirror the exact specification and measurements for each and every individual pocket depth and space in the circumference covering the scope of the dentition, alveolar mucosa, sulcus, alveolar bone and periodontal ligament or (PDL) for every individual tooth in the full natural dentition or reconstructed or implant or multiple implant locations.

Example 4 Oral Appliance Tray for Advanced Periodontal Disease

An individualized oral appliance tray with wider ports was manufactured. In this instance, the mesial-buccal delivery port is 2.5 mm×6.5 mm (port 1), the direct buccal port is 3 mm×5 mm (port 2). The distal buccal delivery port is 2.5 mm×6.5 mm (port 3). The mesial buccal delivery port is 2 mm×5.5 mm (port 4); the direct buccal delivery port is 2 mm×4 mm (port 5); and the distal buccal port is 3 mm×5.8 mm length (port 6). A portion of the oral appliance tray showing the mesial-buccal delivery port, the direct buccal port and the distal buccal port is presented in FIG. 23; the lingual delivery ports are not visible in the image.

Example 5. Case Study 2

Figures 26A, 26B, 26C, 26D, 26E, 26F, 26G, 26H, 26I, 26J, 26K, 26L, 26M, 26N, 26O, 26P, 26Q, 26R, 27A, 27B, 27C, 27D, 27E, 27F, 27G, 27H, 27I, 27J, 27K, 27L, 27M, 27N, 27O, 27P, 27Q, 27R, 27S, 27T, 27U, 27V, 27W, 27X, 27Y, 27Z:
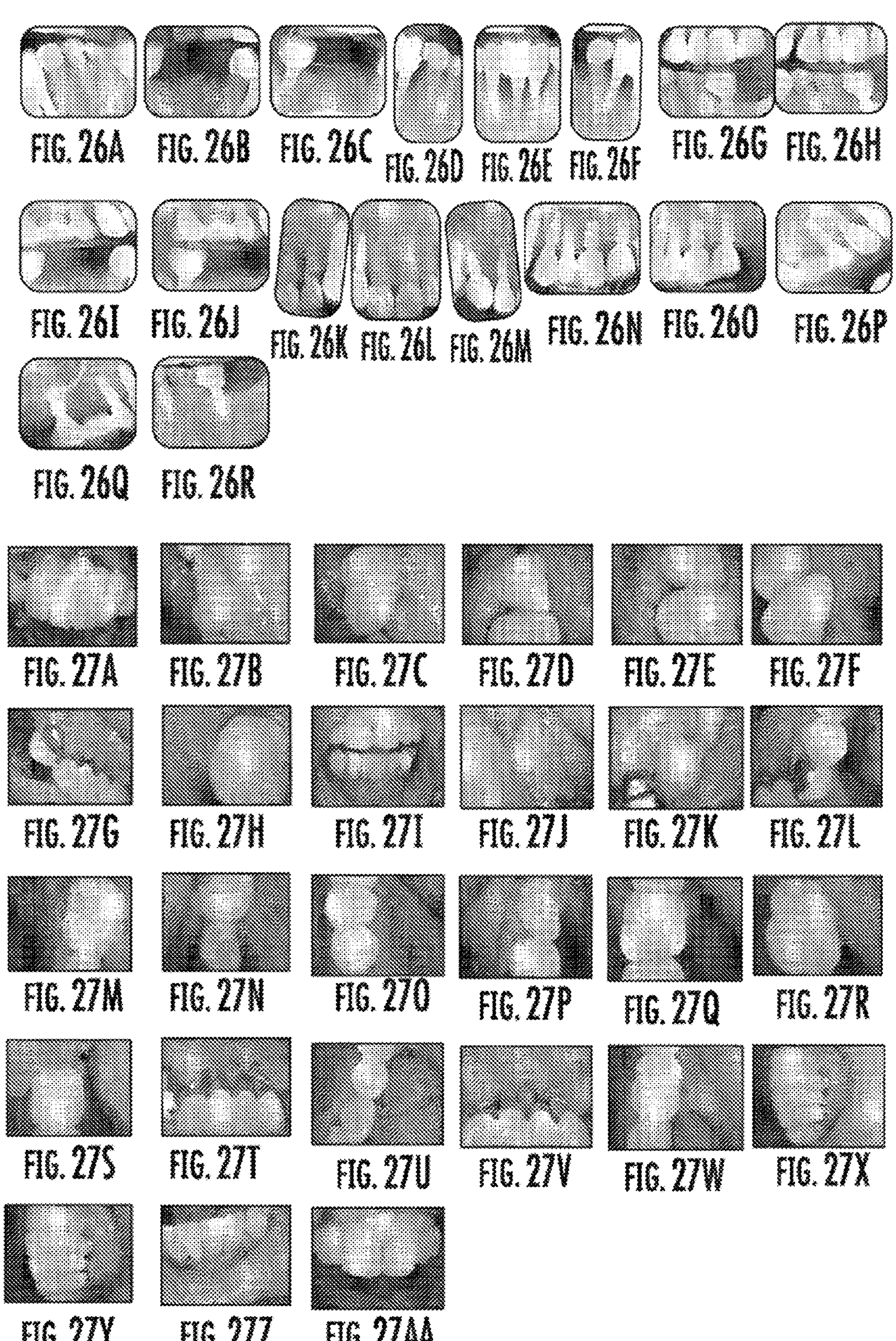

A subject with advanced periodontal disease and implants was identified. The subject was at risk for losing the costly dental implants and reconstructive dentistry. The subject was treated with an oral appliance delivery tray as described above herein. After treatment radiographic images are shown in FIGS. 26A-26R; after treatment intra-oral images are shown in FIGS. 27A-27Z and 27AA. The bone regenerated and stabilized the implants; the implants are integrated. The subject's prognosis is stable; the decrease in severity of multiple periodontal disease-related symptoms is significant. The improvement is remarkable.

Example 6. Case Study

Figure 17G:
FIGS. 17A, 17B, 17C, 17D, 17E, 17F, 17G, 17H, 17I, 17J, 17K, 17L, 17M, 17N, 17O, 17P, 17Q and 17R shows a radiograph of a full mouth series of a subject with extensive dental work including surgically placed titanium abutment core implants, 3-unit semi-precious metal fused to a porcelain titanium implant bridge, semi-precious fused to porcelain crowns, bonding composite restorations, and semi-precious metal fused to porcelain cantilever fused crowns and endodontic root canal procedures with semi-precious fused to porcelain crowns.
Figure 17N:
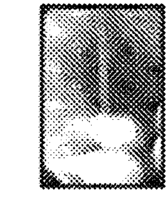
Figure 17N:
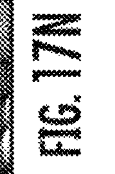
Figure 17R:
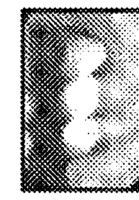
Figure 17R:
Figure 17F:
Figure 17M:
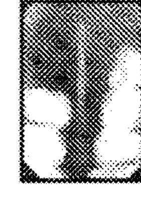
Figure 17M:
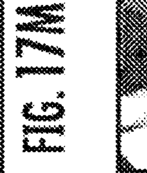
Figure 17Q:
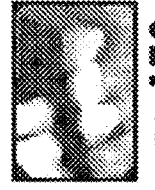
Figure 17E:
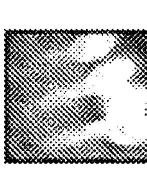
Figure 17D:
Figure 17L:
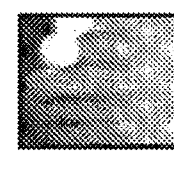
Figure 17K:
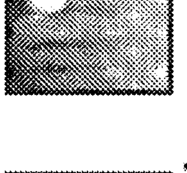
Figure 17C:
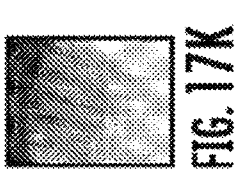
Figure 17C:
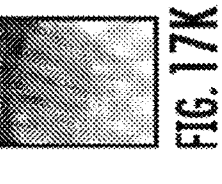
Figure 17J:
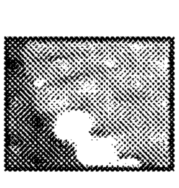
Figure 17J:
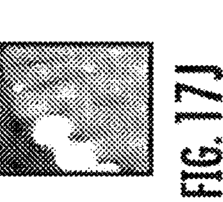
Figure 17B:
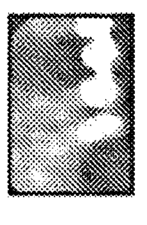
Figure 17A:
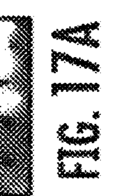
Figure 17I:
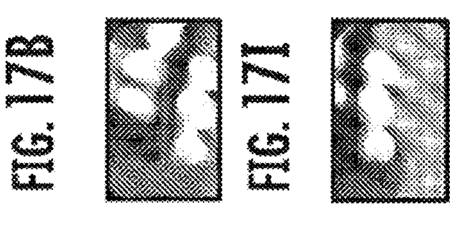
Figure 17I:
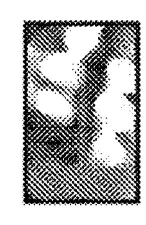
Figure 17I:
Figure 17H:
Figure 17P:
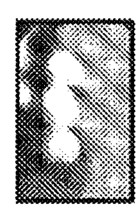
Figure 17O:

The radiographic series shows presence of implant reconstructive dental treatment, reconstructive crown and bridgework and implant abutment bridgework, natural dentition presence showing advanced attachment loss, bone loss, open margins on reconstructive crown and bridgework, exposed dentin, fracturing demineralized incisal margins with exposed dentin, worn away enamel from bruxism and acid erosion on buccal, facial, occlusal and incisal surfaces, elongated supra-erupted crowns and natural dentition due to bone loss and comprised bone sockets and attachment loss, maligned, shifting, fracturing dentition and unstable alignment due to loss of bone and attachment stability, loss of oxygenated and blood circulation in soft tissues due to splintered hard calculus attachments causing necrotic tissue and advanced irreversible periodontal gum disease. FIGS. 17A-17R demonstrate the effectiveness and competence of the concept of this oral device and the satisfactory outcome of an improved prognosis for the periodontally compromised patient.

Example 7. Case Study

This device was designed to access the subgingival surrounding area which is extremely difficult to reach to cleanse the infected area and return the surrounding soft tissue structures to homeostasis and stability. The measurements used were taken from a periodontal probe on a periodontal examination. The measurements were used to position the pore outlets to match where the patient had evidence of attachment and bone loss, inflammation, bleeding, edematous tissue, exposed dentin and receding gums and hard calcified calculus and intrinsic and extrinsic staining, and Class IV advanced periodontal disease classification present. Typically, the periodontal charting establishes precise measurements of a minimum of 6 pocket depths per tooth. Periodontal measurements may include information related to bleeding, recession, peri-implant recession, furcation involvement, mobility, clinical attachment loss or (CAL), gingival margins, plaque amounts, bleeding upon probing or (BOP), cementum-enamel junction or (CEJ), implant, healthy or non-healthy implant and peri-implants tissues, alveolar bone attachment, gingival hyperplasia, pseudo pockets, peri-implant pocket, and esthetic zones. Alginate impressions and digital scannings were taken to fabricate the dental appliance tray to assure the periodontal measurements at a minimum of six measurements per tooth. The tray allowed delivery of compounds directly into the diseased tissues into the sulcus by mirroring the periodontal chartings findings. The tray is shown in FIGS. 18A and 18B.

Example 8. Case Study

The patient wore the tray for 1S-minutes in the morning and 15-minutes in the evening and in 10 days upon examination the pathogens have been substantially reduced and the patient oral and systemic health has been significantly improved due to this invention. The compound used in this patient's custom fabricated tray device was a combination of 1.7 hydrogen peroxide oral debriding agent in foam formulation described as oral wound cleanser compromised of 3% ethyl alcohol, potassium sorbate, peppermint oil, xylitol, 1% povidone iodine and 1% chlorhexidine solution acting as an oxygenating cleansing source of antimicrobial and antiseptic properties with direct access into the port channel to attain and maintain in a time measured interval that remains stationary on a daily basis to breakdown the colonizing pathogen formations. Therefore, disrupting the further formation of the biofilm, pellicle and calcification of plaque and staining to remove the degenerative pathogens and institute a debriding of the current parthenogenic formations. This specific combination raised the pH levels to homeostasis and decreased the formations of degenerative effects such as decaying surrounding natural tooth structures, further periodontal infection, abscess, perio-abscess, further attachment and bone loss, halitosis and decreases the spread of this difficult and devastating prognosis of advanced degenerative periodontal and systemic disease that claims so many patients oral and overall health and well-being. The results in FIGS. 21A-21F demonstrate the hard-calcified plaque and the pathogens, biofilm and bacteria contained in that diseased formation have been substantially reduced. It has been substantially reduced by the defined case specific compound placed inside the tray device.

Example 9: Case Study

Figure 22A:
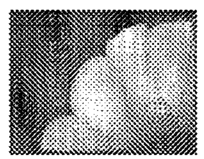
FIGS. 22A, 22B, 22C, 22D, 22E, 22F, 22G, 22H, 22I, 22J, 22K, 22L, 22M, 22N, 22O, 22P, 22Q, 22R, 22S, 22T, 22U, 22V, 22W, 22X, 22Y, 22Z, 22AA, 22BB and 22CC provide images of multiple teeth from a subject before treatment and after 30 days of twice daily, 15-minute interval delivery of a compound with an oral appliance delivery tray.
Figure 22B:
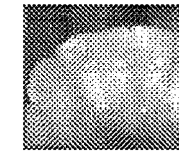
Figure 22C:
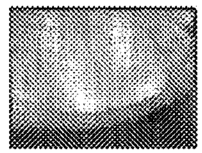
Figure 22D:
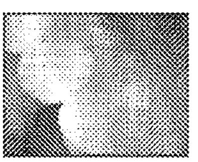
Figure 22E:
Figure 22F:
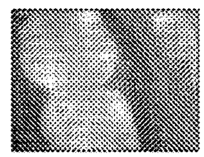
Figure 22G:
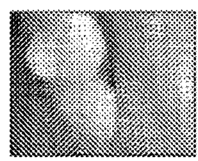
Figure 22H:
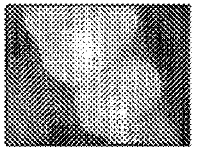
Figure 22I:
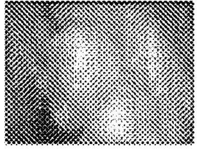
Figure 22J:
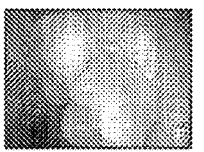
Figure 22K:
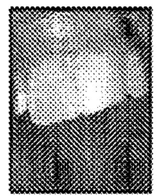
Figure 22L:
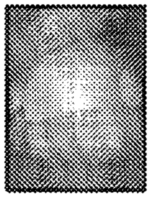
Figure 22M:
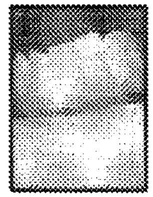
Figure 22N:
Figure 22O:
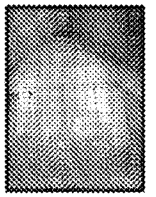
Figure 22P:
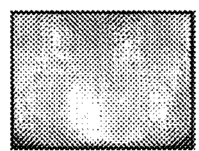
Figure 22Q:
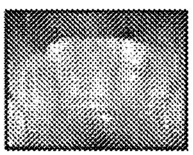
Figure 22R:
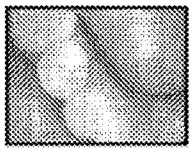
Figure 22S:
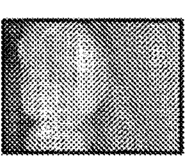
Figure 22T:
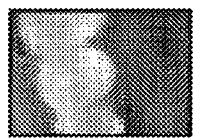
Figure 22U:
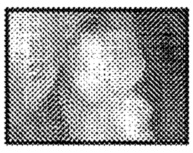
Figure 22V:
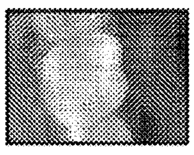
Figure 22W:
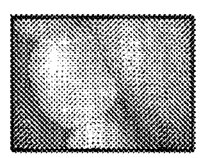
Figure 22X:
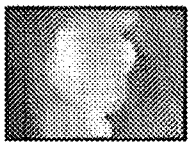
Figure 22Y:
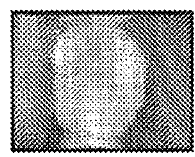
Figure 22Z:
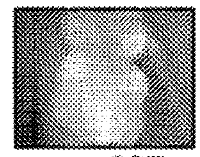
Figure 22A:
Figure 22B:
Figure 22C:

This was done by the patient wearing the tray for 1S-minutes in the morning and 15-minutes in the evening and in 10 days upon examination the pathogens have been reduced and the patient oral and systemic health has been significantly improved due to this invention. The compound used in this case specific patient with their custom fabricated tray device was a different formulation combination due to this subject's extreme sensitivity. This subject was experiencing extreme sensitivity related to exposed dentin and recession from toothbrush abrasion and an overuse of over the counter whitening products which demineralized the minerals of the teeth and dried out the tubules of the enamel rods and dentinal surfaces. The patient required a combination of a debriding and oxygenating mechanism designed to minimize further demineralization of the natural tooth structures. Without being limited by mechanism, demineralization may increase sensitivity and may promote tooth degeneration resulting in future rampant tooth decay. A combination of 1.7% hydrogen peroxide oral debriding agent in gel formulation described as oral wound cleanser comprised of 3% potassium nitrate for sensitivity, no ethyl alcohol due to demineralization of natural tooth structures, potassium sorbate, peppermint oil, xylitol, 1% povidone iodine and 1% chlorhexidine solution included in gel solution and 1% sodium fluoride acting as an oxygenating cleansing source of antimicrobial and antiseptic properties was used. Delivery of this compound via direct access into the port channel to maintain delivery of the compound for in a time measured interval that remains stationary on a daily basis to breakdown the colonizing pathogen formations. This combination provided a great source of comfort decreasing sensitivity to eating and drinking and re-mineralized the dentinal tubules to decrease not only sensitivity but also decreased potential risk of future caries by strengthening those exposed and unprotected tooth structures. Without being limited by mechanism, this combination may disrupt the further formation of the biofilm, pellicle and calcification of plaque. Removing the degenerative pathogens and instituting a debriding of the current pathogenic formations may also be beneficial. This specific combination raised the pH levels to homeostasis and decreased the formation of degenerative effects. Degenerative effects may include, but are not limited to, decaying surrounding natural tooth structures, failure of reconstructive dental structures, further periodontal infection, abscess, perio-abscess, further attachment and bone loss, xerostomia and halitosis. As indicated in FIGS. 22A-22Z and 22AA-22CC, the hard-calcified plaque and the pathogens, biofilm and bacteria contained in that diseased formation has been substantially reduced. It has been substantially reduced by the defined case specific compound placed inside the tray device.

EXEMPLARY EMBODIMENTS

It will be understood that the reference to the below embodiments are for illustration purposes only and do not limit the scope of the claims.

Embodiment 1

An oral appliance tray for delivery of a compound to the gingival region of at least one tooth of a subject, wherein the oral appliance tray comprises a gasket device wherein said gasket comprises (a) a supragingival portion; (b) a gingival and subgingival delivery region and (c) one or more delivery pocket pores comprising an inlet and an outlet, wherein said inlet is located in the supragingival portion and said outlet is in the gingival and subgingival delivery region.

Embodiment 2

The oral appliance tray as described above wherein said gasket fabrication and lining walls compromises a pressurized material force which generates the said compound directly into the periodontal measured ports and pocketing depths and surrounding tissues which holds the compound stationary for a selected time interval or an unlimited length of measured time.

Embodiment 3

This method is used to facilitate Guided Biofilm Therapy (GBT) and salivary diagnostics for therapeutic, medicinal, oral and systemic maintenance and oral and systemic healing.

The gasket seal device holds the compound stationary in place consisting of buccal, facial, interproximal, occlusal, supragingival and subgingival regions and is designed to hold the compound structurally in place without diluting or altering concentration of compound into the port channels for an unlimited period of time as a method for manipulating the pH of said subject for controlling and correcting altering stages of oral perio-pathogens and biofilm which contributes to localized and systemic inflammation of diseased oral tissues causing degeneration and failure of surrounding tooth structures from uncontrolled colonizing anerobic gram-negative bacterium, endotoxins, decreased salivary production, acidic salivary formulation, increased crevicular fluid, increase in (-Reactive protein ((RP) levels causing a negative auto-immune response (as C-reactive protein (eRP) is the most clear, quantifiable, and readily accessible marker of the oral-systemic connection).

Periodontal disease also containing degenerative biofilm markers of interleukin1 or (IL-1), interleukin 2 (IL-2) and 6 or (IL-6) gene polymorphism and patients with this polymorphism produce more IL-1 and IL-6. This increases their risk drastically for not only acute but much more troubling and degenerative "chronic" periodontitis. Also, in addition to inflammatory biological markers the composite genotype of the ILIA and ILiB genes that include the 'T' nucleotide at both ILIA (+4845) and ILIB (+3954) positions have now increased risks of periodontitis with an odds ratio of (1:51) presence of increased levels of interlukin-1 and interlukin-6, and uncontrolled continued colonization of pathogens and gram-negative bacteria.

There are also the presence of phagocytosis or hyporesponsive phagocytes, hyper-production of interleukins, prostaglandins and cytokines, lipopolysaccharides (LPS). In addition it carries and delivers therapeutic, medicinal, antimicrobial, antibiotic compound applications, anti-microbial compound agents, anti-biotic compound agents and mineralizing and desensitizing compound agents for improvement of diseased oral tissues, compromised and vulnerable and exposed or damaged tooth structures and surrounding fixed prothesis or attached oral structures from one to six and above measurements from a periodontal examination and clinical charting which reveals the subject diseased or altered, compromised state and departure from homeostasis. Also designed for maintenance the single implant or multiple implants, fixed prothesis and surrounding structured walls, sulcus, oral tissues and alveolar bone.

Chronic periodontitis disease affecting the supporting structures of the teeth leading to progressive loss of the attachment apparatus and bone around teeth. Characterized by gingival pocket formation and/or gingival recession. The disease is initiated by bacteria and their components like lipopolysaccharide and causes a heightened host inflammatory response. This cascade of inflammatory response ultimately leads to an increased osteoclastic activity and bone loss. Individuals with periodontitis have increased systemic levels of acute phase proteins, plasma antibody levels, coagulation factor, total white blood cell count, neutrophils, C reactive protein (CRP), and cytokines such as INF-gamma (Interferon gamma), TNF-a (Tumor necrosis Factor-Alpha), IL (Interleukinj-Ijs, IL-2 and IL-6. The same chronic inflammation model seen in systemic diseases, there is sufficient documented peer review evidence to correlate a bi-directional link between the two.

Oral trays with said compounds to reduce the detrimental systemic risks of cardiovascular diseases and stroke, arterial sclerosis, respiratory infections, lung disease, ear, nose and throat infections, dementia and brain diseases, pre-mature, pre-term birth rate, pregnancy complications, oral and other cancers, diabetes, auto-immune disorders, bone and joint diseases, arthritis, rheumatoid arthritis, gastrointestinal tract diseases, erectile dysfunction, obesity, disruptions in gut biome and impaired gut barrier function, altered gut immune profile, non-alcoholic fatty-liver disease (NAFLED), fibrosis, endotoxemia, low, medium and high grade systemic inflammation, bacteremia inflammatory mediators, dysbiosis and severe osteopenia and osteoporosis, candida, viral diseases and women's health issues.

The oral appliance tray described above herein, wherein consists of pre-fabricated, pre-loaded, pre-dosed oral tray device for over the counter availability by said subject who does not need a required prescription to purchase a pre-fabricated, pre-loaded and pre-dosed oral tray device with said listed compounds chemically placed and pre-fabricated, pre-loaded and pre-dosed with medicaments into the oral tray device for purchase to be used in the comfort of their own application outside the supervision of a dental or medical licensed professional. These compounds include oxygenating agents, antimicrobial agents, anti-plaque agents, holistic health compounds such as essential oils, hydrogen peroxide, baking soda, xylitol, and re-mineralizing and desensitizing compounds. Pre-fabricated trays can contain any of the said above listed compounds from embodiment 1 and embodiment 4 in an over the counter legal amount licensing by each individual State laws requirements by the FDA or any other State selected requirement for maintenance of caries control for moderate to high caries risks subjects for *Streptococcus* colonization on tooth structure to decrease caries risk and correct, improve and manipulate oral pH levels to restore subject to homeostasis and decreased caries risk and for desensitizing compounds, re-mineralizing compounds for tooth and gum sensitivity, halitosis, xerostomia, anti-microbial, antiseptic, anti-plaque, Guided Biofilm Therapy (GBT), pain, discomfort, sensitivity and therapeutic and medicinal properties.

The oral appliance tray described above herein, wherein said compound is selected from the group comprising oxygenating agents, antimicrobial agents, anti-plaque agents, antibiotic agents, and re-mineralizing and desensitizing compounds and additional therapeutic uses.

Embodiment 3

The oral appliance tray as described above herein, wherein when the tray is positioned in the oral cavity of said subject, the compound flows through said one or more delivery port and measured pocket depths to the gingival and subgingival region of at least one tooth.

Embodiment 4

The oral appliance tray as described above herein, comprising delivery ports and individual pocketing depths for delivery of a compound into the gingival region of at least two teeth on said subject and up to subjects full/entire natural oral structures and dentition or surgically or cosmetically reconstructed oral dentition.

Embodiment 5

The oral appliance tray as described above herein, wherein at least one tooth is an implant or multiple implants.

Embodiment 6

A dental implant maintenance device comprising an oral appliance tray for delivery of a maintenance compound to the dental implant, abutment, surrounding base region, surrounding ligaments and alveolar bone structures comprising a gasket device with surrounding inner walls and outer walls providing port channel access openings wherein said gasket promotes a cleansing and daily hygienic maintenance process to further the successful prognosis of implant or multiple implants lifetime duration.

Implant maintenance to increase success rate of implant placement and applied oxygenating compound as a proactive solution to maintain fixed implant prosthetics where the subject has lost the surrounding support structure of a periodontal ligament upon extraction of subjects tooth structure and the opening port regions are without barriers of protection from food debris, soft plaque, hard calcified plaque, calculus and any other debris accumulating in the implant pocket surrounding regions leaving the implant and surrounding structure unprotected from food debris, soft plaque, hard calcified plaque, calculus and PH levels or other debris causing colonization of gram-negative pathogens, endotoxins and infection and diseased states to appear which can contribute to implant failure and periodontitis.

In addition, electrochemical degradation, corrosion, biotoxicity due to ions released in the oral cavity. Implants, made of synthetic materials, are naturally coated by biofilm created by the body, which may function as a favorable medium for bacteria growth, degenerative biofilm, anerobic gram-negative bacteria and further increase the risk of destructive pathogens which can be harmful to the implant or implants and the surrounding tissue and underlying bone structures and increase the risk of implant failure.

A dental implant is considered to be a failure upon clinical examination found to be (1+) mobility or shows any signs of inflammation, redness, bleeding, peri-implantitis (infection or abscess purulence around the implant) bone loss of greater than 1.0 mm in the first year and greater than 0.2 mm a year after. Implant failure due to bacterial infection of the implant can occur at any point of implant lifetime.

Single implant and multiple implants surgically placed must be maintained daily however, this often does not occur as it is very difficult if not impossible to reach further down than a 1-mm to 3-mm pocket depth with floss, inter-dental floss mechanisms, interproximal proxy brushes and floss picks, bridge floss, water pick, toothbrushes, electric or sonic toothbrushes and mouth rinses. Bacteria and biofilm may already reside on the implant or be introduced daily during or immediately after the implantation placement and lack of maintenance due to lack of accessible areas surrounding the implant structure can cause failure as listed above and peri-implantitis and therefore cause the implant to fail due to the accumulation of uninterrupted biofilm colonization and gram-negative colonization of bacterial pathogens and the constant overlapping accumulations. Typical failure mechanisms include tissue damage, colonization of gram-negative pathogens, bacterium and implant detachment due to bacteria generated biofilm that is not addressed with daily oral hygiene due to unreachable access regions that the trays are designed to compensate and therefore daily maintain the health and proper healthy pH levels and reductions of these degenerative bacterial pathogenic risks.

Embodiment 7

An oral appliance tray, wherein the gingival region comprises one or more regions selected from the group comprising the subgingival region, the sulcus, the periodontal ligament, the periodontal ligament region, the roots, furcations, an implant and implant base, abutment, alveolar bone, fixed restorative crown and bridge margins of restorations, lamanents, veneers, composite and amalgam margin restorations, gold, porcelain, artglass, inlays, on lays, composite and hybrid composites, natural tooth structures of entire enamel, dentin, cementum surfaces, fibers, attached gingiva and unattached gingiva.

Embodiment 8

An oral appliance tray selected from the group comprising a mandibular arch oral appliance tray and a maxillary arch oral appliance tray.

Embodiment 9

An oral appliance tray, wherein said compound is selected from the group compromising high, moderate to low risk caries subjects prone to caries and maintenance from degenerative biofilm and anerobic gram-negative bacteria and pathogens colonizing and formulating onto the enamel, dentin, cementum causing tooth decay, acid erosion and destruction of said tooth structures. Decalcification, increased crevicular fluids, negative alteration of PH levels of oral cavity and surrounding tooth structures and tissues, lesions, acidic accumulations, mineral breakdown of enamel, dentin and cementum caused from xerostomia (dry mouth), simple and synthetic sugar intake in food consumption, high dietary intake of fermentable carbohydrates, fermentable sugars into acids, sucrose, fructose, glucose, acidosis, diabetes mellitus, oral candida "thrush like" microbial presence, Sjogrens disease, cariogenic biofilm, viral diseases, antihistamines and antidepressants, prescribed medications, over the counter medications, poor hygiene, smoking, chewing tobacco and snuff like products, and impoverished conditions. These above listed ailments contribute to decreased salivary production, xerostomia, increased biofilm pellicle attachments and increased thick mucus containing pathogens and gram-negative bacteria contributing to degenerating oral and systemic conditions. The most common bacteria associated with dental cavities are the *Streptococci mutans*, most prominently but not limited to *Streptococcus mutans* and *Streptococcus sobrinus*, and lactobacilli.

Embodiment 10

An oral appliance tray wherein the tray is constructed to deliver a caries control and maintenance device for low, moderate to high caries risks subjects for all forms of degenerative gram-negative bacteria colonization's and accumulations and all forms of *Streptococcus* colonization on tooth structures to decrease caries risk and correct, improve and manipulate oral pH levels to homeostasis and restore said subject to overall oral health and homeostasis and decrease caries extended risk over said subjects lifetime.

Embodiment 11

An oral appliance tray, wherein the diameter of said one or more deliver pores and pocket depths is in the range of 0.1 mm to 12 mm or up to the full length of any tooth structure, surrounding pocket depth and unlimited area above and surrounding structures to the limit of the infectious and diseased areas for single to unlimited multiple areas. The port size compartment of each of the oral appliance gasket device system has a depth of 0.5 mm to approximately 7 mm. The port size of the oral appliance gasket device system has a width size of 0.5 mm to approximately 12 mm. The oral appliance gasket device system has a thickness of 0.03 to approximately 0.5 inches.

The port size is of the defined pocketing length, depth and width is unlimited due to the capacity of the diseased or abscessed areas requiring a measurable sized gasket reservoir. This port reservoir is fabricated by the sizable structures demonstrated by the diseased region location of the infected and compromised tissues. The length, depth and width of the pocket depths of the trays measurements will be approximate to the length and depth and width of the infected surrounding sulcus and oral tissue structures which will correspond to the clinical periodontal charting of perio-probe measurements and radiographic or CT scan or digital and clinical findings which will reveal the full measured spectrum of diseased tissues and tooth structures the infected area has consumed. The ports will correspond with the exact measured proportion of diseased areas infected and the manual and digital impressions will calculate and correspond for an accessible delivery to the single localized infected site or multiple sites reaching at up to 100% accessibility by this designed port system for the efficacy, reliability and measurable effective result.

Embodiment 12

An oral appliance tray, wherein the supragingival and subgingival portion is contoured to with exacting precision to fit the teeth, its interior contours, oral cavity, pocket depth, sulcus, connective tissues, fibers, ligaments, attached gingiva and unattached gingiva of said subject. The interior surface defines the contours allowing a continuous flow cushioning to extend to facial, buccal, lingual, interproximal, occlusal and over the surrounding gingival tissue structures allowing a flow of material compound to be fixed and held into as locked and stationary in place for a scheduled activated placement or an unlimited amount of time of said subject.

Embodiment 13

An oral appliance tray, wherein said tray is an individualized oral appliance tray, wherein at least one outlet is positioned according to at least one clinically periodontal measurement from a tooth of said subject.

Embodiment 14

An individualized oral appliance tray wherein the outlet placement is determined by six periodontal measurements per tooth from a single tooth to multiple teeth of said subject, wherein the periodontal measurement from the tooth is selected from the group comprising:

Embodiment 15

An individualized oral appliance tray wherein the periodontal measurement from the tooth is selected from the group compromising: Six sites per tooth or implant: Perio Probe Charting.

The selection of the six sites per tooth or implant for the measurement of both periodontal pockets and attachment levels is critical. Each tooth or implant is divided into six sections when observed from the occlusal aspect. The site with the deepest periodontal or peri-implant probing depth should be recorded for each section upon probing with the perio-probe. An oral appliance tray wherein the periodontal measurement will be recorded and fabricated to the deepest depth in each of the six sites per tooth with other measured contributing factors listed below: Angulation of the periodontal probe.

Perio-probing measurements will register documentation including measurements contributing to the gingival margin, pocketing depth, plaque measurements, bleeding on probing, furcations, mobility, peri-implant probing depths, peri-implant mucosa, mucosa margins, reconstructive defects, structural defects, clinical attachments, recession, peri-implant recession, alveolar bone loss, secondary bone loss, attachment loss, cementum-enamel junction, gingival hyperplasia, gingival overgrowth, pseudo pocketing depths, margins of the esthetic zones, residual pocketing depths, peri-implantitis.

Embodiment 16

A method of reducing the amount of one or more bacteria in the gingival region of a subject at risk for a periodontal disease, comprising delivering a compound to said subject, wherein said compound selected from the group comprising oxygenating agents, antimicrobial agents, antibiotic agents, and re-mineralizing compounds and wherein said compound is provided in an oral appliance tray of the application.

Embodiment 17

A method of reducing the amount of one or more bacteria, wherein said bacteria is selected from the group comprising gram-negative bacteria, which contributes to solid compounds of biofilm, soft plaque, hard calcified plaque, tarter, calculus, intrinsic stains, extrinsic stains, increased crevicular fluid, altering pH levels contributing to disease, acidic salivary compounds, fermented carbohydrates, increased collagenase which are formed of and attract biofilm. Periodontal disease markers include interleukinI or (IL-I), interleukin 6 or (IL-6) gene polymorphism and patients with this polymorphism produce more IL-I and IL-6. This increases their risk drastically for not only acute but much more troubling and degenerative "chronic" periodontitis. Also, in addition to inflammatory biological markers the composite genotype of the ILIA and ILiB genes that include the "T" nucleotide at both ILIA (+4845) and ILiB (+3954) positions have now increased risks of periodontitis with an odds ratio of (1:51) This degenerative biofilm consisting of *Aggregatibacter. actinomycetemcomitans, Porphyromonas gingiva/is, Treponema dentico/a, Tannerella forsythia, Eubacteruim nucieaturm, Fusobcterium nucleatum, Prevotella intermedia, Campy/obacter rectus, Peptostreptocococcus micros,*

*Capnocytophaga* species (*gingavalis, ochracea, sputigena*), and *Eikenella* species. Also including *Streptococcus Mutans, Streptococcus sobrinus* and lactobacillis in addition contributing to increased caries risk.

Embodiment 18

A method of the application, further comprising providing said compound according to a delivery regimen comprising multiple delivery events including caries risk control maintenance, plaque and biofilm control maintenance, correcting and stabilizing proper oral pH level maintenance, periodontal disease classification maintenance, implant maintenance, reconstructive dentistry maintenance, fixed prosthesis maintenance, osseous resective surgical maintenance, scaling and root planning maintenance, pocket depth reduction surgical maintenance, bone grafting maintenance, connective tissue grating maintenance, free tissue graft maintenance, pedical tissue graft maintenance, bleaching, whitening, intrinsic and extrinsic staining maintenance, any subject who wishes to be pro-active with dental oral and systemic overall health and well-being and wishes to maintain homeostasis and proper pH levels to decrease risk of oral diseases and degeneration of oral health of organic and inorganic oral structures.

Embodiment 19

A method of manufacturing an individualized oral appliance tray of the application, said method comprising: obtaining at least one periodontal measurement from a tooth of a subject at risk for a periodontal disease; determining the form of the arch of the tooth of the subject at risk for periodontal disease; using said at least one periodontal measurement to determine the position of the outlet of at least one port; and clinical periodontal measurement; forming an individualized oral appliance tray comprising a pressurized formulated gasket device with a surrounding stationary lining and barrier comprising a) a supragingival portion and subgingival portion complementary to the form of the arch of said subject; (b) a gingival delivery region and (c) one or more delivery ports comprising an outlet in the subgingival delivery region and clinically periodontal pocket measurement. When the delivery port comprises a delivery pore, the inlet is located in the supragingival portion.

Embodiment 20

The method of manufacturing an individualized oral appliance tray wherein forming said oral appliance tray comprises a process selected from the group comprising laser cutting, layer deposition, laser printing, laser deposition, molding, and casting and fabrication manual impressions and digitized impressions, Itero digital scannings, CT scans and MRI technologies.

Embodiment 21

Method of fabrication of oral tray device is comprised of receiving initial digital, computerized-implemented method or a physical model manual impression set representing at least said portion of the teeth and soft tissue areas inside the oral cavity. This initial impression or data set of initial database of internal oral cavity and tissue measurements compromising an interior portioned surface and a fitted gasket for pressurizing compounds into the said regions of the extended buccal surfaces of the teeth and the surrounding soft tissues and gingival tissues, covering over the occlusal surfaces of the teeth, the lingual sides of the teeth, the interproximal spaces, over individual adjacent gingival tissues, corresponding sulcus and pocketed regions, where the porous fabrication having an increased width and thickness starting at 0.05 mm and extending in a transverse direction to the length of the porous material. This compartment from the gasket propels and drives forward by an onward force placing the compound into a stationary and remaining held into place the required formulation for medicinal and therapeutic usage.

Embodiment 22

An oral appliance tray wherein said gasket fabrication and lining walls comprises a material suitable for oral use. A method wherein forming a porous material suitable polymer non-toxic biocompatible compounding process of safe and effective, sustainable for oral use, plastics and plastics combinations suitable and non-toxic for oral usage include: A suitable polymer to make the oral appliance can be one with a low melting point. The melting point (or, rarely, liquefaction point) of a substance is the temperature at which it changes state from solid to liquid. The melting point the solid and liquid phase exist in equilibrium so that is generally non-toxic or biocompatible and one that readily can incorporate the porous material during the compounding process. Plastics and plastic combinations are suitable to make the oral appliance.

These plastics include: polyacrylates, polyamide-imide, phenolic, nylon, nitrile resins, petroleum resins, fluoropolymers, copolyvidones (copovidones), epoxy, melamine-formaldehyde, diallyl phthalate, acetal, coumarone-indene, acrylics, acrylonitrile-butadiene-styrene, alkyds, cellulosics, polybutylene, polycarbonate, polycaprolactones, polyethylene, polyimides, polyphenylene oxide, polypropylene, polystyrene, polyurethanes, polyvinyl acetates, polyvinyl chloride, poly(vinyl alcohol-co ethylene), styrene acrylonitrile, sulfone polymers, saturated or unsaturated polyesters, urea-formaldehyde, or combinations thereof any like plastics. The oral appliance may be made from non-biodegradable polymers including ethylene vinyl acetate, poly(meth)acrylic acid, polyamides, copolymers and mixtures thereof. The characteristics or properties of these thermally formable plastics or polymers may be optionally modified by usage of plasticizers or any durometer adjusting substance. A plasticizer may be added to adjust the final properties and characteristics favorably, such as to make the plastic or polymer softer or more pliable. Typically, the oral appliance comprises non-porous material and is disposable.

Embodiment 23

Any oral tray device to decrease the foreign risk of disease mutations, pathogens and microorganism related to any of the SARS or (OVID respiratory diseases. Any oral tray device used to decrease the oral pathogens colonizing from mask wearing and lack of oxygen to the oral and nasal pathways contributing to the spread of any SARS or (OVID or any other pandemic or respiratory disease, oral transmitted disease via airwaves and any surfaces with increased droplets transferrable of bacterial loads attached to airwaves, human to human contact, human to animal contact, transmitted from mask or face coverings, and barrier to barrier of cross-contaminated surfaces carrying and bearing an infectable, transferable, investable, ingestible and injectable bacterial load.

Embodiment 24

Any oral tray device/appliance that carries pre-fabricated compounds or compounds which can manually be placed or pre-fabricated, preloaded or pre-dosed with measured benefits to decrease anti-microbial, anti-biotic, antiseptic, desensitizing, re-mineralizing, oxygenating, implant maintenance, whitening/bleaching maintenance, stabilizes the pH of the oral cavity, crown and bridge and fixed prothesis maintenance, caries risk reduction from bacterial colonization of gram-negative bacteria, biofilm, endotoxins and other harmful ions release and pathogenic accumulation in which threatens the oral structures and contributes to localized and systemic harmful risks with said compounds reaching supra-gingival and sub-gingivally to surrounding tooth structures, tissue structures, organic and inorganic surrounding structures to maintain and increase oral health and sustainably increased benefits for daily maintenance for therapeutic and medicinal improved oral and systemic homeostasis.

Embodiment 25

Oral tray device/appliance, foam, gel or compound or rinse or oral toy, animal food or snack which carries case specific or to the broad animal species or individually manufactured or pre-fabricated compounds or compounds which can manually be placed or pre-fabricated, preloaded or pre-dosed with measured benefits. Contributing to oral bacteria known to cause canine and animal species a degenerative and or periodontal disease and systemic illness. Any oral tray device/appliance, foam, gel or compound or rinse or oral toy, animal food or snack used to decrease anti-microbial, anti-biotic, antiseptic, desensitizing, re-mineralizing, oxygenating, oral health maintenance, stabilizes the pH of the oral animal cavity, caries risk reduction from bacterial colonization of gram-negative bacteria, biofilm, endotoxins and other harmful ions release and pathogenic accumulation in which threatens the oral structures and contributes to localized and systemic degenerating harmful risks with said compounds reaching supra-gingival inorganic surrounding structures to maintain and increase oral health and sustainably increased benefits for daily maintenance for therapeutic and medicinal improved oral and systemic homeostasis for any animal species.

Embodiment 26

An embodiment provides an oral appliance delivery tray, comprising pre-fabricated, pre-loaded, pre-ordered, pre-dosed oral tray device for over the counter availability and production, by said subject who may or may not require a prescription to purchase and which may or may not be purchased outside the supervision of a licensed medical or dental professional. In which addresses moderate to high caries risk, improve and manage pH levels and conditions, oxygenating, holistic compounds, desensitizing minerals and compounds, re-mineralizing compounds, addresses halitosis, xerostomia, anti-microbial, anti-plaque, Guided Biofilm Therapy and management, pain, discomfort, sensitivity, therapeutic, medicinal, oral and systemic properties to reduce ailments and increase health.

The invention claimed is:

1. A non-transitory computer readable medium comprising instructions that, when executed by a processor of a three dimensional (3D) printing machine, direct the processor to:

receive and process a digital 3D imaging model of at least one arch of a subject selected from the group consisting of a maxillary arch and a mandibular arch to generate a dental device, the dental device having a supragingival portion and a subgingival portion;

receive and process coordinates and dimensions of features to be configured with the oral appliance tray, wherein the coordinates and the dimensions of the features are based on periodontal measurements made to at least one arch selected from the group consisting of the maxillary arch and the mandibular arch of the subject to generate the dental device, and wherein the features comprise delivery ports, wherein the delivery ports comprise cannulated delivery ports having an open inlet extending from inside the supragingival portion to an open outlet extending inside the subgingival delivery region for delivery of a compound to the subgingival portion;

map the coordinates and the dimensions of the features to the digital 3D imaging model; and direct the 3D printing machine to form the dental device with the features according the digital 3D imaging model and according to the coordinates and the dimensions of the features mapped thereto.

2. The non-transitory computer readable medium according to claim 1, wherein the digital 3D imaging model is generated by a digital scan of the at least one arch.

3. The non-transitory computer readable medium according to claim 1, wherein the digital 3D imaging model is generated by a digital scan of an impression of the at least one arch.

4. The non-transitory computer readable medium according to claim 1, wherein the digital 3D imaging model is generated by a digital scan of a cast of the at least one arch.

5. A non-transitory computer readable medium comprising instructions that, when executed by a processor of a three dimensional (3D) printing machine, direct the processor to:

receive and process coordinates and dimensions of features to be configured with a dental device, wherein the coordinates and the dimensions of the features are based on periodontal measurements made to at least one arch of the subject, and wherein the features comprise delivery ports, wherein the delivery ports comprise cannulated delivery ports having an open inlet extending from inside the supragingival portion to an open outlet extending inside the subgingival delivery region for delivery of a compound to the subgingival portion;

map the coordinates and the dimensions of the features to a digital 3D imaging model; and direct the CAD/CAM machine to form a dental device comprising features according to the coordinates and dimensions of the features and according to the digital 3D model.

6. The non-transitory computer readable medium according to claim 5, wherein directing the CAD/CAM machine to form the delivery ports on the dental device comprises forming the delivery ports according to the coordinates and the dimensions of the delivery ports mapped thereto.

7. The non-transitory computer readable medium according to claim 5, wherein the digital 3D imaging model is generated by a digital scan of the at least one arch.

8. The non-transitory computer readable medium according to claim 5, wherein the digital 3D imaging model is generated by a digital scan of an impression of the at least one arch.

9. The non-transitory computer readable medium according to claim 5, wherein the digital 3D imaging model is generated by a digital scan of a cast of the at least one arch.

10. The non-transitory computer readable medium according to claim 1, wherein the cannulated delivery ports are contained wholly inside the oral appliance tray.

11. The non-transitory computer readable medium according to claim 5, wherein the cannulated delivery ports are contained wholly inside the oral appliance tray.

* * * * *